United States Patent
Kato et al.

(10) Patent No.: US 6,466,268 B1
(45) Date of Patent: Oct. 15, 2002

(54) IMAGE CONTROL DEVICE AND METHOD, AND IMAGE DISPLAY DEVICE

(75) Inventors: Yasunobu Kato, Kanagawa; Hiroshi Okuda, Tokyo; Tohru Kurata, Saitama; Satoru Nakanishi, Kanagawa, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/574,133

(22) Filed: May 18, 2000

(30) Foreign Application Priority Data

May 21, 1999 (JP) .......................................... 11-141111
May 25, 1999 (JP) .......................................... 11-145092

(51) Int. Cl.$^7$ .............................. H04N 5/66; H04N 9/12
(52) U.S. Cl. ...................................... 348/383; 348/739
(58) Field of Search ................................ 348/383, 745, 348/739, 805, 806, 807, 673, 687; H04N 5/66, 9/12

(56) References Cited

U.S. PATENT DOCUMENTS

| | | |
|---|---|---|
| 4,456,853 A | 6/1984 | Robinder et al. |
| 4,792,720 A | 12/1988 | Takenaka et al. |
| 5,136,390 A | 8/1992 | Inova et al. |
| 5,418,426 A | 5/1995 | Rilly |

FOREIGN PATENT DOCUMENTS

| | | |
|---|---|---|
| EP | 0 725 421 | 8/1996 |
| JP | 39-25641 | 9/1964 |
| JP | 42-4928 | 2/1967 |
| JP | 50-17167 | 2/1975 |
| WO | WO 99 34394 | 7/1999 |

OTHER PUBLICATIONS

Sluyterman A A S: "23.4: The Camel CRT" 1998 SID International Symposium Digest of Technical Papers. Anaheim, CA, May 17–22, 1998, SID International Symposium Digest of Technical Papers, Santa Ana, CA: SID, US, vol. 29, May 17, 1998, pp. 351–354, XP000792543 ISSN: 0098–966X.

Primary Examiner—Sherrie Hsia
(74) Attorney, Agent, or Firm—Frommer Lawrence & Haug LLP; William S. Frommer

(57) ABSTRACT

An operation for correcting horizontally an array of pixels in two-dimensional image data is performed so that a plurality of divided frames are joined properly in position in the horizontal direction and displayed. The horizontally corrected image data is stored, in the order of write address, on memories for storing image data. The image data stored is read in the same order as the order of write address or in the order different from the order of write address. The image data outputted from the memories for storing image data is vertically corrected so that the divided frames are joined properly in position in the vertical direction and displayed.

27 Claims, 37 Drawing Sheets

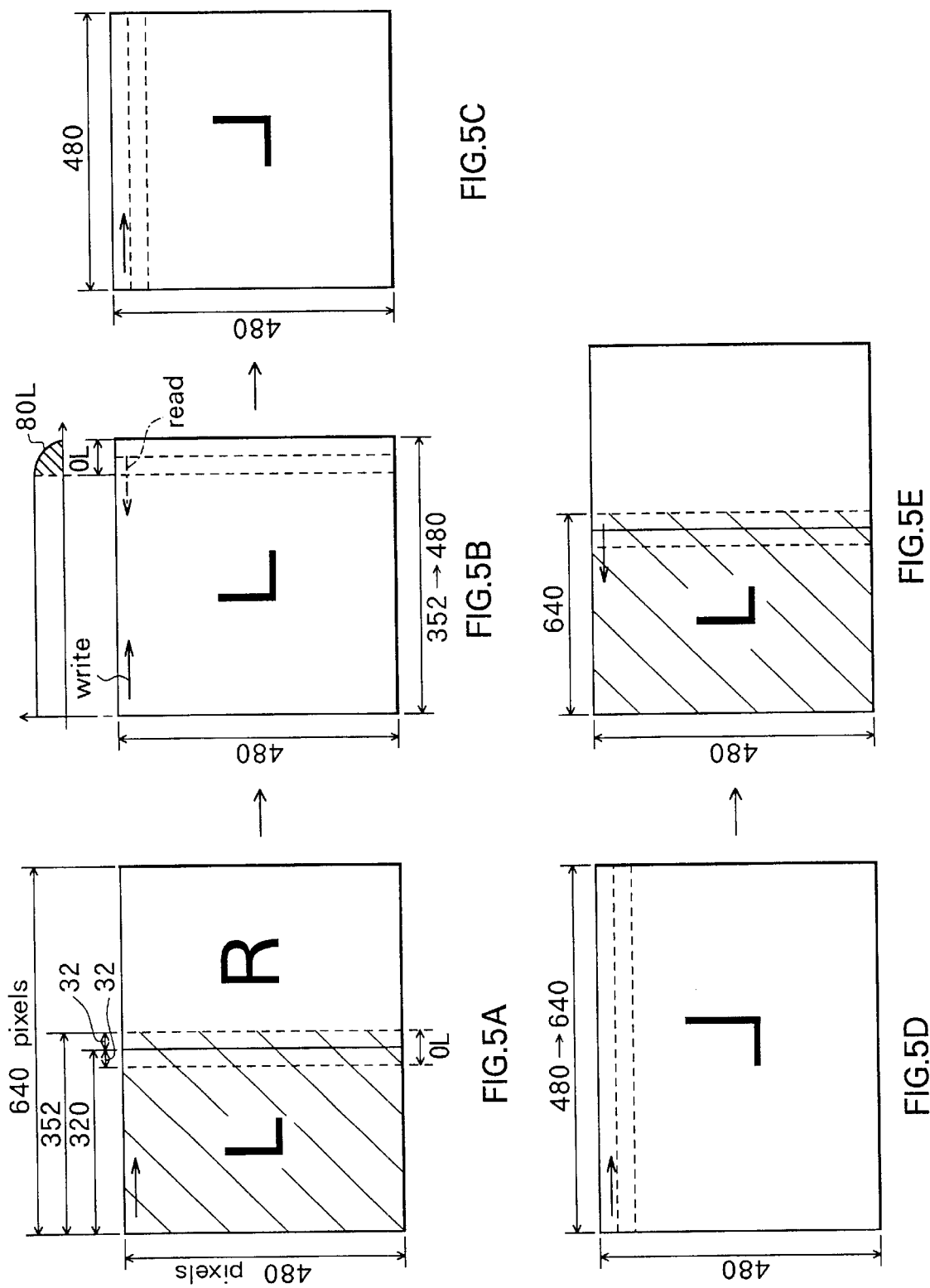

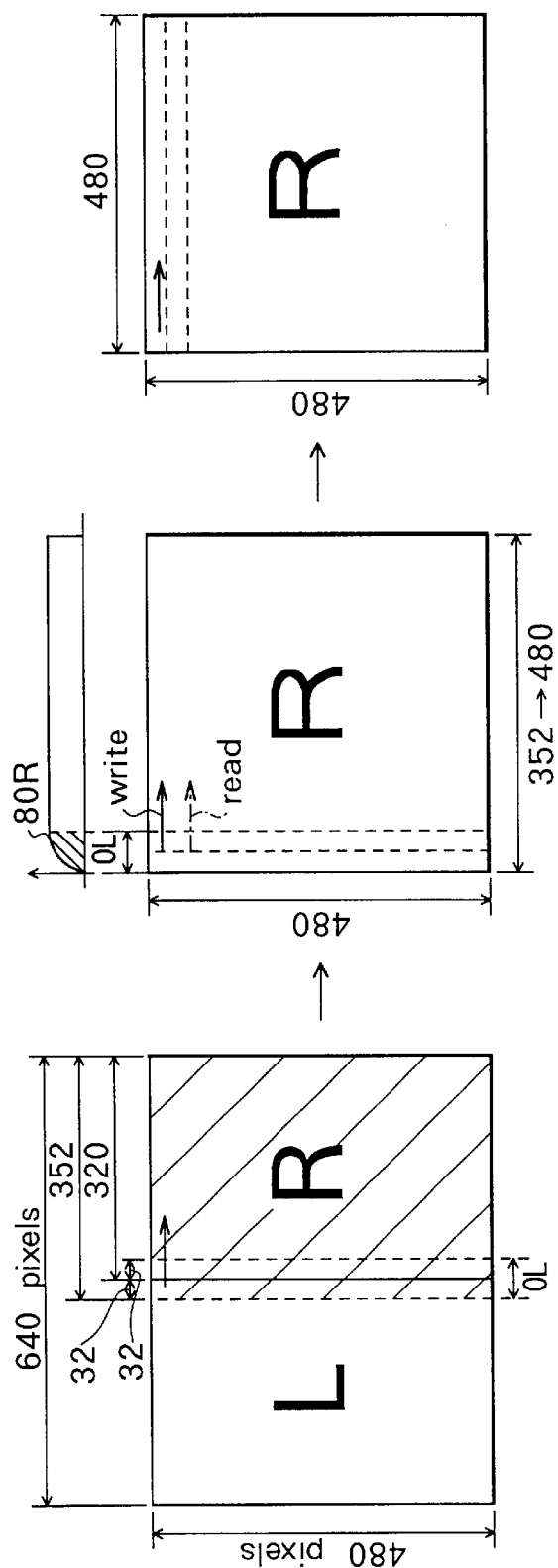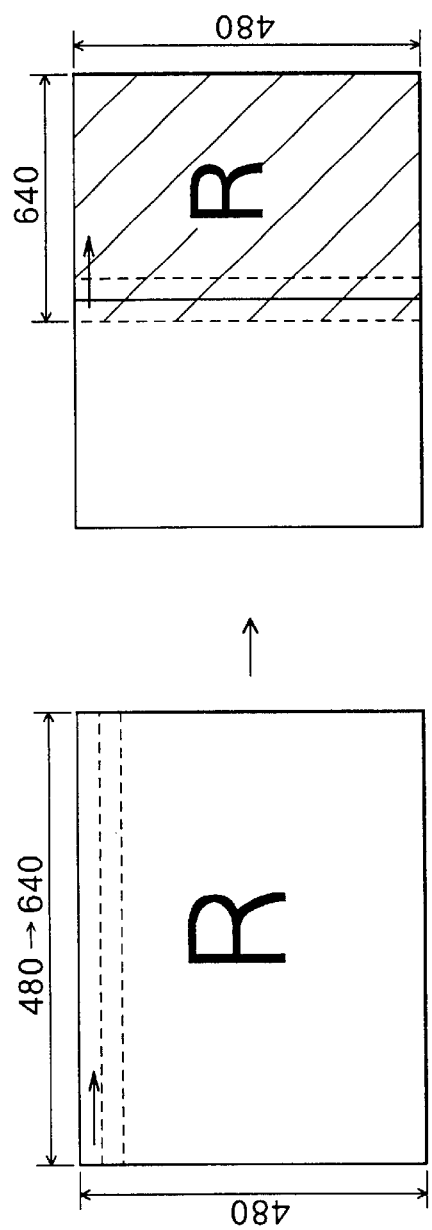

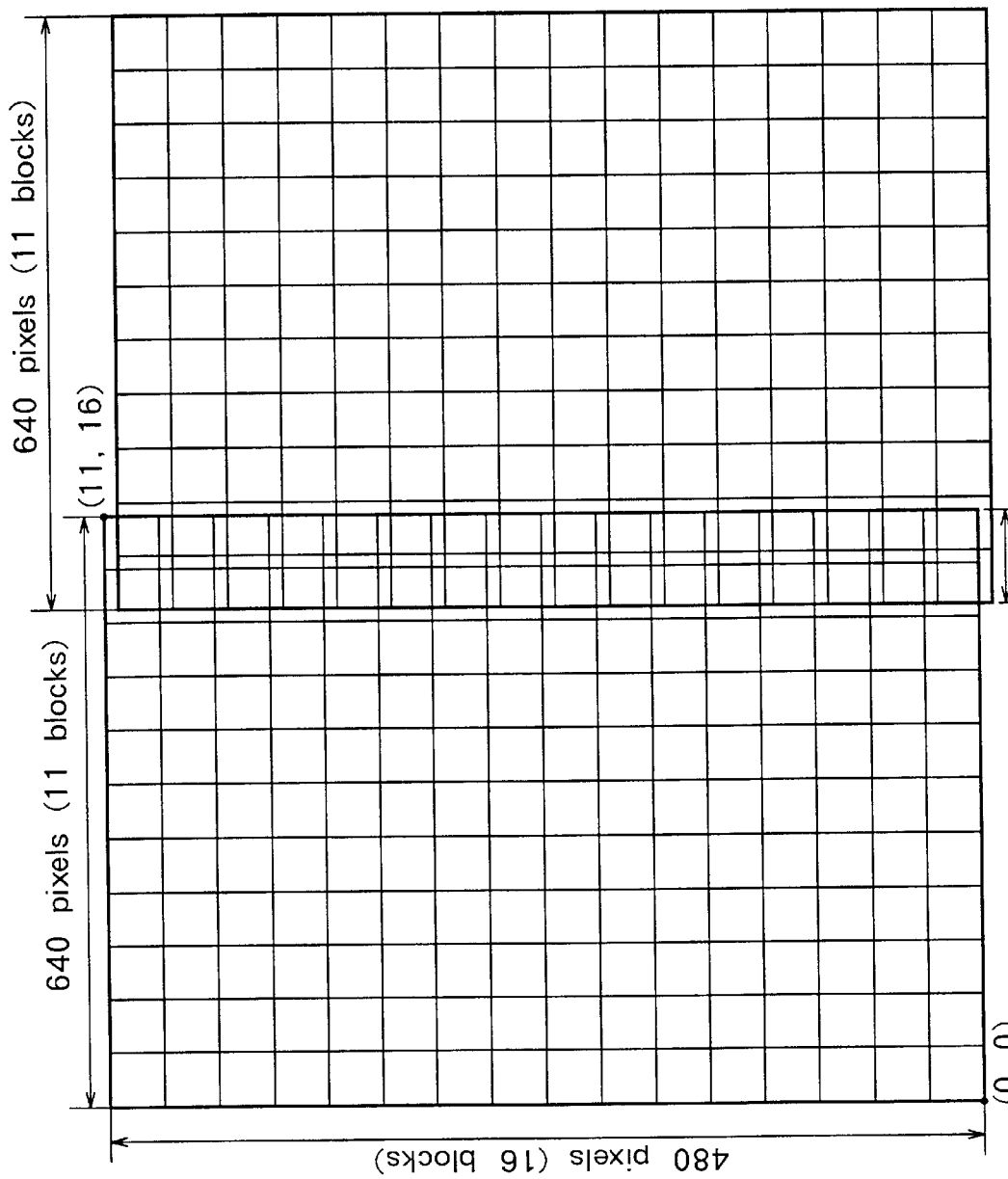

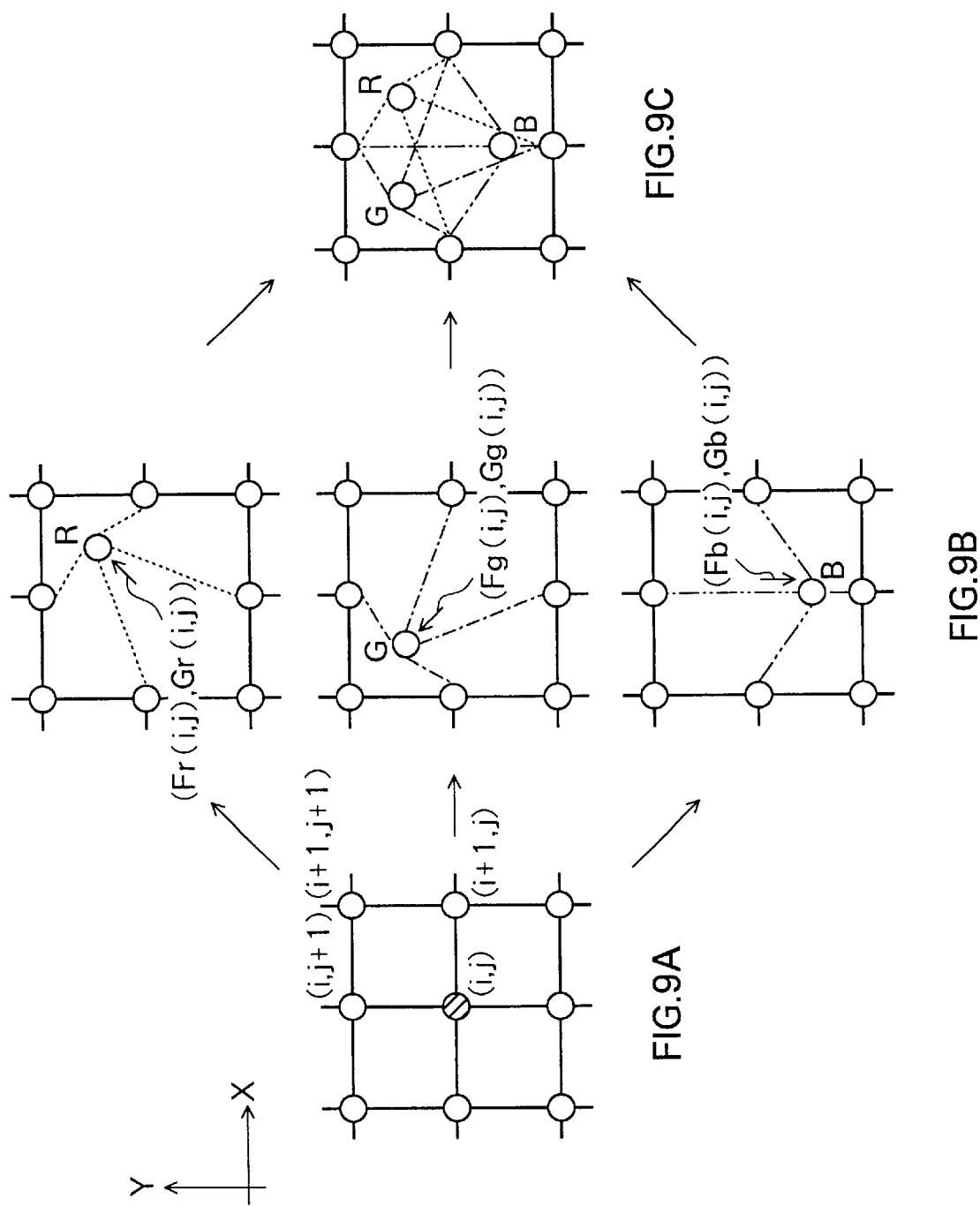

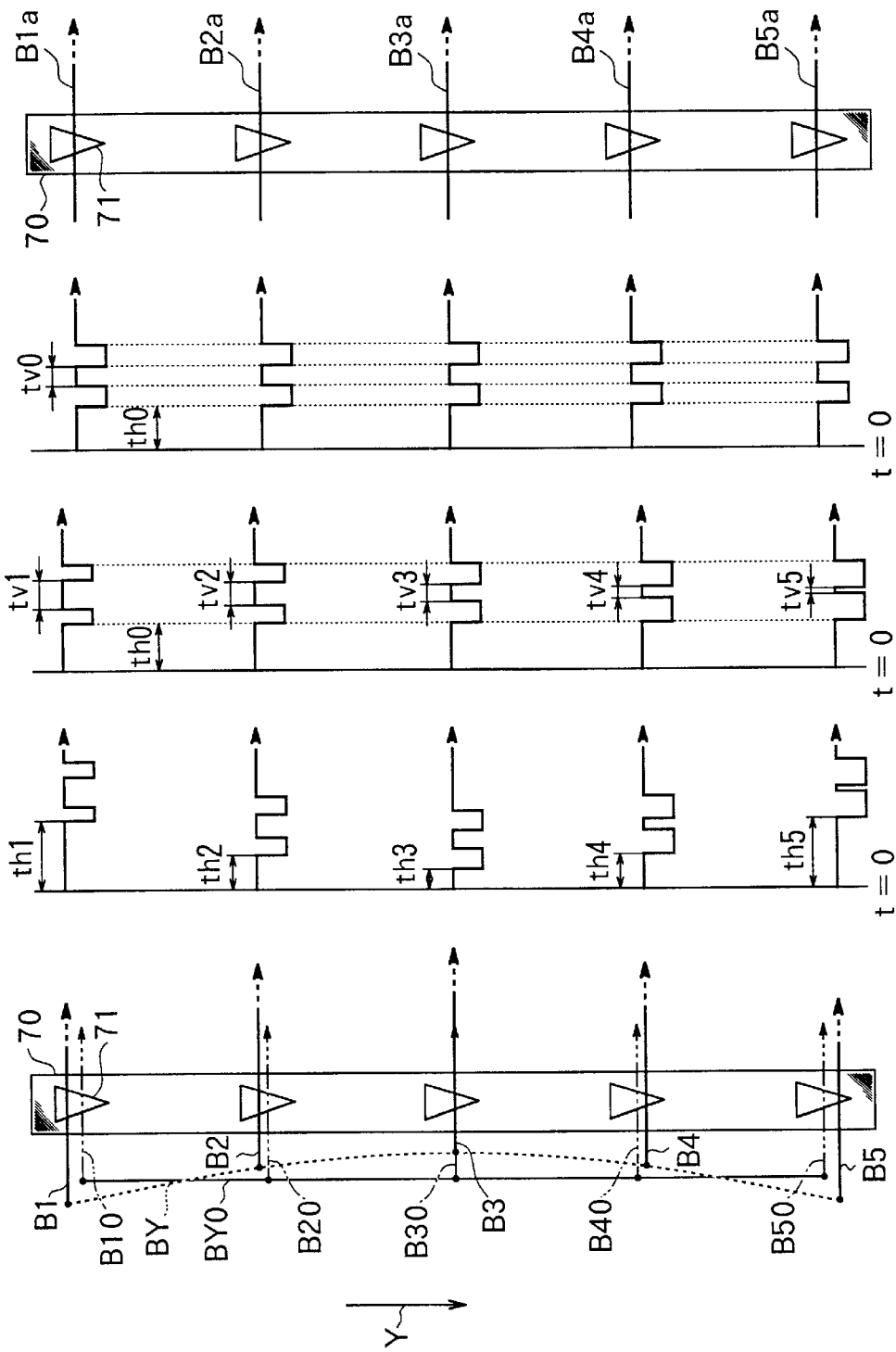

IMAGE CONTROL DEVICE AND METHOD, AND IMAGE DISPLAY DEVICE

BACKGROUND OF THE INVENTION

1. Field of the Invention

The present invention relates to an image display device, specifically an image display device which produces an image by joining a plurality of divided frames to generate a single frame. The present invention also relates to an image control device and method for correcting an image displayed on the image display device.

2. Description of the Related Art

Cathode ray tubes (CRTs) are widely used in image display devices such as television receivers or computer monitors. Inside a cathode ray tube (hereinafter also simply referred to as "inside the tube"), provided are an electron gun and a fluorescent screen. The electron gun produces an electron beam emitted toward the fluorescent screen. The electron beam scans to form a scanned image.

A cathode ray tube generally has a single electron gun. In recent years, however, a multiple-gun cathode ray tube, comprising two or more electron guns, has been developed. A multiple-gun cathode ray tube produces an image as follows. Each of the electron guns produces its own electron beam, and a plurality of divided frames are generated. The divided frames are joined to form a single frame. The related art concerning multiple-gun cathode ray tubes is disclosed in, for example, Publication of Examined Japanese Utility Model Application No. Sho 39-25641, Publication of Examined Japanese Patent Application No. Sho 42-4928 and Publication of Unexamined Japanese Patent Application No. Sho 50-17167. A multiple-gun cathode ray tube has several advantages of a smaller depth dimension and a larger screen, as compared to a single-gun cathode ray tube.

When joining a plurality of divided frames to generate a single frame in a multiple-gun cathode ray tube, it is desirable that the joint area of the divided frames is as inconspicuous as possible. The related art is, however, insufficient for making the joint area of the divided frames inconspicuous. Thus, there is a problem that high picture quality cannot always achieved throughout the entire screen of a multiple-gun cathode ray tube.

A cathode ray tube for displaying color images produces electron beams for a set of primary colors for color display. The electron beams for their respective colors are influenced by different magnetic fields from color to color and may fail to converge. However, in order to reproduce input signals accurately on the screen, the electron beams for respective colors have to converge on the screen. Such a phenomenon in which the positions where the electron beams strike the screen are deviated from each other is called misconvergence.

Since a screen of a cathode ray tube is generally rectangular, the distance traveled by the electron beam reaching the screen is the longest at each four corner of the screen. An image displayed on a screen of a cathode ray tube, therefore, usually appears distorted in a form of pincushion. Such distortion of an image is called "image distortion".

The related art practice followed in minimizing image distortion is to optimize a deflection magnetic field generated by a deflection yoke. In recent years, however, image display devices have greater aspect ratios and flatter screens. This makes it impossible to correct image distortion completely only by a deflection magnetic field generated by a deflection yoke. There are several methods to correct image distortion which remains uncorrected by a deflection yoke. One example is to modulate a deflection current fed to a deflection yoke. But this method of modulating a deflection current requires an additional circuit for modulation, which causes a problem of cost increase.

Correction for misconvergence is made in a manner basically similar to the case of image distortion. That is, the electron beams for their respective colors are designed to converge throughout the entire screen by means of distribution of deflection magnetic fields generated by a deflection yoke itself. As in the case of image distortion, however, it is difficult to correct misconvergence completely only by distribution of magnetic fields.

The related art practice followed in correcting misconvergence which remains uncorrected by a deflection yoke is to move the electron beams for their respective colors separately by using an additional correction subyoke separate from a deflection yoke, thereby converging the electron beams accurately. This method requires not only a subyoke but an additional circuit for driving the subyoke, resulting in an increase in cost of manufacturing.

As described above, the related art adopts the method of correcting image distortion or misconvergence by using deflection magnetic fields. Adjustments for correction by using deflection magnetic fields involve spreading an image repeatedly to the entire screen in each of the horizontal direction and the vertical direction. This method therefore has some other undesirable aspects such as low worker efficiency and variations according to worker, which makes it difficult to effect optimal adjustment of image distortion constantly.

Moreover, eliminating image distortion or misconvergence by using a deflection yoke also involves distorting deflection magnetic fields forcedly, which results in non-uniform magnetic fields. The distorted magnetic fields cause deterioration in focusing characteristics such as spotsize of an electron beam, resulting in deterioration in resolution.

The description given above has been made concerning the problems common to cathode ray tubes, such as image distortion, misconvergence and correction therefor. In the case of multiple-gun cathode ray tubes, these problems further influence precision in joining a plurality of divided frames. It is therefore desirable that, in the case of multiple-gun cathode ray tubes, image distortion or misconvergence is properly corrected and a plurality of divided frames are joined accurately so that the joint areas of the divided frames are inconspicuous.

Furthermore, cathode ray tubes are under influences of terrestrial magnetism or others. The influences of terrestrial magnetism or others vary according to the area of use and also cause image distortion. Image distortion due to terrestrial magnetism also exerts an undesirable influence on the display of the joint areas of the divided frames in the case of multiple-gun cathode ray tubes. Multiple-gun cathode ray tubes of the related art, however, are insufficient for display control of the joint areas in consideration of the area of use.

Lastly, image display performance of a cathode ray tube also deteriorates due to change of processing circuits such as a deflection circuit with time. Multiple-gun cathode ray tubes of the related art are also insufficient for display control of the joint areas in consideration of change with time.

SUMMARY OF THE INVENTION

The present invention has been made to overcome the foregoing problems. An object of the present invention is to provide an image control device and method, and image display device, capable of producing an image of high quality and joining a plurality of divided frames with the joint areas being inconspicuous in view of both position and luminance.

An image control device according to a first aspect of the present invention is provided for correcting an image produced on an image display device which produces an image based on a picture signal inputted unidimensionally, and joins a plurality of divided frames to generate a single frame. The image control device comprises: first converting means for converting a picture signal inputted unidimensionally to the image display device to discrete two-dimensional image data; first operating means for performing an operation for correcting horizontally an array of pixels in the two-dimensional image data, so that the divided frames are joined properly in position in the horizontal direction and displayed when the image display device produces an image; and means for storing image data for storing, in the order of write address, the image data outputted from the first operating means, the means for storing image data capable of reading the stored image data in the same order as the order of write address or in the order different from the order of write address. The image control device further comprises: means for generating an address for generating a write address for image data with respect to the means for storing image data, the means for generating an address capable of generating a read address for the image data stored in the means for storing image data in the same order as the order of write address or in the order different from the order or write address; second operating means for performing an operation for correcting, vertically with respect to the original state of the image data, an array of pixels in the image data outputted from the means for storing image data, so that the divided frames are joined properly in position in the vertical direction and displayed when the image display device produces an image; and second converting means for converting the image data corrected in the second operating means to a picture signal for display on the image display device and outputting the picture signal.

An image control device according to a second aspect of the present invention is provided for correcting an image produced on an image display device which produces an image based on a picture signal inputted unidimensionally, and joins a plurality of divided frames to generate a single frame. The image control device comprises: means for position control for performing control in such a manner that a unidimensional picture signal inputted to the image display device is converted to discrete two-dimensional image data, and performing control in such a manner that an array of pixels in the image data is corrected so that the divided frames are joined properly in position and displayed when the image display device produces an image; means for luminance control for performing control in such a manner that, after the position correction is made in the means for position control, the image data is corrected in luminance, independently of the position correction, so that the divided frames are joined properly in luminance and displayed; and converting means for converting the image data corrected in luminance in the means for luminance control to a picture signal for display on the image display device and outputting the picture signal.

An image control method according to the first aspect of the present invention is provided for correcting an image produced on an image display device which produces an image based on a picture signal inputted unidimensionally, and joins a plurality of divided frames to generate a single frame. The image control method involves: converting a unidimensional picture signal inputted to the image display device into discrete two-dimensional image data; performing an operation for correcting horizontally an array of pixels in the two-dimensional image data, so that the divided frames are joined properly in position in the horizontal direction and displayed when the image display device produces an image; and storing, in the order of write address, the horizontally corrected image data on means for storing image data. The image control method further involves; reading the stored image data in the same order as the order of write address or in the order different from the order of write address; performing an operation for correcting, vertically with respect to the original state of the image data, an array of pixels in the image data outputted from the means for storing image data, so that the divided frames are joined properly in position in the vertical direction and displayed when the image display device produces an image; and converting the vertically corrected image data to a picture signal for display on the image display device and outputting the picture signal.

An image control method according to the second aspect of the present invention is provided for correcting an image produced on an image display device which produces an image based on a picture signal inputted unidimensionally, and joins a plurality of divided frames to generate a single frame. The image control method involves: performing control in such a manner that a unidimensional picture signal inputted to the image display device is converted to discrete two-dimensional image data, and performing control in such a manner that an array of pixels in the image data is corrected in position so that the divided frames are joined properly in position and displayed when the image display device produces an image; performing control in such a manner that, after the position correction is made, the image data is corrected in luminance, independently of the position correction, so that the divided frames are joined properly in luminance and displayed; and converting the image data corrected in luminance to a picture signal for display on the image display device and outputting the picture signal.

An image display device according to the first aspect of the present invention produces an image based on a picture signal inputted unidimensionally, and joins a plurality of divided frames to generate a single frame. The image display device comprises: first converting means for converting a unidimensional picture signal inputted to the image display device to discrete two-dimensional image data; first operating means for performing an operation for correcting horizontally an array of pixels in the two-dimensional image data, so that the divided frames are joined properly in position in the horizontal direction and displayed when the image display device produces an image; and means for storing image data for storing, in the order of write address, the image data outputted from the first operating means, the means for storing image data capable of reading the stored image data in the same order as the order of write address or in the order different from the order of write address. The image display device further comprises: means for generating an address for generating a write address for image data with respect to the means for storing image data, the means for generating an address capable of generating a read address for the image data stored in the means for storing image data in the same order as the order of write address or in the order different from the order or write address; second operating means for performing an operation for correcting, vertically with respect to the original state of the image data, an array of pixels in the image data outputted from the means for storing image data, so that the divided frames are joined properly in position in the vertical direction and displayed when the image display device produces an image; second converting means for converting the image data corrected in the second operating means to a picture signal for display on the image display device and outputting the picture signal; and image display means for displaying an image based on the picture signal for display outputted from the second converting means.

An image display device according to the second aspect of the present invention produces an image based on a picture signal inputted unidimensionally, and joins a plurality of divided frames to generate a single frame. The image display device comprises: means for position control for performing control in such a manner that a unidimensional picture signal inputted to the image display device is converted to discrete two-dimensional image data, and performing control in such a manner that an array of pixels in the image data is corrected so that the divided frames are joined properly in position and displayed when the image display device produces an image; means for luminance control for performing control in such a manner that, after the position correction is made in the means for position control, the image data is corrected in luminance, independently of the position correction, so that the divided frames are joined properly in luminance and displayed; converting means for converting the image data corrected in luminance in the means for luminance control to a picture signal for display on the image display device and outputting the picture signal; and image display means for displaying an image based on the picture signal for display outputted from the converting means.

In the image control device and method, and in the image display device according to a first aspect of the present invention, performed is an operation for correcting horizontally an array of pixels in the two-dimensional image data, so that a plurality of divided frames are joined properly in position in the horizontal direction and displayed. The horizontally corrected image data is stored, in the order of write address, on the means for storing image data. The stored image data is read in the same order as the order of write address or in the order different from the order of write address. Then, performed is an operation for correcting, vertically with respect to the original state of the image data, an array of pixels in the image data outputted from the means for storing image data, so that the divided frames are joined properly in position in the vertical direction and displayed. In the image control device and method, and in the image display device according to the first aspect of the present invention, an operation for correcting image data is performed mainly based on correction data obtained from an image displayed on a screen, for correcting the status of display of the image. The first aspect of the present invention does not involve correcting image data based on electron beam detecting means.

In the image control device and method, and in the image display device according to the second aspect of the present invention, position control is effected over image data so that a plurality of divided frames are joined properly in position and displayed. After the position correction is made, the image data is corrected in luminance independently of the position correction, so that the divided frames are joined properly in luminance. A main application of the image control device and method, and the image display device according to the second aspect of the present invention is a cathode ray tube which comprises: a plurality of electron guns which emit a plurality of electron beams for scanning an available picture area and an over-scan area outside the available picture area; and electron beam detecting means which is provided in the over-scan area on the side of the joint area of the adjacent divided frames and outputs light or an electrical signal in response to the incident electron beam. In the second aspect of the present invention, the means for position control performs control for correcting the image data using second correction data obtained based on the light or the electrical signal outputted from the electron beam detecting means in addition to the first correction data obtained from an image displayed on a screen for correcting the status of display of the image.

Other and further objects, features and advantages of the invention will appear more fully from the following description.

BRIEF DESCRIPTION OF THE DRAWINGS

FIGS. 5A to 5E are diagrams for illustrating an example of an operation performed in the signal processing circuit according to the first example with respect to image data for generating a left divided frame.

FIGS. 6A to 6E are diagrams for illustrating an example of an operation performed in the signal processing circuit according to the first example with respect to image data for generating a right divided frame.

FIG. 8 is a diagram of an example of the display on a fluorescent screen of the reference image corrected in the signal processing circuit according to the first example.

FIGS. 9A to 9C are schematic diagrams illustrating correction data used in the signal processing circuit according to the first example.

FIG. 22A to 22E are diagrams illustrating the configuration of the index electrode in the cathode ray tube according to the first example, and an operation of position detection using the index electrode.

DETAILED DESCRIPTION OF THE PREFERRED EMBODIMENTS

Preferred embodiments of the invention will be described in detail below with reference to the drawings.

First Embodiment

Figure 1:
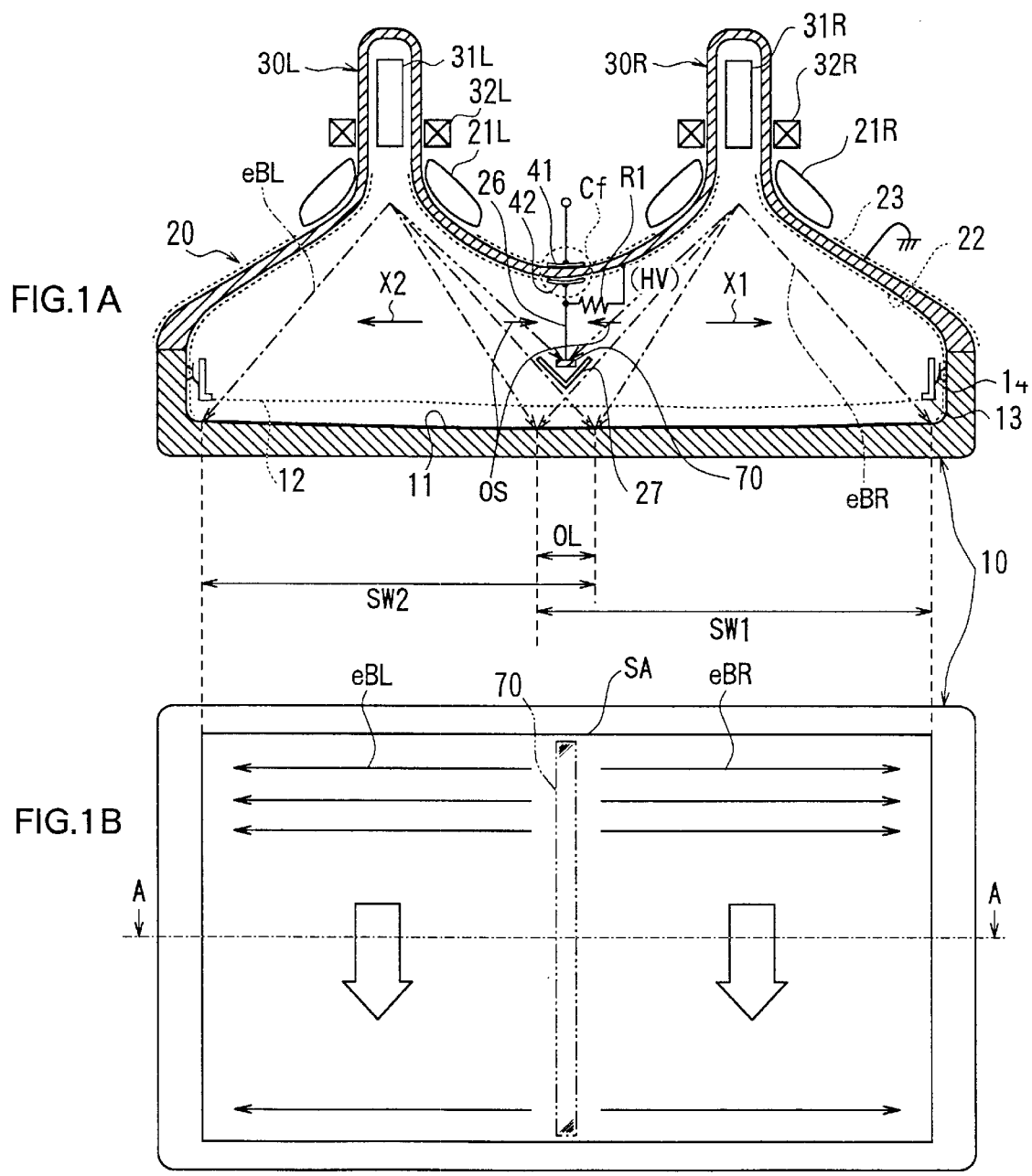
FIG. 1A is a sectional view taken along the line A—A of FIG. 1B of a cathode ray tube as an image display device according to a first example.
FIG. 1B is a front view showing the scan direction of electron beams in the cathode ray tube according to a first example.

As shown in FIGS. 1A and 1B, a cathode ray tube according to the embodiment comprises a panel 10 and a funnel 20. Inside the panel 10 provided is a phosphor screen 11. The funnel 20 is formed integrally with the panel 10. Two long-and-narrow-shaped necks 30L and 30R are formed on the left and right sides of the rear-end portion of the funnel 20, respectively. Electron guns 31L and 31R are incorporated in the necks 30L and 30R, respectively. The cathode ray tube takes a double-funnel-shaped figure as a whole, which is formed by the panel 10, the funnel 20 and the necks 30L and 30R. In the following, the outer portion forming the cathode ray tube is also called "an outer casing".

The openings of the panel 10 and the funnel 20 are fused to each other, and therefore the panel 10 and the funnel 20 are capable of keeping the inside thereof in a high-vacuum condition. The phosphor screen 11 has a striped pattern (not shown) made of phosphor.

Mainly, the phosphor screen 11 corresponds to a specific example of "image display means" of the present invention.

Inside the cathode ray tube, a color selection member 12 made of a thin metal plate is positioned facing the phosphor screen 11. The periphery of the color selection member 12 is supported by a frame 13 and is installed on the inside surface of the panel 10 with a supporting spring 14 in between. An anode (not shown) for applying anode voltage HV is provided in the funnel 20.

In the peripheral portion extending from the funnel 20 to each of the necks 30L and 30R, installed are deflection yokes 21L and 21R, and convergence yokes 32L and 32R. The deflection yokes 21L and 21R deflect electron beams eBL and eBR emitted from the electron guns 31L and 31R respectively. The convergence yokes 32L and 32R converge the electron beams for their respective colors emitted from each of the electron guns 31L and 31R. The inside surface extending from the neck 30 to the phosphor screen 11 of the panel 10 is covered with an inside conductive film 22. The inside conductive film 22 is electrically connected to the anode (not shown) and is kept to the anode voltage HV. The peripheral surface of the funnel 20 is covered with an outside conductive film 23.

The electron guns 31L and 31R each have a configuration (not shown) in which a plurality of electrodes (grids) are arranged in the front portion of a hot-cathode structure. The hot-cathode structure comprises three cathodes (hot cathodes) for Red (R), Green (G) and Blue (B). Each cathode in the electron guns 31L and 31R produces the electron beams eBL and eBR, which are controlled, accelerated and the like by the respective electrodes. Each of the electron beams for their respective colors emitted from the electron guns 31L and 31R passes through the color selection member 12 and the like, and strikes its intended color phosphor of the phosphor screen 11.

In the cathode ray tube of the embodiment, the electron beam eBL from the electron gun 31L provided on the left side produces an image on the left half of the screen. On the other hand, the electron beam eBR from the electron gun 31R provided on the right side produces an image on the right half of the screen. Thus, left and right divided frames are generated. The left and right divided frames are joined with the edges thereof overlapping each other, thereby generating a single frame SA to display an image. Accordingly, the center portion of the frame SA becomes an overlap region OL in which the left and right divided frames partially overlap each other. The phosphor screen 11 in the overlap region OL is commonly scanned by both of the electron beams eBL and eBR.

In the embodiment, line scanning of the electron beam eBL from the electron gun 31L is performed in the direction of horizontal deflection from right to left (an X2 direction in FIG. 1A), and field scanning is performed in the direction of vertical deflection from top to bottom. On the other hand, line scanning of the electron beam eBR from the electron gun 31R is performed in the direction of horizontal deflection from left to right (an X1 direction in FIG. 1A), and field scanning is performed in the direction of vertical deflection from top to bottom.

Inside the cathode ray tube, an index electrode 70 shaped like a rectangular flat plate is provided in a position facing the phosphor screen 11 in an over-scan region OS of the electron beams eBL and eBR on the side of the joint area (in the embodiment, the center of the entire screen) of the left and right divided frames adjacent to each other. In addition, a V-shaped beam shield 27 as a shielding member of the electron beams eBL and eBR is provided between the index electrode 70 and the phosphor screen 11. The purpose of the beam shield 27 is to prevent the electron beams eBL and eBR which have over-scanned the over-scan region OS from reaching the phosphor screen 11 to allow the phosphor screen 11 to emit light accidentally. The beam shield 27 is provided using, for example, the frame 13, which supports the color selection member 12, as a base. The beam shield 27 is electrically connected to the inside conductive film 22 through the frame 13, thereby maintained at the anode voltage HV.

In the index electrode 70, a plurality of notches 71, each of which is shaped like an inverted delta, are equally spaced in a longitudinal direction as shown in FIG. 22A. The index electrode 70 outputs electrical detection signals in response to the incident electron beams eBL and eBR. The detection signals outputted from the index electrode 70 are inputted to a processing circuit for image correction outside the cathode ray tube (hereinafter simply referred to as 'outside the tube'). The detection signals inputted thereto is used mainly for control of image data regarding the joint area of the left and right divided frames generated by the electron beams eBL and eBR respectively.

The index electrode 70 corresponds to a specific example of "electron beam detecting means" of the present invention.

In the embodiment, the over-scan region refers to the outer region of the region where the electron beam eBL or eBR scans to form the available picture area, in the entire region where the electron beam eBL or eBR scans. In FIGS. 1A and 1B, a region SW1 is the available picture area in the horizontal direction on the phosphor screen 11 with respect to the electron beam eBR. A region SW2 is the available picture area in the horizontal direction on the phosphor screen 11 with respect to the electron beam eBL.

The index electrode 70 is made of a conductive substance such as metal and is provided, for example, using the frame 13 as a base with an insulator (not shown) in between. The index electrode 70, electrically connected to a resistor R1 connected to the inside surface of the funnel 20, is supplied with the anode voltage HV through the inside conductive film 22, the resistor R1 or others. The index electrode 70 is also electrically connected to an electrode 42 on the inner side of the tube of a capacitor Cf through a lead wire 26. The capacitor Cf is formed as follows, using a part of the funnel 20. In the funnel 20, provided is an area (for example, a circular area) where the funnel 20 is uncovered with the inside conductive film 22 or the outside conductive film 23. Within this area, for example, circular electrodes 41 and 42 are arranged to face each other with the funnel 20 in between.

Figure 2:
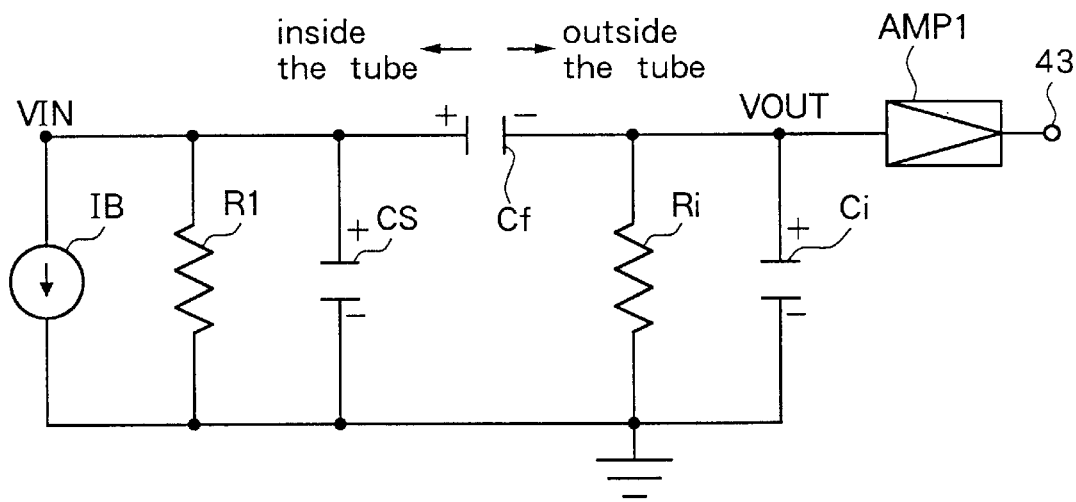
FIG. 2 is a circuit diagram showing an equivalent circuit formed by circuit elements arranged around an index electrode in the cathode ray tube according to the first example.

FIG. 2 is a circuit diagram showing an equivalent circuit of a circuit formed by circuit elements arranged around the index electrode 70. The electrode 41 on the outer side of the tube of the capacitor Cf is connected to an amplifier AMP1 for amplifying signals. Input resistance Ri and input capacitance Ci of the amplifier AMP1 are connected between the electrode 41 of the capacitor Cf and the amplifier AMP1. One end of the input resistance Ri and the input capacitance Ci is grounded. Inside the tube, stray capacitance Cs is generated between the index electrode 70 and the beam shield 27, the inside conductive film 22 or the like, which are kept to the anode voltage HV.

In the equivalent circuit shown in FIG. 2, a current source IB, the resistor R1, the stray capacitance Cs, the input resistance Ri and the input capacitance Ci are connected in parallel in the order named. The capacitor Cf is connected between the stray capacitance Cs and the input resistance Ri. The plus electrode of the capacitor Cf is connected to the current source IB, the resistor R1 and the plus side of the stray capacitance Cs. The minus electrode of the capacitor Cf is connected to the input resistance Ri and the plus side of the input capacitance Ci while being connected to the amplifier AMP1.

When the electron beams eBL and eBR over-scan to be incident upon and strike the index electrode 70, the potential of the index electrode 70 drops down from the anode voltage HV (V) by Ib×R (V), wherein Ib represents a value of the current generated by the flow of the electron beams eBL and eBR. In the embodiment, the signal whose voltage has dropped is led out of the tube as a detection signal via the capacitor Cf. While the electron beams eBL and eBR function by scanning across the cathode ray tube, the index electrode 70 in the embodiment is provided in a specific part inside the tube. Thus, the signal generated by the electron beams being incident on and striking the index electrode 70 is an intermittent signal. The detection signal from the index electrode 70, therefore, does not have to be transmitted by direct-current coupling. Instead, the signal can be led through a transmission path using alternating-current coupling via the capacitor Cf, and supplied to the processing circuit for image correction outside the tube.

A dielectric of the capacitor Cf utilizes a glass material constituting the funnel 20 which is one of the outer casings forming the cathode ray tube. The relative dielectric constant $\chi$ of the glass material used for the funnel 20 is generally about 6.0. Let the thickness of the glass as the dielectric of the capacitor Cf be 5 mm and the area of each of the electrodes 41 and 42 be 4 cm$^2$. Then, the permittivity of vacuum $\in_0$ is $8.85 \times 10^{-12}$ [C/Vm]. On the other hand, the electrostatic capacity C of the capacitor Cf is given by: $C = \chi \in_0 S/d$. Therefore, the electrostatic capacity C of the capacitor Cf equals to 4.25 pF. As will be described later, even such small capacity is sufficient for processing in the processing circuit for image correction outside the tube.

Figure 3:
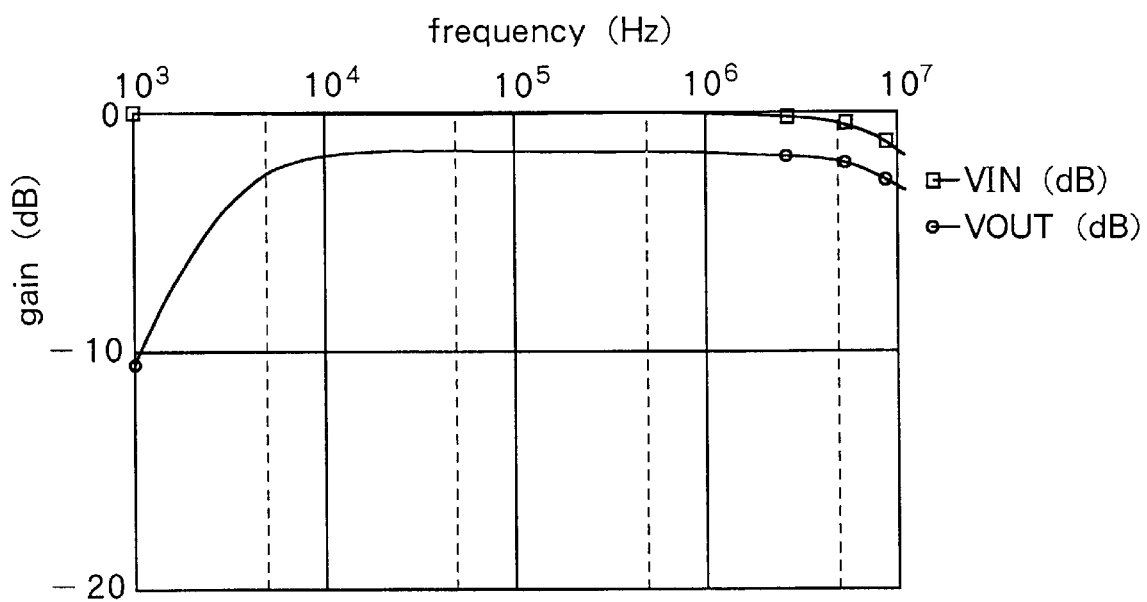
FIG. 3 is a characteristic diagram showing a frequency characteristic of the circuit around the index electrode in the cathode ray tube according to the first example.

Reference is now made to FIG. 3, explaining circuit characteristics in a signal path of the detection signal from the index electrode 70. A characteristic graph of FIG. 3 is obtained with specific characteristic values of the circuit elements in the equivalent circuit shown in FIG. 2 set as follows: the resistance of the resistor R1 is 1 kΩ; the value of the stray capacitance Cs is 10 pF; the capacity of the capacitor Cf is 5 pF; the value of the input resistance Ri is 10 MΩ; and the value of the input capacitance C1 is 1 pF. From the characteristic graph, the following is evident. First, a signal voltage VIN generated in the index electrode 70 starts to fall in a high-frequency band of several MHz or more. This results from a shunt effect by the capacitance Cs. Next, the low-frequency characteristic of an output voltage VOUT inputted to the amplifier AMP1 is controlled by the cutoff frequency of a high-pass filter comprised of the capacitor Cf and the input resistance Ri. At intermediate frequencies (10 kHz) or higher, the ratio between the output voltage VOUT and the signal voltage VIN generated in the index electrode 70 is controlled by the divided-voltage ratio between the capacitor Cf and the input capacitance Ci. In this specific example, signal detection with almost flat frequency characteristic can be performed from several kHz to about 10 MHz. Scan frequency in a common cathode ray tube lies within the range of from several kHz to hundreds of kHz so that the frequency characteristic obtained in the example is sufficient for the circuit for signal detection.

Figure 4:
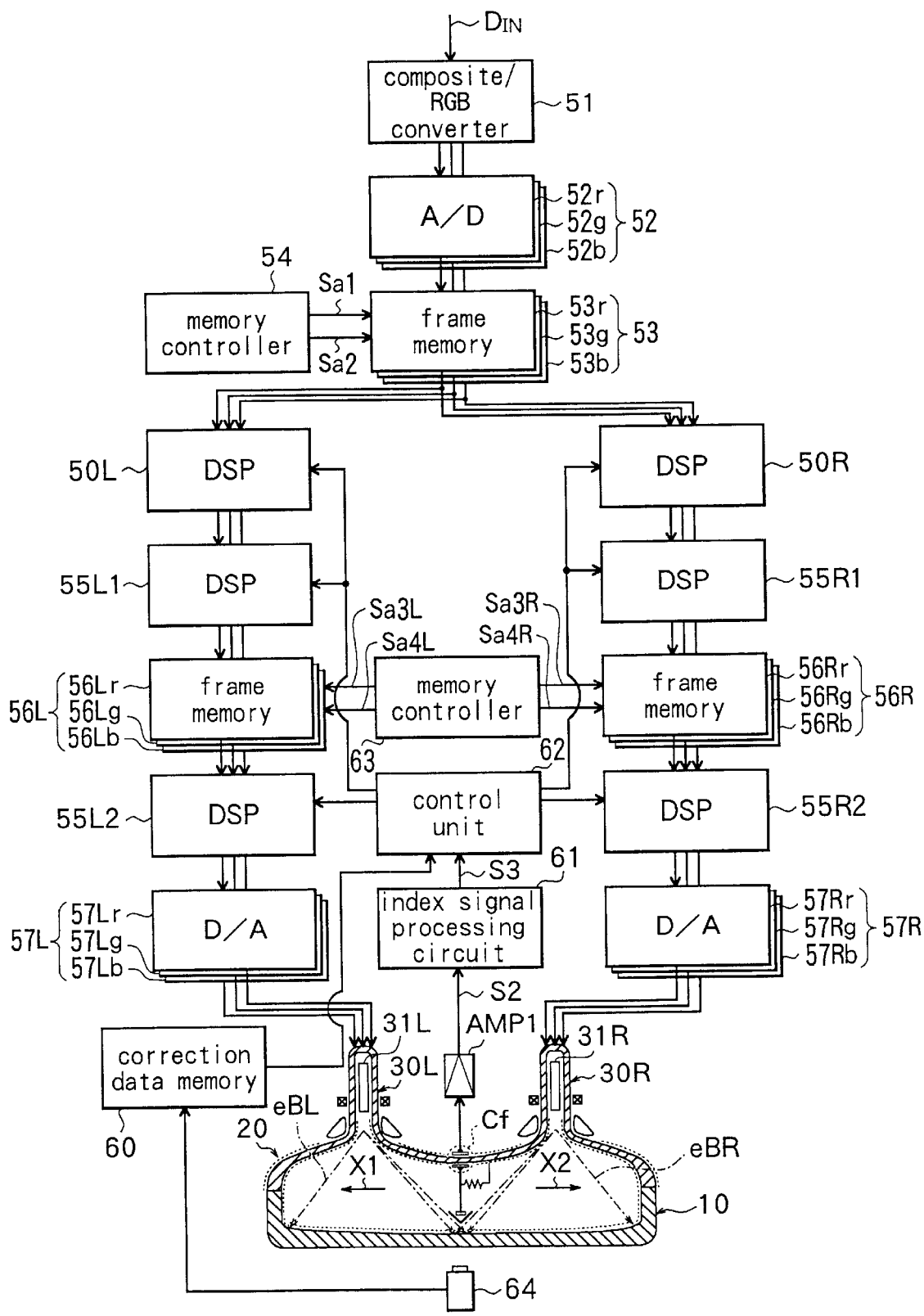
FIG. 4 is a block diagram showing a signal processing circuit in the cathode ray tube according to the first example.

FIG. 4 shows an example of a circuit for inputting an analog composite signal in conformity with NTSC (National Television System Committee) as an image signal (picture signal) $D_{IN}$ and then displaying a moving image corresponding to the input signal. A signal processing circuit shown in FIG. 4 corresponds to a specific example of "an image control device" of the invention. FIG. 4 shows only a circuit portion relevant to the present invention, with other processing circuits omitted.

The cathode ray tube according to the embodiment comprises: a composite/RGB converter 51; an analog/digital signal (hereinafter referred to as "A/D") converter 52 (52r, 52g and 52b); a frame memory 53 (53r, 53g and 53b); and a memory controller 54. The composite/RGB converter 51 converts the analog composite signal one-dimensionally inputted as the image signal $D_{IN}$ to a signal for each color R, G and B and then outputs an analog signal. The A/D converter 52 (52r, 52g and 52b) converts the analog signal for each color outputted from the composite/RGB converter 51 to a digital signal and then outputs the digital signal. The frame memory 53 (53r, 53g and 53b) stores two-dimensionally the digital signal outputted from the A/D converter 52 in a unit of frame for each color. The memory controller 54 generates a write address and a read address of image data on/from the frame memory 53. For example, SDRAM (Synchronous Dynamic Random Access Memory) or the like is used as the frame memory 53.

The cathode ray tube according to the embodiment further comprises: a DSP (digital signal processor) circuit 50L, a DSP circuit 55L1, a frame memory 56L (56Lr, 56Lg and 56Lb), a DSP circuit 55L2 and a digital/analog signal (hereinafter referred to as "D/A") converter 57L (57Lr, 57Lg and 57Lb) for controlling the image data for the left divided frame among the image data for each color stored in the frame memory 53; and a DSP circuit 50R, a DSP circuit 55R1, a frame memory 56R (56Rr, 56Rg and 56Rb), a DSP circuit 55R2 and a D/A converter 57R (57Rr, 57Rg and 57Rb) for controlling the image data for the right divided frame among the image data for each color stored in the frame memory 53. The DSP circuits 50L and 50R are circuits for luminance correction provided mainly for luminance correction. On the other hand, the other DSP circuits 55L1, 55L2, 55R1 and 55R2 (hereinafter, these four DSP circuits are also generically called "a DSP circuit 55") are circuits for position correction provided mainly for position correction.

Mainly, the DSP circuit 55L1 and the DSP circuit 55R1 correspond to a specific example of "first operating means" of the invention, and the DSP circuit 55L2 and the DSP circuit 55R2 correspond to a specific example of "second operating means" of the invention. Mainly, the frame memories 56L and 56R correspond to a specific example of "means for storing image data" of the invention.

The cathode ray tube according to the embodiment further comprises: a correction data memory 60; an index signal processing circuit 61; a control unit 62; and a memory controller 63. The correction data memory 60 stores correction data for each color for correcting a status of image display. The index signal processing circuit 61 is supplied with an index signal S2 outputted from the amplifier AMP1, analyzes a scan position of the electron beams eBL and eBR or the like in accordance with the input index signal S2 and then outputs data S3 indicating the result of analysis. The control unit 62 is supplied with the data S3 indicating the result of analysis from the index signal processing circuit 61 and the correction data from the correction data memory 60, and gives instructions on an operation method to the DSP circuits 50L and 50R for luminance correction and the DSP circuit 55 for position correction. The memory controller 63 generates the write address and the read address of image data on/from the frame memories 56L and 56R.

The frame memories 53, 56L and 56R, the memory controllers 54 and 63, the DSP circuits 55L1, 55L2, 55R1 and 55R2 for position correction, the index signal processing circuit 61 and the control unit 62 correspond to a specific example of "control means" of the invention. The DSP circuits 50L and 50R for luminance correction, the index signal processing circuit 61 and the control unit 62 correspond to a specific example of "means for luminance control" of the invention. The correction data memory 60 corresponds to a specific example of "means for storing correction data" of the invention. The memory controller 63 corresponds to a specific example of "means for generating an address" of the invention. The frame memories 56L and 56R and the memory controller 63 correspond to a specific example of "converting means" of the invention.

The index signal S2 is a signal corresponding to the detection signal from the index electrode 70.

The correction data memory 60 has a memory area for each color and stores correction data for each color in each memory area. The correction data to be stored in the correction data memory 60 is created in order to correct image distortion or the like in an initial status of the cathode ray tube during manufacturing of the cathode ray tube, for example. The correction data is created by measuring the magnitude of image distortion of the image displayed in the cathode ray tube, the magnitude of misconvergence and so on. A device for creating the correction data comprises, for example, an image pickup apparatus 64 for picking up the image displayed in the cathode ray tube; and correction data creating means (not shown) for creating the correction data based on the image picked up by the image pickup apparatus 64. The image pickup apparatus 64 includes, for example, an image pickup device such as CCD (charge coupled device). The image pickup apparatus 64 picks up a display image displayed on a screen of the cathode ray tube for each color R, G and B and outputs the picked-up image as the image data for each color. The correction data creating means comprises a microcomputer and the like. The correction data creating means creates, as the correction data, data on the magnitude of displacement of each pixel of discrete two-dimensional image data, which represents the image picked up by the image pickup apparatus 64, from an appropriate display position.

The DSP circuits 50L and 50R for luminance correction and the DSP circuit 55 (55L1, 55L2, 55R1 and 55R2) for position correction each comprise, for example, general-purpose LSI (large-scale integrated circuit) formed into one chip, or the like. The DSP circuits 50L and 50R and the DSP circuit 55 perform various types of operations for input image data in accordance with instructions from the control unit 62 in order to correct luminance in the overlap region OL and to correct image distortion and misconvergence of the cathode ray tube. The control unit 62 give instructions on the operation method to each of the DSP circuits 50L and 50R and the DSP circuit 55, based on the correction data stored in the correction data memory 60 and data for correction obtained by analyzing the detection signal from the index electrode 70.

The DSP circuit 50L applies mainly luminance correction to the image data for the left divided frame among the image data for each color stored in the frame memory 53 and then outputs the corrected image data for each color to the DSP circuit 55L1. The DSP circuit 55L1 applies mainly position correction in the horizontal direction to the image data for each color outputted from the DSP circuit 50L and then outputs the result of correction for each color to the frame memory 56L. The DSP circuit 55L2 applies mainly position correction in the vertical direction to the image data for each color stored in the frame memory 56L and then outputs the result of correction for each color to the D/A converter 57L.

The DSP circuit 50R applies mainly luminance correction to the image data for the right divided frame among the image data for each color stored in the frame memory 53 and then outputs the corrected image data for each color to the DSP circuit 55R1. The DSP circuit 55R1 applies mainly position correction in the horizontal direction to the image data for each color outputted from the DSP circuit 50R and then outputs the result of correction for each color to the frame memory 56R. The DSP circuit 55R2 applies mainly position correction in the vertical direction to the image data for each color stored in the frame memory 56R and then outputs the result of correction for each color to the D/A converter 57R.

The D/A converters 57L and 57R convert the operated image data outputted from the DSP circuits 55L2 and 55R2 to the analog signal and then output the analog signal to the electron guns 31L and 31R.

The frame memories 56L and 56R store the operated image data outputted from the DSP circuits 55L1 and 55R1 in a unit of frame for each color and output the stored image data for each color. Each of the frame memories 56L and 56R is a memory capable of high-speed random access and comprises, for example, SRAM (Static RAM) or the like. If the frame memories 56L and 56R each comprise a single memory capable of high-speed random access, a frame passing operation occurs and thus image distortion occurs during the write and read operation of image data. Therefore, the frame memories 56L and 56R each comprise two memories (double buffer). The frame memories 56L and 56R perform the write operation of image data in accordance with the order of write address generated by the memory controller 63 and perform the read operation of image data in accordance with the order of read address generated by the memory controller 63.

The memory controller 63 can generate the write address of the image data on the frame memories 56L and 56R and generate the read address of the image data stored in the frame memories 56L and 56R in another order different from the order of the write address. In the embodiment, the read address and the write address can be thus generated so that the order of the read address differs from the order of the write address. Therefore, the image data being written on the frame memories 56L and 56R can be read with, for example, the rotation or inversion of the image. Thus, the image data outputted from the DSP circuits 55L1 and 55R1 can undergo appropriate image conversion so as to enter an image state suitable for the operation for vertical correction to be performed by the DSP circuits 55L2 and 55R2.

Next, operation of the cathode ray tube of the above-mentioned configuration will be described. The description given below includes description of an image control method of the embodiment.

The analog composite signal inputted as the image signal $D_{IN}$ is converted to an image signal for each color R, G and B by the composite/RGB converter 51 (see FIG. 4). The image signal is converted to a digital image signal for each color by the A/D converter 52. Preferably, IP (interlace progressive) conversion takes place because the following processing is facilitated. The digital image signal outputted from the A/D converter 52 is stored in the frame memory 53 in a unit of frame for each color in accordance with a control signal Sa1 indicating the write address generated by the memory controller 54. The image data stored in the frame memory 53 in a unit of frame is read in accordance with a control signal Sa2 indicating the read address generated by the memory controller 54, and then the image data is outputted to the DSP circuits 50L and 50R for luminance correction.

The image data for the left divided frame among the image data for each color stored in the frame memory 53 is subjected to the operation for correcting the image based on the correction data stored in the correction data memory 60 and the data for correction obtained by analyzing the detection signal from the index electrode 70 by workings of the DSP circuit 50L, the DSP circuit 55L1, the frame memory 56L and the DSP circuit 55L2. The operated image data for the left divided frame is converted to the analog signal through the D/A converter 57L, and then the analog signal is supplied as cathode drive voltage to a cathode (not shown) provided in the left electron gun 31L.

The image data for the right divided frame stored in the frame memory 53 is subjected to the operation for correcting the image based on the correction data stored in the correction data memory 60 and the data for correction obtained by analyzing the detection signal from the index electrode 70 by workings of the DSP circuit 50R, the DSP circuit 55R1, the frame memory 56R and the DSP circuit 55R2. The operated image data for the right divided frame is converted to the analog signal through the D/A converter 57R, and then the analog signal is supplied as cathode drive voltage to a cathode (not shown) provided in the right electron gun 31R.

The electron guns 31L and 31R project the electron beams eBL and eBR, respectively, in response to the supplied cathode drive voltage. The cathode ray tube of the embodiment is capable of color display. In practice, the cathode for each color R, G and B is provided in each of the electron guns 31L and 31R, and the electron beam for each color is projected from each of the electron guns 31L and 31R.

The electron beams eBL and eBR for each color projected from the electron guns 31L and 31R are converged by the electromagnetic action of the convergence yokes 32L and 32R, respectively, and are deflected by the electromagnetic action of the deflection yokes 21L and 21R, respectively. Thus, the electron beams scan the entire surface of the phosphor screen 11 and a desired image is displayed on the frame SA (see FIGS. 1A and 1B) on the surface of the panel 10. At this time, the left half of the screen are drawn by the electron beam eBL, while the right half of the screen are drawn by the electron beam eBR. The single frame SA is formed by joining the left and right divided frames with their ends partially overlapped.

When the electron beams eBL and eBR scan the over-scan region OS and are incident on and strike the index electrode 70, voltage drop occurs in the index electrode 70. The signal responsive to the voltage drop is led out of the tube as a detection signal via the capacitor Cf provided in the funnel 20, and the index signal S2 is outputted from the amplifier AMP1. The index signal processing circuit 61 analyzes the scan position of the electron beams eBL and eBR or the like based on the index signal S2 and then outputs the data S3 indicating the result of analysis to the control unit 62. The control unit 62 gives instructions on the operation method to the DSP circuits 50L and 50R for luminance correction and the DSP circuit 55 for position correction based on the correction data stored in the correction data memory 60 and the data S3. The data S3 is used mainly to perform such control that the left and right divided frames are appropriately joined and displayed.

Next, in the cathode ray tube of the embodiment, a specific example of signal processing for applying luminance correction to the input picture signal $D_{IN}$ and operation for applying position correction to the input picture signal $D_{IN}$ will be described.

By referring to FIGS. 5A to 5E, a specific example of operation for the image data for the left divided frame in the processing circuit shown in FIG. 4 is described. FIG. 5A shows the image data which is read from the frame memory 53 and is inputted to the DSP circuit 50L. The image data of, for example, 640 horizontal pixels×480 vertical pixels is inputted to the DSP circuit 50L, as shown in FIG. 5A. A region of 64 horizontal pixels (32 left pixels+32 right pixels)×480 vertical pixels in, for example, the center portion of the image data of 640 horizontal pixels×480 vertical pixels becomes the overlap region OL of the left and right divided frames. Among the image data inputted to the DSP circuit 50L, the data of 352 horizontal pixels×480 vertical pixels on the left side diagonally shaded in FIG. 5A therefore becomes the data for the left divided frame.

FIG. 5B shows the image data which is written on the frame memory 56L after image correction by the DSP circuit 50L and the DSP circuit 55L1. Prior to correction by the DSP circuit 55L1, the DSP circuit 50L applies operation for luminance correction in the overlap region OL to the data of 352 horizontal pixels×480 vertical pixels diagonally shaded in FIG. 5A, independently of position correction. In FIG. 5B, a modulation waveform 80L representing luminance correction in the left divided frame is shown so as to correspond to the image data.

On the other hand, after luminance correction by the DSP circuit 50L, the DSP circuit 55L1 applies operation with correction in the horizontal direction to the data of 352 horizontal pixels×480 vertical pixels diagonally shaded in FIG. 5A. The operation enlarges the image from 352 pixels to 480 pixels in the horizontal direction, thereby creating the image data of 480 horizontal pixels×480 vertical pixels, as shown in FIG. 5B. Simultaneously with the enlargement of the image, the DSP circuit 55L1 performs operation for correcting horizontal image distortion or the like based on the correction data stored in the correction data memory 60 and the data for correction obtained by analyzing the detection signal from the index electrode 70. The increase of the number of pixels requires interpolation of data about pixels not included in an original image. A method of converting the number of pixels will be described in detail later with reference to FIGS. 17 to 21D.

The DSP circuit 50L may be eliminated from elements. That is, luminance correction may be performed by the DSP circuit 5SL1 instead of the DSP circuit 50L, simultaneously with the enlargement of the image and the operation for correcting image distortion or the like.

In the frame memory 56L, the image data operated by the DSP circuit 50L and the DSP circuit 55L1 is stored for each color in accordance with a control signal Sa3L indicating the write address generated by the memory controller 63. In the example of FIG. 5B, the image data is sequentially written rightward starting at the upper left. The image data stored in the frame memory 56L is read for each color in accordance with a control signal Sa4L indicating the read address generated by the memory controller 63 and is inputted to the DSP circuit 55L2. In the embodiment, the respective orders of the write address and the read address on/from the frame memory 56L, which are generated by the memory controller 63, differ from each other. In the example of FIG. 5B, the order of the read address is the reverse of the order of the write address, and thus the image data is sequentially read leftward starting at the upper right.

FIG. 5C shows the image data which is read from the frame memory 56L and is inputted to the DSP circuit 55L2. As described above, in the embodiment, the order of the read address from the frame memory 56L is the reverse of the order of the write address on the frame memory 56L. Therefore, the image inputted to the DSP circuit 55L2 takes the form of a mirror image of the image shown in FIG. 5B.

The DSP circuit 55L2 applies operation with correction in the vertical direction to the data of 480 horizontal pixels× 480 vertical pixels (see FIG. 5C) which has been read from the frame memory 56L. The operation enlarges the image from 480 pixels to 640 pixels in the horizontal direction, thereby creating the image data of 640 horizontal pixels×480 vertical pixels, as shown in FIG. 5D. Simultaneously with the enlargement of the image, the DSP circuit 55L2 performs operation for correcting vertical image distortion or the like based on the correction data stored in the correction data memory 60 and the data for correction obtained by analyzing the detection signal from the index electrode 70.

The scan of the electron beam eBL is performed from the right to the left based on the image data (see FIG. 5D) obtained through the above-mentioned operation, whereby the frame diagonally shaded in FIG. 5E is displayed on the left side on the phosphor screen 11. In the embodiment, as described above, the image data is corrected in consideration of image distortion or the like. Therefore, the left image displayed on the phosphor screen 11 is properly displayed without image distortion or the like.

Next, with reference to FIGS. 6A to 6E, a specific example of operation for the image data for the right divided frame is described. FIG. 6A shows the image data which is read from the frame memory 53 and is inputted to the DSP circuit 50R. The image data of, for example, 640 horizontal pixels×480 vertical pixels is inputted to the DSP circuit SOR, similarly to the DSP circuit 50L. A region of 64 horizontal pixels (32 left pixels+32 right pixels)×480 vertical pixels in, for example, the center portion of the image data of 640 horizontal pixels×480 vertical pixels becomes the overlap region OL of the left and right divided frames. Among the image data inputted to the DSP circuit 50R, the data of 352 horizontal pixels×480 vertical pixels on the right side diagonally shaded in FIG. 6A therefore becomes the data for the right divided frame.

FIG. 6B shows the image data which is written on the frame memory 56R after image correction by the DSP circuit 50R and the DSP circuit 55R1. Prior to correction by the DSP circuit 55R1, the DSP circuit 50R applies operation for luminance correction in the overlap region OL to the data of 352 horizontal pixels×480 vertical pixels diagonally shaded in FIG. 6A, independently of position correction. In FIG. 6B, a modulation waveform 80R representing luminance correction in the right divided frame is shown so as to correspond to the image data.

On the other hand, after luminance correction by the DSP circuit 50R, the DSP circuit 55R1 applies operation with correction in the horizontal direction to the data of 352 horizontal pixels×480 vertical pixels diagonally shaded in FIG. 6A. The operation enlarges the image from 352 pixels to 480 pixels in the horizontal direction, thereby creating the image data of 480 horizontal pixels×480 vertical pixels, as shown in FIG. 6B. Simultaneously with the enlargement of the image, the DSP circuit 55R1 performs operation for correcting horizontal image distortion or the like based on the correction data stored in the correction data memory 60 and the data for correction obtained by analyzing the detection signal from the index electrode 70.

The DSP circuit 50R may be eliminated from elements. That is, luminance correction may be performed by the DSP circuit 55R1 instead of the DSP circuit 50R, simultaneously with the enlargement of the image and the operation for correcting image distortion or the like.

In the frame memory 56R, the image data operated by the DSP circuit 50R and the DSP circuit 55R1 is stored for each color in accordance with a control signal Sa3R indicating the write address generated by the memory controller 63. In the example of FIG. 6B, the image data is sequentially written rightward starting at the upper left. The image data stored in the frame memory 56R is read for each color in accordance with a control signal Sa4R indicating the read address generated by the memory controller 63 and is inputted to the DSP circuit 55R2. In the processing for the right divided frame, the order of the write address on the frame memory 56R is the same as the order of the read address from the frame memory 56R. That is, in the example of FIG. 6B, the image data is sequentially read rightward starting at the upper left.

FIG. 6C shows the image data which is read from the frame memory 56R and is inputted to the DSP circuit 55R2. As described above, in the embodiment, the order of the read address from the frame memory 56R is the same as the order of the write address on the frame memory 56R. Therefore, the image inputted to the DSP circuit 55R2 takes the same form as the image shown in FIG. 6B.

The DSP circuit 55R2 applies operation with correction in the vertical direction to the data of 480 horizontal pixels× 480 vertical pixels (see FIG. 6C) which has been read from the frame memory 56R. The operation enlarges the image from 480 pixels to 640 pixels in the horizontal direction, thereby creating the image data of 640 horizontal pixels×480 vertical pixels, as shown in FIG. 6D. Simultaneously with the enlargement of the image, the DSP circuit 55R2 performs operation for correcting vertical image distortion or the like based on the correction data stored in the correction data memory 60 and the data or correction obtained by analyzing the detection signal from the index electrode 70.

The scan of the electron beam eBR is performed from the left to the right based on the image data (see FIG. 6D) obtained through the above-mentioned operation, whereby the frame diagonally shaded in FIG. 6E is displayed on the right side on the phosphor screen 11. In the embodiment, as described above, the image data is corrected in consideration of image distortion or the like. Therefore, the right image displayed on the phosphor screen 11 is properly displayed without image distortion or the like.

Reference is now made to FIGS. 7 to 16., explaining in detail of an operation for position correction of an image using the correction data.

First, an outline of correction data stored in the correction data memory 60 (see FIG. 4) will be described with reference to FIGS. 9A to 9C. The correction data is represented by, for example, the magnitude of displacement relative to a reference point arranged in a lattice. For example, let a lattice point (i, j) shown in FIG. 9A be the reference point. Further, let the magnitude of displacement relative to color R in the X-direction be Fr (i, j); the magnitude of displacement relative to color R in the Y-direction be Gr (i, j); the magnitude of displacement relative to color G in the X-direction be Fg (i, j); the magnitude of displacement relative to color G in the Y-direction be Gg (i, j); the magnitude of displacement relative to color B in the X-direction be Fb (i, j); and the magnitude of displacement relative to color B in the Y-direction be Gb (i, j). Then, each pixel of each color on the lattice point (i, j) is displaced by each magnitude of displacement, whereby each pixel is positioned as shown in FIG. 9B. The images shown in FIG. 9B are combined with one another, whereby the image shown in FIG. 9C is obtained. When the image thus obtained is displayed on the phosphor screen 11, misconvergence or the like is corrected as a result of an influence of properties of image distortion of the cathode ray tube itself, terrestrial magnetism or the like. Therefore, the pixels of R, G and B are displayed on the same point on the phosphor screen 11. In the processing circuit shown in FIG. 4, the DSP circuits 55L1 and 55R1 perform correction based on, for example, the magnitude of displacement in the X-direction, while the DSP circuits 55L2 and 55R2 perform correction based on, for example, the magnitude of displacement in the Y-direction.

Next, operation using the correction data will be described. Operation for correction is performed for each color R, G and B. Only the correction data for use in operation differs, and the operation method for each color is the same. In the following, operation for correction for color R will be mainly described as a typical example. In the following, for the sake of simplicity, vertical and horizontal image corrections will be sometimes described collectively. However, as described above, vertical and horizontal image corrections are separately performed in the signal processing circuit shown in FIG. 4.

Figure 10A:
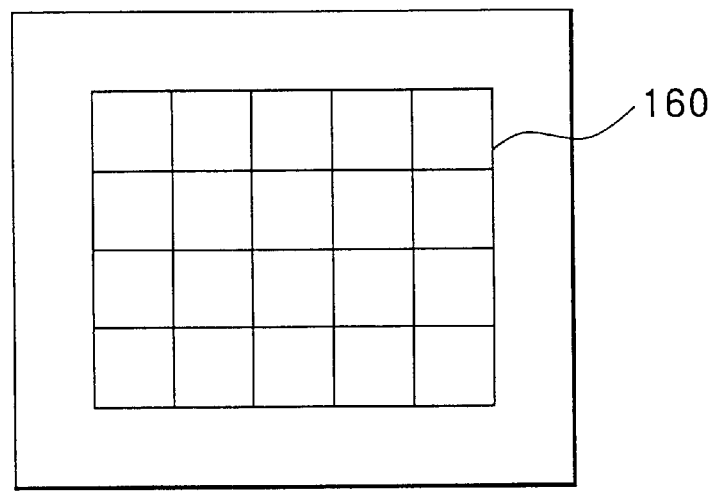
FIGS. 10A to 10C are diagrams illustrating a state of transformation of an input image in the case where no correction operation using correction data is made in the signal processing circuit according to the first example.
Figure 10B:
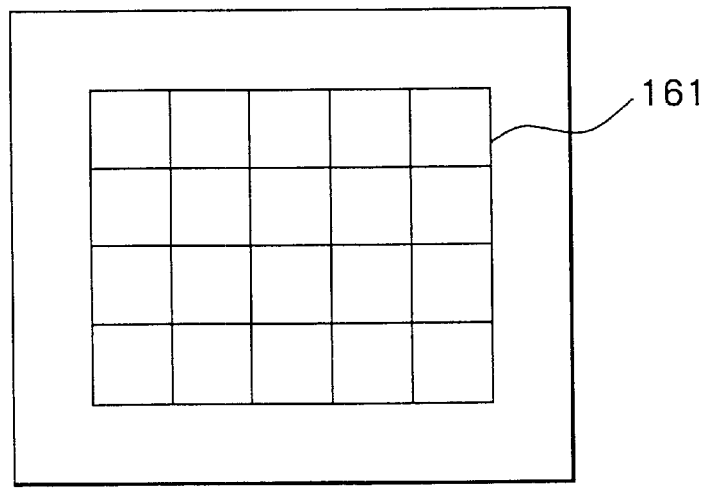
Figure 10C:
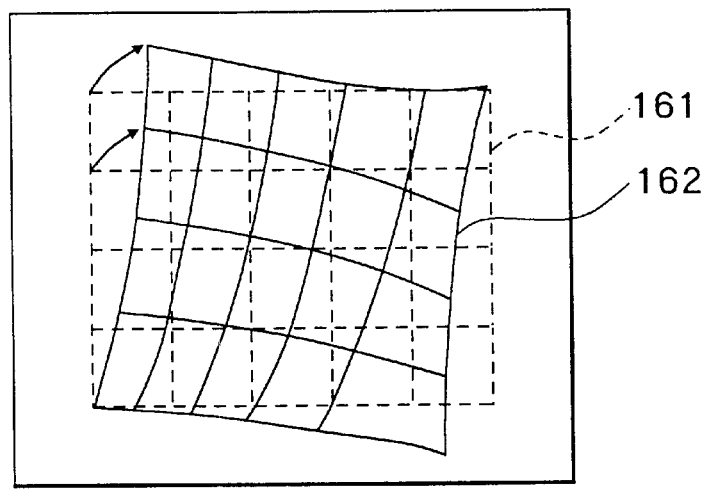

FIGS. 10A to 10C show a state of deformation of an input image which has not undergone operation for correction using the correction data in the processing circuit shown in FIG. 4. When operation for correction does not take place, an image 160 (see FIG. 10A) on the frame memory 53 and an image 161 (see FIG. 10B) outputted from the DSP circuit 55L2 or the DSP circuit 55R2 have the same shape as the input image has. Then, the image is distorted due to properties of the cathode ray tube itself, and thus an image 162 deformed as shown in FIG. 10C, for example, is displayed on the phosphor screen 11. In FIG. 10C, the image shown by dotted lines corresponds to the image which should be originally displayed. In a process in which the image is thus displayed, a phenomenon in which the respective images of colors R, G and B are deformed in quite the same manner corresponds to image distortion. On the other hand, a phenomenon in which the respective images of colors R, G and B are deformed in a different manner corresponds to misconvergence. To correct image distortion shown in FIG. 10C, the image can be subjected to deformation in the direction opposite to properties of the cathode ray tube before the image signal is inputted to the cathode ray tube.

Figure 11A:
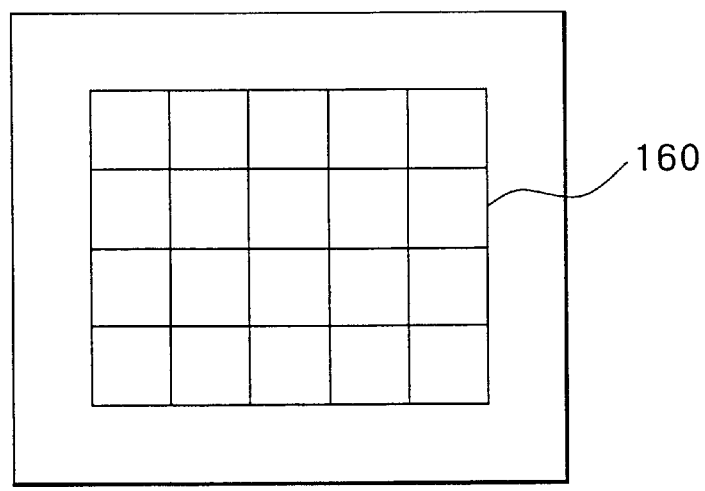
FIGS. 11A to 11C are diagrams illustrating a state of transformation of an input image in the case where a correction operation using correction data is made in the signal processing circuit according to the first example.
Figure 11B:
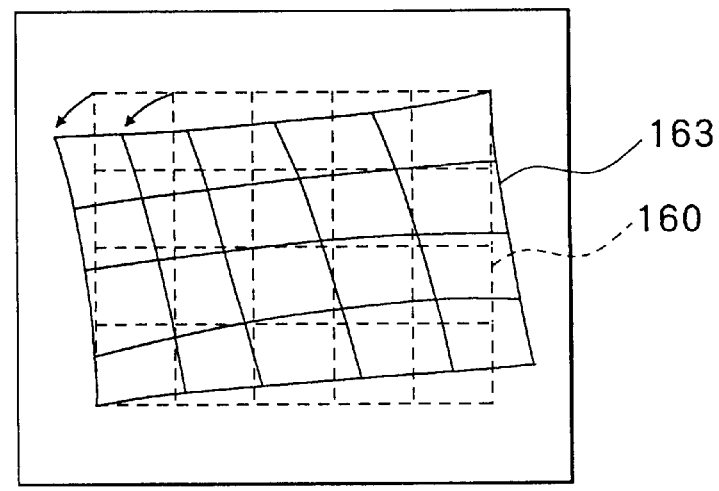
Figure 11C:
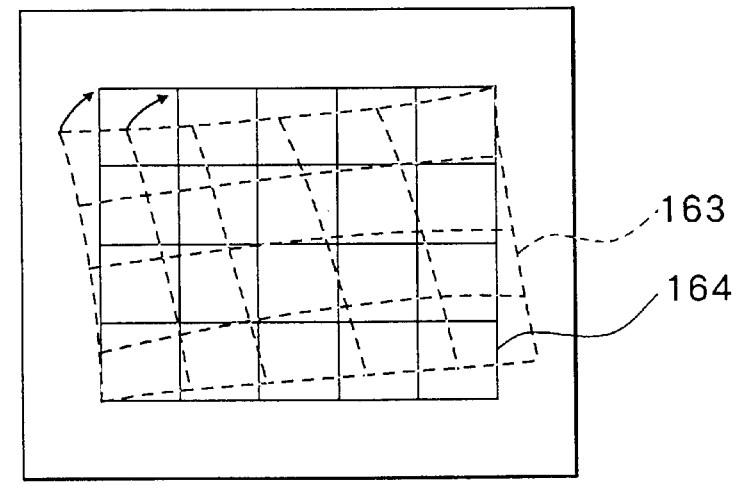

FIGS. 11A to 11C show a change of an input image which has undergone operation for correction in the processing circuit shown in FIG. 4. Also when operation for correction takes place, the image 160 (see FIG. 11A) on the frame memory 53 has the same shape as the input image has. The image stored in the frame memory 53 is subjected to operation for correction, based on the correction data, by the DSP circuits 55L1, 55L2, 55R1 and 55R2 so that the input image may be deformed in the direction opposite to deformation of the image by the cathode ray tube (deformation resulting from properties of the cathode ray tube. See FIG. 10C). FIG. 11B shows an image 163 operated. In FIG. 11B, the image shown by dotted lines is the image 160 on the frame memory 53 and corresponds to the image before operation for correction. Thus, the signal of the image 163 deformed in the direction opposite to properties of the cathode ray tube is further distorted by properties of the cathode ray tube. As a result, the image signal is formed into the same shape as the shape of the input image, and therefore an ideal image 164 (see FIG. 11C) is displayed on the phosphor screen 11. In FIG. 11C, the image shown by dotted lines corresponds to the image 163 shown in FIG. 11B.

Figure 12:
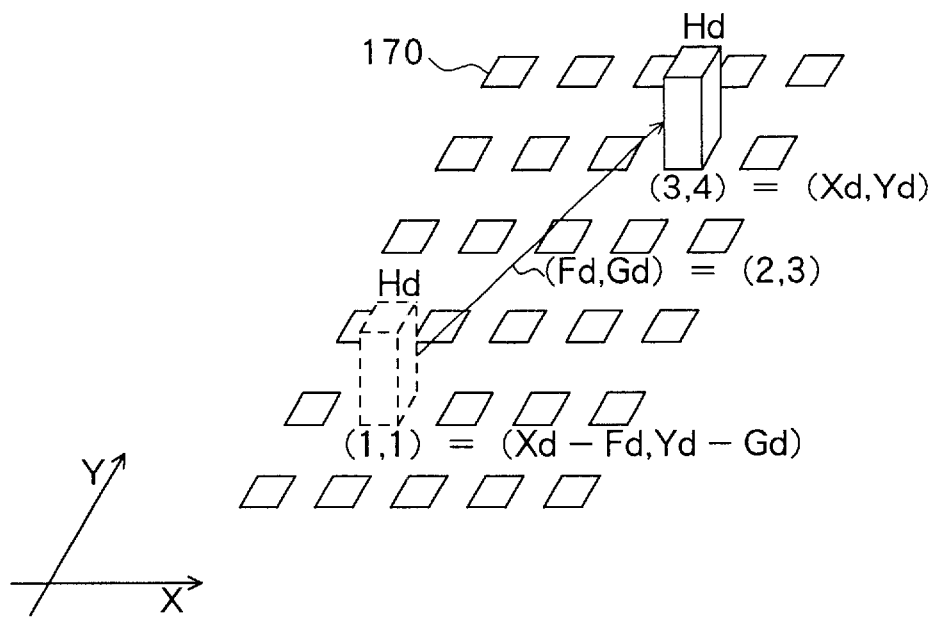
FIG. 12 is a diagram illustrating a first method of a correction operation performed in the signal processing circuit according to the first example.

Next, operation for correction to be performed by the DSP circuit 55 (DSP circuits 55L1, 55L2, 55R1 and 55R2) will be described in detail. FIG. 12 illustrates a first method of operation for correction to be performed by the DSP circuit 55. In FIG. 12, pixels 170 are arranged in a lattice on integer positions in the X, Y coordinates. FIG. 12 illustrates an example of operation for one pixel alone to which attention is paid. FIG. 12 illustrates a state in which a pixel value of a pixel located on the coordinates (1, 1) before operation for correction by the DSP circuit 55, i.e., a value Hd of an R signal (hereinafter referred to as "an R value") is displaced to the coordinates (3, 4) after operation. In FIG. 12, a portion shown by dotted lines indicates the R value (pixel value) before operation for correction. Let the magnitude of displacement of the R value be vector (Fd, Gd). Then, (Fd, Gd)=(2, 3). Seen from the viewpoint of the operated pixel, this can be also interpreted as a copy of the R value Hd of the coordinates (Xd−Fd, Yd−Gd) when the operated pixel has the coordinates (Xd, Yd). Such copying is applied to all of the operated pixels, whereby the image to be outputted as a display image is completed. Accordingly, the correction data stored in the correction data memory 60 can have the magnitude of displacement (Fd, Gd) corresponding to each of the operated pixels.

A relationship of displacement of the pixel value described above will be described in conjunction with screen scan in the cathode ray tube. Typically, in the cathode ray tube, horizontal scan is accomplished by performing the scan of the electron beam eB from the left to the right on the screen (in X direction in FIG. 12), while vertical scan is accomplished by performing the scan of the electron beam eB from the top to the bottom on the screen (in −Y direction in FIG. 12). When the scan based on an original picture signal is performed in an array of pixels shown in FIG. 12, the scan of the pixel of the coordinates (1, 1) is therefore performed "later" than the scan of the pixel of the coordinates (3, 4). However, when the scan based on the picture signal subjected to operation for correction by the DSP circuit 55 of the embodiment is performed, the scan of the pixel of the coordinates (1, 1) of the original picture signal is performed "earlier" than the scan of the pixel of the coordinates (3, 4) of the original picture signal. Thus, in the embodiment, the array of pixels in two-dimensional image data is rearranged based on the correction data or the like. This enables an operation for correction so as to change an original one-dimensional picture signal in time and in space pixel by pixel.

When the value of the magnitude of displacement (Fd, Gd) as the correction data for use in the above-mentioned operation for correction is limited to integer values, only a simple operation, i.e., the above-mentioned displacement of the pixel value can be applied as operation for correction. However, the image corrected by operation under the limitation to the integer values may have a problem: a linear image becomes jagged, that is, so-called jaggy occurs; or a thickness of a character image becomes nonuniform and looks unnatural. In order to solve the problem, the following method is considered: the value of the magnitude of displacement (Fd, Gd) is extended to real numbers and the R value of a phantom pixel is estimated and then used.

Figure 13:
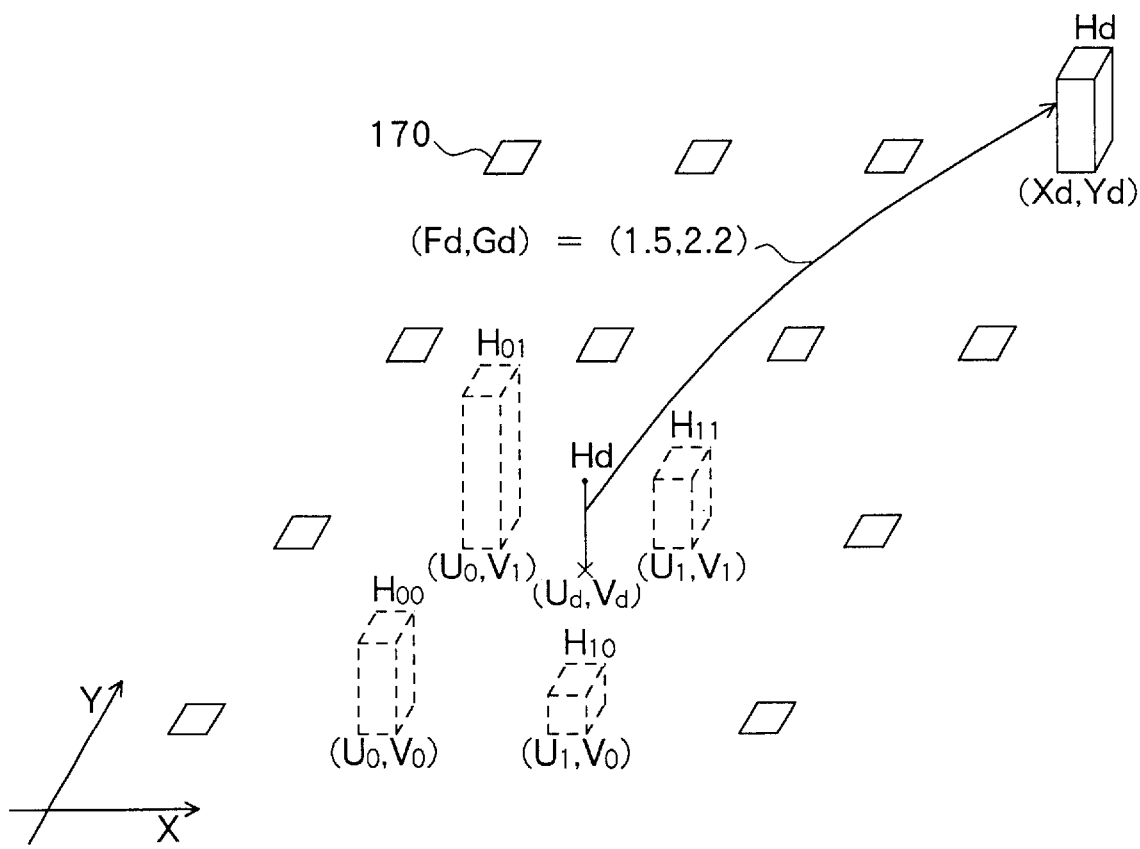
FIG. 13 is a diagram illustrating a second method of a correction operation performed in the signal processing circuit according to the first example.

Next, a second method of operation for correction will be described with reference to FIG. 13. The second method is a method of operation for correction which is to be performed when the magnitude of displacement (Fd, Gd) is the real number. FIG. 13 shows a state in which the R value Hd of the operated pixel is determined when the real number is given to the correction data of the coordinates (Xd, Yd), i.e., the magnitude of displacement (Fd, Gd). The coordinates (Ud, Vd) of the pixel to be referenced before operation are expressed by the following equation (1).

$$(Ud,\ Vd)=(Xd-Fd,\ Yd-Gd) \hspace{2em} \text{Equation (1)}$$

Assuming that (Fd, Gd)=(1.5, 2.2), the pixel of the coordinates (Ud, Vd) does not exist because the pixels are located on only integer coordinates positions. In the second method, operation for estimating the R value of the pixel of the coordinates (Ud, Vd) from four pixels near the coordinates (Ud, Vd) by linear interpolation is therefore performed. In FIG. 13, portions shown by dotted lines indicate these four pixels. Let the integers obtained by dropping the respective decimal fractions of the coordinate values Ud and Vd be values U0 and V0 respectively. Then, four pixels near the coordinates (Ud, Vd) are the pixels of the coordinates (U0, V0), (U1, V0), (U0, V1) and (U1, V1), wherein U1=U0+1 and V1=V0+1. Further, let the respective R values of the pixels of the coordinates (U0, V0), (U1, V0), (U0, V1) and (U1, V1) be H00, H10, H00 and H11 respectively. Then, the R value Hd of the pixel of the coordinates (Ud, Vd) to be determined is expressed by the following equation (2).

$$Hd=(U1-Ud)\times(V1-Vd)\times H00+(Ud-U0)\times(V1-Vd)\times H10+(U1-Ud)\times(Vd-V0)\times H01+(Ud-U0)\times(Vd-V0)\times H11 \quad \text{Equation (2)}$$

The above-mentioned correction method will be discussed in detail. The pixel value (H00, H10, H01, H11) for use in estimation of the R value is selected and determined, by means of the integral portions of the values of the magnitude of displacement (Fd, Gd) as the correction data. A factor (e.g., the factor, by which H00 is multiplied, is (U1−Ud)×(V1−Vd)), by which each pixel value is multiplied in equation (2) is determined by means of the decimal fractions of the magnitude of displacement.

In the above-mentioned example, the R value of the pixel of the coordinates (Ud, Vd) is estimated from the pixel values on four points near the coordinates (Ud, Vd) by linear interpolation method. However, the estimation method is not limited to the linear interpolation method, and other operation methods may be used. The above description is given with regard to an example in which the correction data is interpreted as a difference between relative coordinates for referring to the pixel value before operation and the pixel value Hd of phantom coordinates (Ud, Vd) is estimated and then displaced to the corrected coordinates (Xd, Yd). However, the following calculation method is also considered: the correction data is interpreted as the magnitude of displacement of the pixel value Hd before operation and the operated pixel value Hd is assigned to the pixel values on four points near the displaced coordinate position after the displacement by the magnitude of displacement (Fd, Gd). In the method, a program for executing operation is a little complicated, but the method may be, of course, adopted.

The magnitude of displacement (Fd, Gd) as the correction data is separately defined for three colors R, G and B of each pixel. Accordingly, when the correction data is set for all the pixels, the total amount of data becomes so high that it cannot be ignored. Thus, a large-capacity memory for storing the correction data is needed, causing an increase in costs of an apparatus. Moreover, in a correction data creating apparatus (not shown) including the image pickup apparatus 64, a working time required to measure the magnitude of image distortion and the magnitude of misconvergence of the cathode ray tube for all the pixels and to calculate and supply the correction data to the cathode ray tube becomes considerably long. On the other hand, the magnitude of image distortion and the magnitude of misconvergence of the cathode ray tube do not vary much between pixels close to each other. A method utilizing this fact is therefore considered: the entire screen region is divided into some regions, the correction data is supplied to only a representative pixel in each divided region, and the correction data for the other pixels is estimated from the correction data for the representative pixel. The method is effective at reducing the total volume of correction data and reducing the working time.

Next, a method of performing operation for correction by supplying the correction data to only the representative pixel will be described as a third method of operation for correction. Since the displacement of the pixel in the divided region is determined in accordance with the magnitude of displacement of the representative pixel, a place where the representative pixel is located is hereinafter called "a control point".

Figure 7:
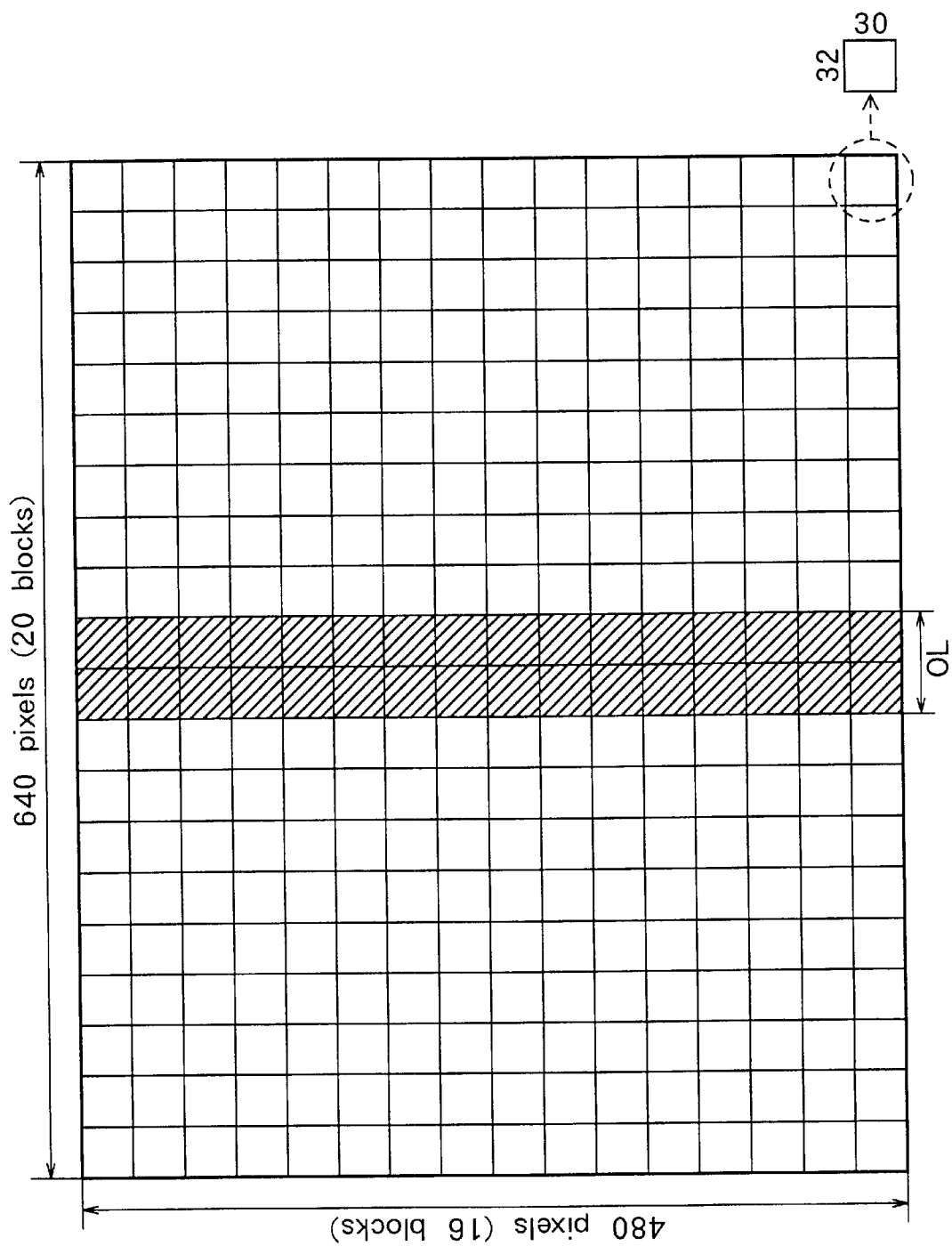
FIG. 7 is a diagram of an example of a reference image used for correcting image data in the cathode ray tube according to the first example.

FIG. 7 shows an example of a lattice-shaped image having 640 horizontal pixels×480 vertical pixels, which are divided into 20 horizontal blocks and 16 vertical blocks, respectively. One block is composed of 32 horizontal pixels×30 vertical pixels. In FIG. 7, a portion diagonally shaded is the overlap region OL where the left and right divided frames are joined. The above-mentioned control point is set on each lattice point of such an image, for example.

In FIG. 8, the left divided frame corresponds to the image shown in FIG. 5E, and the number of pixels thereof is 640 horizontal pixels×480 vertical pixels, which are divided into 11 horizontal blocks×16 vertical blocks, respectively. In FIG. 8, the right divided frame corresponds to the image shown in FIG. 6E, and the number of blocks thereof is the same as the number of blocks of the left divided frame.

Figure 14:
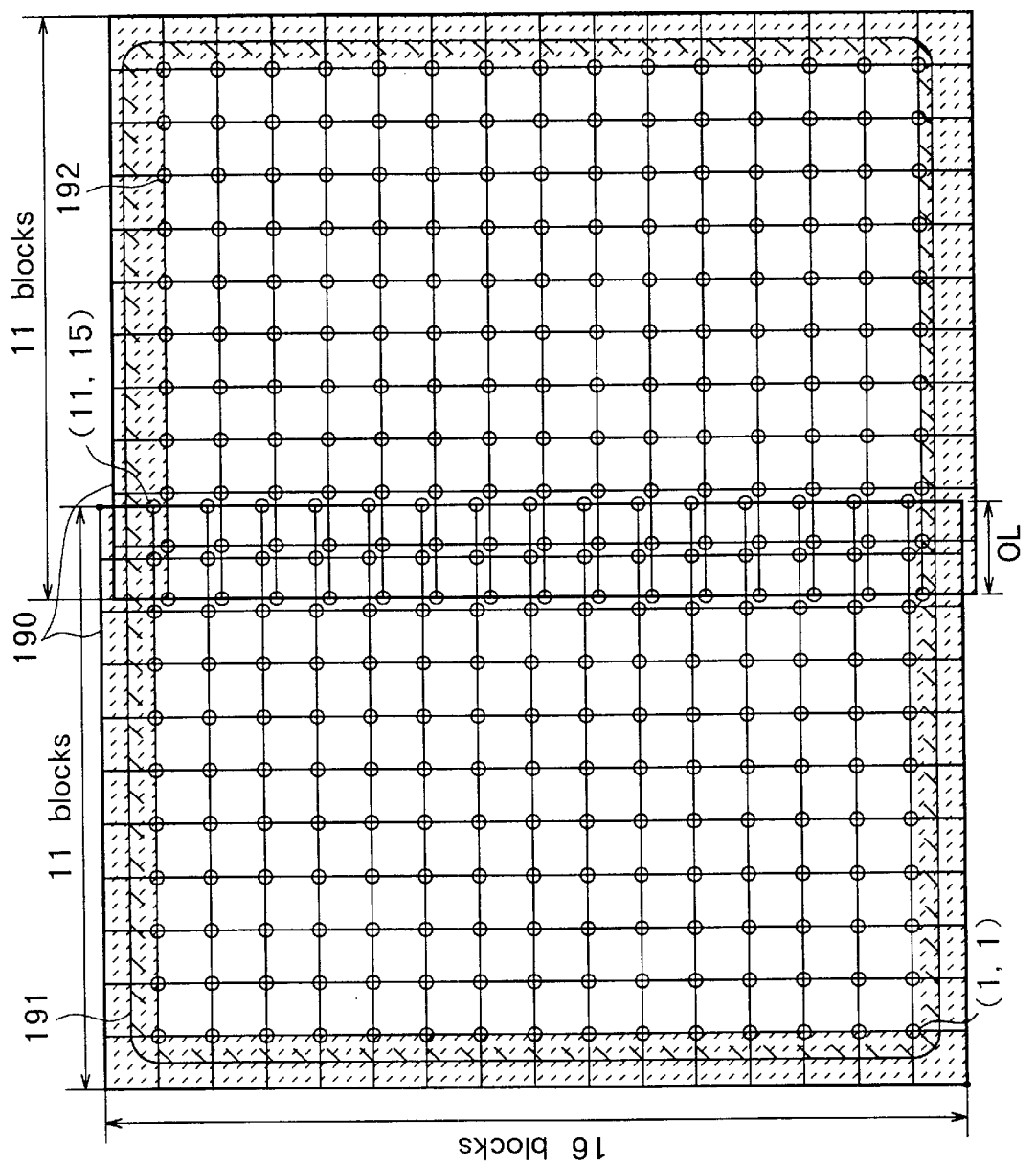
FIG. 14 is a diagram illustrating control points used in a third method of a correction operation performed in the signal processing circuit according to the first example.

FIG. 14 shows an example in which the entire screen region on the DSP circuit 55 is divided into a plurality of rectangular regions and the control points are set in the form of a two-dimensional lattice. In the case of a television image or the like, information on the image of a size larger than the size of the image actually displayed on the screen of the cathode ray tube is supplied, and a region called over-scan exists. Thus, as shown in FIG. 14, an image region 190 on the DSP circuit 55 is typically set larger than an available picture area 191 of the cathode ray tube in consideration of the over-scan region. On the DSP circuit 55, many control points 192 are set so as to also function as the control point of adjacent divided regions. In the example of FIG. 14, the total number of control points 192 is only 11 horizontal points×15 vertical points×2=330.

Assuming that the image region on the DSP circuit 55 has the left and right divided frames, each of which has "640 horizontal pixels×480 vertical pixels", the number of all the pixels is no less than 640×480×2=614,400. Considering this, it can be said that the total number of correction data is considerably reduced by supplying the representative control points 192 as the correction data rather than by supplying the correction data to all the pixels. For example, assuming that 8-bit correction data is supplied to three colors R, G and B of all the pixels in the X direction and Y direction, the correction data memory 60 needs, at the minimum, a capacity as expressed by the following equation (3).

$$(8\times2\times3)\times(640\times480)\times2/8=3{,}686{,}400 \text{ (bytes)} \quad \text{Equation (3)}$$

However, a capacity expressed by the following equation (4) is sufficient for a method of setting the control points as shown in FIG. 14. Moreover, not only the capacity but also the working time required for image correction is greatly reduced.

$$(8\times2\times3)\times(11\times15)\times2/8=1980 \text{ (bytes)} \quad \text{Equation (4)}$$

The control points do not necessarily have to be set in the form of a lattice as shown in FIG. 14 and may be set on any position other than the form of a lattice.

Figure 15:
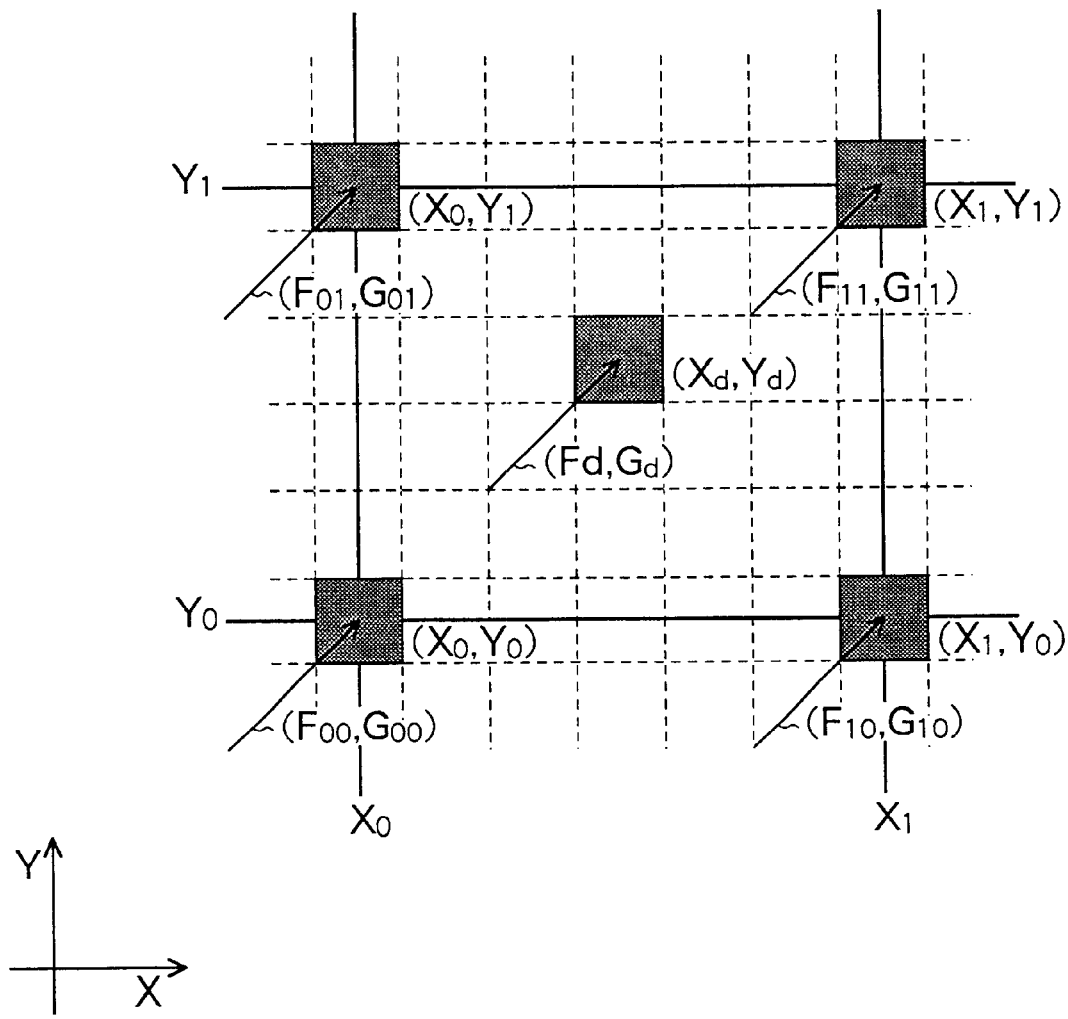
FIG. 15 is a diagram illustrating interpolation used in the third method of a correction operation performed in the signal processing circuit according to the first example.
Figure 16:
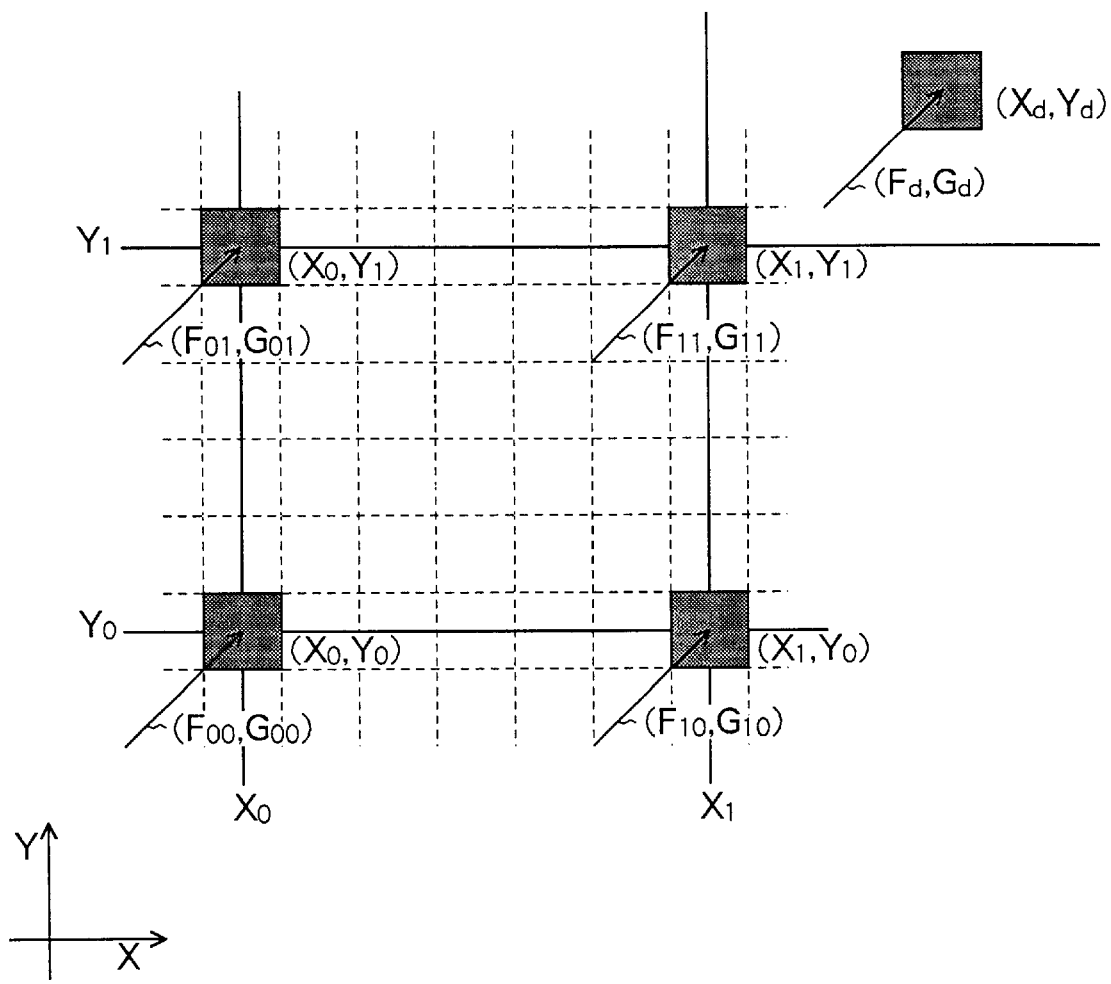
FIG. 16 is a diagram illustrating extrapolation used in the third method of a correction operation performed in the signal processing circuit according to the first example.

Next, a method of determining the magnitude of displacement of an arbitrary pixel in each divided region when the control points are set in the form of a lattice as shown in FIG. 14 will be described with reference to FIGS. 15 and 16. FIG. 15 is an illustration for describing a method of determining the magnitude of displacement by interpolation. FIG. 16 is an illustration for describing a method of determining the magnitude of displacement by extrapolation. Interpolation refers to a method of interpolating the magnitude of displacement of an arbitrary pixel located inside a plurality of control points. Extrapolation refers to a method of interpolating the magnitude of displacement of an arbitrary pixel located outside a plurality of control points. Desirably, extrapolation is used only for determining the magnitude of displacement of the pixels in the peripheral region of the screen (the region diagonally shaded by dotted lines in FIG. 14).

In general, extrapolation is used in the divided regions on the periphery of the screen including an outer frame of the entire image region, while interpolation is used in the other divided regions. However, both interpolation and extrapolation can be substantially expressed by the same operation method. In FIGS. 15 and 16, it is assumed that the respective coordinates of four control points are (X0, Y0), (X1, Y0), (X0, Y1) and (X1, Y1) and the magnitude of displacement corresponding to the correction data for four control points are (F00, G00), (F10, G10), (F01, G01) and (F11, G11). In this case, the magnitude of displacement (Fd, Gd) of the pixel of arbitrary coordinates (Xd, Yd) can be determined by the following equations (5) and (6). The equations can be used both for interpolation and for extrapolation.

$$Fd=\{(X-Xd)\times(Y1-Yd)\times F00+(Xd-X0)\times(Y1-Yd)\times F10+(X1-Xd)\times(Yd-Y0)\times F01+(Xd-X0)\times(Yd-Y0)\times F11\}/\{(X1-X0)\times(Y1-Y0)\} \quad (5)$$

$$Gd=\{(X-Xd)\times(Y1-Yd)\times G00+(Xd-X0)\times(Y1-Yd)\times G10+(X1-Xd)\times(Yd-Y0)\times G01+(Xd-X0)\times(Yd-Y0)\times G11\}/\{(X1-X0)\times(Y1-Y0)\} \quad (6)$$

Operation expressed by equations (5) and (6) is also the estimation method using linear interpolation, but the estimation method is not limited to linear interpolation and other operation methods may be used.

When each lattice point is set as the control point as described above, the correction data is supplied to each lattice point. For example, when only the left divided image is discussed, the magnitude of initial displacement Fr(i, j), Gr(i, j), Fg(i, j), Gg(i, j), Fb(i, j) and Gb(i, j) are thus supplied to lattice points (i, j) (i=1 to 11, j=1 to 15). The magnitude of displacement is stored as initial correction data (first correction data) in the correction data memory 60. The control unit 62 calculates the magnitude of small displacement ΔFr(i, j), ΔGr(i, j), ΔFg(i, j), ΔGg(i, j), ΔFb(i, j) and ΔGb(i, j) of the initial correction data based on the data S3 indicating the result of analysis of the index signal S2 outputted from the index signal processing circuit 61, and adds the magnitude of small displacement to the initial correction data, thereby creating the correction data to be supplied to the DSP circuits 55L1, 55L2, 55R1 and 55R2.

The magnitude of small displacement (the magnitude of variation) of the initial correction data obtained based on the data S3 indicating the result of analysis of the index signal S2 corresponds to "second correction data" of the invention.

The final correction data created by the control unit 62 is expressed by the following equations (A) to (F). In the equations, Fr(i, j)' represents the magnitude of displacement relative to color R in the X direction (horizontal direction), and Gr(i, j)' represents the magnitude of displacement relative to color R in the Y direction (vertical direction). Fg(i, j)' represents the magnitude of displacement relative to color G in the X direction, and Gg (i, j)' represents the magnitude of displacement relative to color G in the Y direction. Fb(i, j)' represents the magnitude of displacement relative to color B in the X direction, and Gb(i, j)' represents the magnitude of displacement relative to color B in the Y direction.

$$Fr(i, j)'=Fr(i, j)+\Delta Fr(i, j) \quad \text{Equation (A)}$$

$$Gr(i, j)'=Gr(i, j)+\Delta Gr(i, j) \quad \text{Equation (B)}$$

$$Fg(i, j)'=Fg(i, j)+\Delta Fg(i, j) \quad \text{Equation (C)}$$

$$Gg(i, j)'=Gg(i, j)+\Delta Gg(i, j) \quad \text{Equation (D)}$$

$$Fb(i, j)'=Fb(i, j)+\Delta Fb(i, j) \quad \text{Equation (E)}$$

$$Gb(i, j)'=Gb(i, j)+\Delta Gb(i, j) \quad \text{Equation (F)}$$

Next, conversion of the number of pixels associated with the image enlargement performed by the DSP circuit 55 simultaneously with the correction of image data will be described in detail with reference to FIGS. 17 to 21D.

Both the image enlargement and the conversion of sampling frequency (the number of pixels) of the image (the conversion between image standards of different resolutions) are accomplished by performing operation for determining data on pixels not included in the original image with respect to each pixel position of the original image. The operation can be performed by using "an interpolation filter" to be described later.

Figure 17:
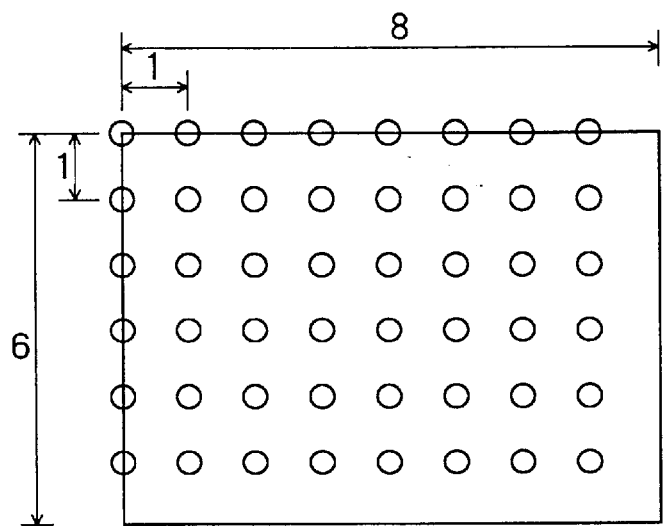
FIG. 17 is a diagram of an example of an original image before subjected to an enlargement or the like through conversion of the number of pixels performed in the signal processing circuit according to the first example.

Circles in FIG. 17 represent the positions of the pixels. The original image includes 8 horizontal pixels×6 vertical pixels. For the sake of simplicity, in FIG. 17, the number of pixels is set to a small number. Next, the description will be given with regard to the case where the original image is vertically and horizontally enlarged 10/7 (about 1.429) times, for instance. Herein, a magnification refers to a length ratio, not an area ratio.

Figure 18:
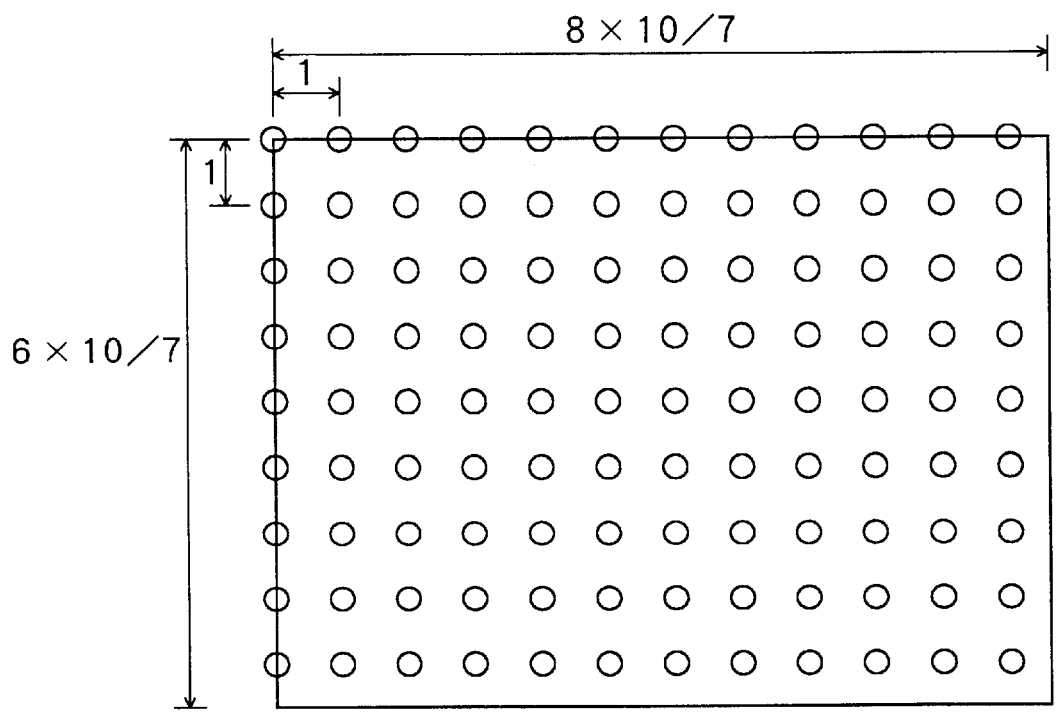
FIG. 18 is a diagram of an example of an enlarged image of the original image shown in FIG. 17.

The image shown in FIG. 18 is obtained by enlargement without changing display standards of the original image, and the array of pixels thereof (a distance between adjacent pixels, etc.) remains identical with the array of pixels of the original image (in FIG. 18, the distance between adjacent pixels is equal to 1). Since the magnification for enlarging the image is (10/7)×magnification, a length of one side of the image is increased about 1.429 times and thus the number of pixels of the image increases by about $1.429^2$ times. For example, the number of pixels in each row of horizontal pixels of the original image shown in FIG. 17 is equal to 8, while the number of pixels in each row of horizontal pixels of the enlarged image shown in FIG. 18 is equal to 11 or 12 (an integer approximate to 8×10/7=11.429). Accordingly, the relative positions of the pixels of the original image differ from the relative positions of the pixels of the enlarged similar image, which correspond to the same portions as the portions of the original image. Therefore, the value of data (luminance, color, etc.) on each pixel of the enlarged image differs from the value of data of the original image.

Figure 19:
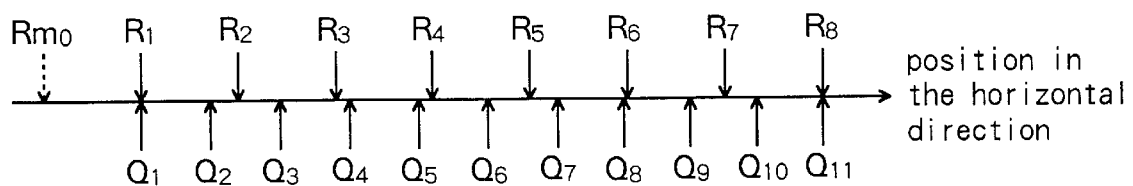
FIG. 19 is a diagram illustrating the relation between the pixel positions in the original image shown in FIG. 17 and the pixel positions in the enlarged image shown in FIG. 18.

FIG. 19 shows a relationship between the positions of the horizontal pixels of the original image and the positions of the horizontal pixels of the enlarged image. In FIG. 19, upper Ri (i=1, 2, . . . ) represents the data on the pixels of the original image, while lower Qi (i=1, 2, . . . ) represents the data on the pixels of the enlarged image. The pixels corresponding to Ri are spaced at intervals of the distance (10/7) times the distance between the pixels corresponding to Qi. Although FIG. 19 shows only horizontal enlargement, the same is true of vertical enlargement. As described later, the value of data on each pixel of the enlarged image can be calculated by performing operation using "the interpolation filter", i.e., convolution of an interpolation function from several values of pixel data in the periphery of the pixel to be calculated of the original image in response to the correspondence between the positions of the pixels of the original image and the positions of the pixels of the enlarged image as shown in FIG. 19.

Figure 20:
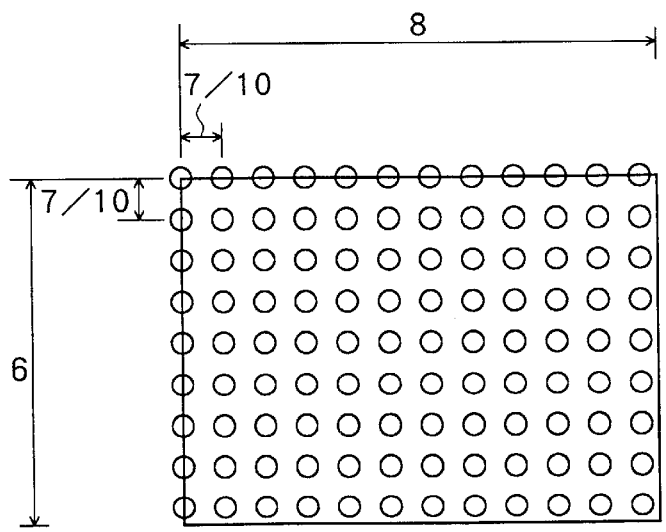
FIG. 20 is a diagram illustrating an image with the number of pixels increased with respect to the original image shown in FIG. 17.

Next, with reference to FIG. 20, the discussion will be made with regard to a case where the sampling frequency is increased by, for example, (10/7) times without changing the size of the image. The conversion of the sampling frequency is equivalent to the conversion to image standards having (10/7)-times higher resolution. That is, the number of horizontal pixels is changed to the number of horizontal pixels (10/7) times the number of horizontal pixels of the original image. In this case, the original image shown in FIG. 17 is converted to the image having the number of onedimensional pixels about 1.429 times the number of pixels of the original image, i.e., a surface density $1.429^2$ times the surface density of the original image, as shown in FIG. 20.

As described above, the enlargement of the image and the conversion of the sampling frequency (the number of pixels) of the image require the interpolation filter for calculating the data on the pixels located at the positions not included in the original image.

Next, an operation method using the interpolation filter will be described with reference to FIGS. 21A to 21D.

Provided that a sampling interval (the distance between adjacent pixels) of the original image is S and the positions a distance (phase) P apart from the positions of pixels R of the original image are the positions (interpolation points) of pixels Qi generated by interpolation, the values of the pixels Qi can be calculated by convolving the values R of the pixels of the original image on the periphery of the pixels Qi. According to "sampling theorem", for ideal "interpolation", convolution of from an infinite time past pixel to an infinite time future pixel is performed by using the following equation (7) and a sinc function expressed by FIG. 21A as an interpolation function f(x). In equation (7), $\pi$ denotes the ratio of the circumference of a circle to its diameter.

$$f(x)=\sin c(\pi \times x)=\sin c(\pi \times x)/(\pi \times x) \quad \text{Equation (7)}$$

However, in actual operation, an interpolation function, which is obtained by applying approximation to a sin c function within a finite range, is used because it is necessary to calculate an interpolation value within a finite time. In general, "a nearest neighbor approximation method", "a bilinear approximation method", "a cubic approximation method" and the like are known as an approximation method.

Figure 21A:
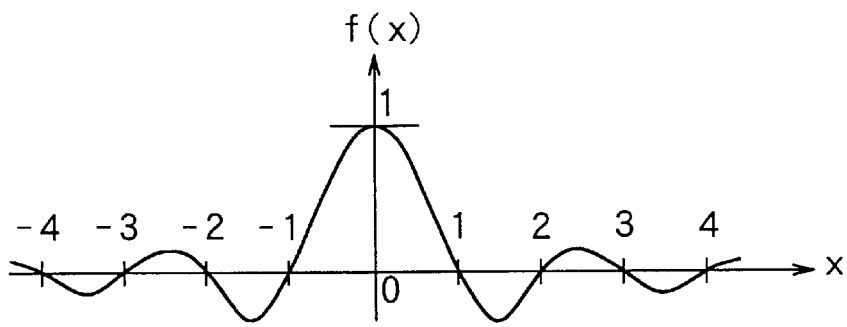
FIGS. 21A to 21D are diagrams showing examples of functions used as interpolation filter for conversion of the number of pixels performed in the signal processing circuit according to the first example.
Figure 21B:
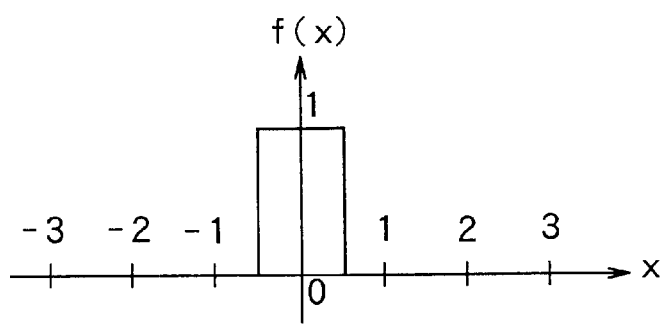

In the nearest neighbor approximation method, data on one interpolated pixel is calculated from data on one pixel of the original image by using the following expression (8) and an interpolation function expressed by FIG. 21B. A variable x in expression (8) and FIG. 21B represents an amount obtained by normalizing a horizontal displacement from the pixel position of the original image by the sampling interval of the original image.

$$f(x)=1 \quad -0.5 < x \leq 0.5$$

$$f(x)=0 \quad -0.5 \geq x, x > 0.5 \quad \text{Expression (8)}$$

Figure 21C:
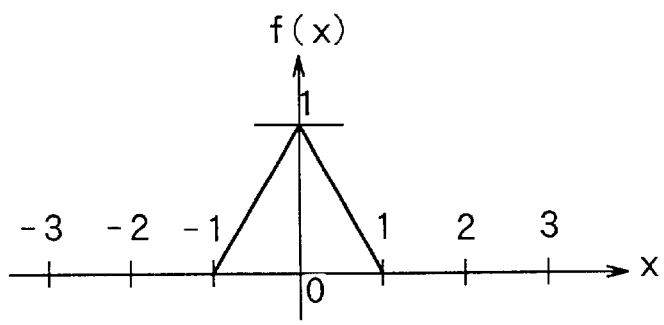

In the bilinear approximation method, data on one interpolated pixel is calculated from data on two pixels of the original image by using expression (9) and an interpolation function expressed by FIG. 21C. A variable x in expression (9) and FIG. 21C represents an amount obtained by normalizing a horizontal displacement from the pixel position of the original image by the sampling interval of the original image. The bilinear approximation method is also well known as "linear interpolation", and a weighted mean is calculated by the method.

$$f(x)=1-|x||x|\leq 1$$

$$f(x)=0 |x|>1 \quad \text{Expression (9)}$$

Figure 21D:
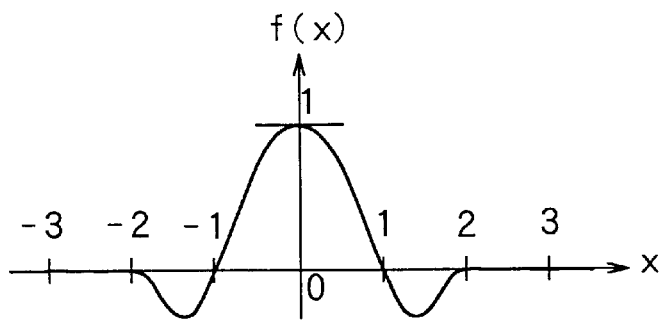

In the cubic approximation method, data on one interpolated pixel is calculated from data on four pixels of the original image by using expression (10) and an interpolation function expressed by FIG. 21D. A variable x in expression (10) and FIG. 21D represents an amount obtained by normalizing a horizontal displacement from the pixel position of the original image by the sampling interval of the original image.

$$f(x)=|x|^3-2|x|^2+1|x|\leq 1$$

$$f(x)=-|x|^3+5|x|^2-8|x|+4 \quad 1<|x|\leq 2$$

$$f(x)=0 \quad 2<|x| \quad \text{Expression (10)}$$

Convolution using these functions can be performed by the use of the so-called FIR (Finite Impulse Response) digital filter. In this case, the center of the interpolation function is matched to the interpolation point. Then, values, which are obtained by sampling the interpolation function on a sampling point of the original image neighboring by a predetermined number of pixels, are used as an interpolation filter coefficient set.

For example, in the case of interpolation by the bilinear approximation method, when the phase P is 0.0, two weights (filter coefficients) constituting the filter coefficient set are 1.0 and 0.0. Thus, the coefficient set is such a coefficient set that data values of the pixels of the original image having a position match may be outputted as they are. When the phase P is 0.5, two filter coefficients are 0.5 and 0.5. When the phase P is 0.3, two filter coefficients are 0.7 and 0.3.

In the case of interpolation by the cubic approximation method, when the phase P is 0.0, four weights (filter coefficients) constituting the filter coefficient set are 0.0, 1.0, 0.0 and 0.0. Thus, the coefficient set is such a coefficient set that data values of the pixels of the original image having a position match may be outputted as they are. When the phase P is 0.5, four filter coefficients are −0.125, 0.625, 0.625 and −0.125. When the phase P is 0.3, four filter coefficients are −0.063, 0.847, 0.363 and −0.147.

In actual operation, a plurality of filter coefficient sets for coping with different phases is needed because the phases P with the pixels of the original image differ according to every interpolation point for calculating data. The DSP circuit 55 is good at such operation.

In the embodiment, the enlargement of the image by the DSP circuit 55 increases the number of pixels without changing the size of the image.

Next, the data obtained by analyzing the detection signal from the index electrode 70 will be described with reference to FIGS. 22A to 22E.

FIGS. 22A to 22E show an example of the configuration of the index electrode 70 and a waveform of the detection signal outputted from the index electrode 70 in the cathode ray tube according to the embodiment. In the embodiment, the provision of notches 71 in the conductive index electrode 70 makes it possible to detect the scan position of the electron beams eBL and eBR in both of the horizontal direction (a line scan direction) and the vertical direction (a field scan direction). Although only the right electron beam eBR is illustrated in FIGS. 22A to 22E, the left electron beam eBL works in the same manner. As described above, in the embodiment, the line scan of the electron beam eBR is performed from the left to the right starting at the center of the screen, and the field scan is performed from the top to the bottom (in the Y direction in FIGS. 22A to 22E).

In FIG. 22A, locus BY is the locus of horizontal scan starting points of the electron beam eBR before image correction. In the example shown in FIG. 22A, the locus BY of the electron beam eBR before image correction has such a pincushion shape that the horizontal center portion is contracted and the horizontal top and bottom portions are stretched. Locus BY0 is the locus of horizontal scan starting points of the electron beam eBR after appropriate image correction. In the embodiment, in order to detect the position of the electron beam eBR, a plurality of electron beams B1 to B5 for position detection is allowed to pass through the index electrode 70 in the horizontal direction in the overscan region OS where the index electrode 70 is provided. The number of the electron beams B1 to B5 corresponds to at least the number of the notches 71. Hereinafter, the description will be given with regard to a case where image correction is appropriately performed and thus the electron beams pass through almost the centers of a plurality of notches 71 like electron beams B10 to B50 shown in FIG. 25A, for example. Incidentally, the number of electron beams for position detection to be passed through the index electrode 70 is not limited to the same number as the number of the notches 71.

When the electron beams B1 to B5 for position detection pass through the index electrode 70, the detection signal having two pulse signals is outputted as shown in FIG. 22B. The two pulse signals are signals outputted by the electron beams B1 to B5 passing through the electrode portion on both the ends of the notches 71. Time (th1 to th5) from the scan starting points (time: t=0) of the electron beams B1 to B5 to the edge of the first pulse signal represents amplitude of horizontal deflection and image distortion. When all the time becomes a fixed time th0, horizontal deflection is completely corrected.

FIG. 22C shows the detection signals outputted after horizontal deflection has been corrected. As described above, when the electron beams B1 to B5 pass through the area where the notches 71 are provided in the index electrode 70, two pulse signals are outputted. Pulse intervals (tv1 to tv5) of the outputted pulse signals correspond to the vertical position with respect to the notches 71. Therefore, when all the pulse intervals (tv1 to tv5) become a fixed time tv0, vertical amplitude and linearity are adjusted and thus vertical deflection is completely corrected. When both of horizontal deflection and vertical deflection are corrected, the detection signal is outputted as shown in FIG. 22D. That is, in the detection signal, the time from the scan starting point (t=0) to the edge of the first pulse signal is the fixed time th0, and the pulse interval between two pulses is a predetermined time tv0. At this time, as shown in FIG. 22E, ideal electron beams B1$a$ to B5$a$ pass through almost the center portions of a plurality of notches 71 in the index electrode 70.

Practically, the analysis of the pulse interval of the detection signal outputted from the above-mentioned index electrode 70 is performed by the index signal processing circuit 61 (see FIG. 4) analyzing the index signal S2 corresponding to the detection signal from the index electrode 70 obtained through the amplifier AMP1. The index signal processing circuit 61 outputs the data S3 required for the control unit 62 to create the magnitude of small displacement of the correction data, based on the analysis of the index signal S2. Based on the data S3 from the index signal processing circuit 61, the control unit 62 creates the magnitude of small displacement of the initial correction data previously stored in the correction data memory 60 and then creates the correction data to be supplied to the DSP circuits 55R1 and 55R2. The DSP circuits 55R1 and 55R2 correct image data based on the correction data supplied from the control unit 62. As a result, the control of the image data is performed, and thus image correction is performed so as to correct image distortion or the like. Incidentally, the left DSP circuits 55L1 and 55L2 operate in the same manner.

The cathode ray tube of the embodiment is capable of color display, and the electron beam eBR to be adjusted is used for each color R, G and B. Accordingly, the control of the image data is performed for each color R, G and B, whereby the correction of convergence can be automatized. Such automatic control enables automatic correction for image distortion having a pincushion shape like the locus BY shown in FIG. 22A.

The right half of the screen in the entire screen region, which is drawn by the right electron beam eBR, is corrected as described above. The left side of the screen is corrected by following the same steps for the left electron beam eBL. The left and right divided frames are corrected as described above, whereby the left and right divided frames are appropriately joined and displayed. Since only one index electrode 70 is provided, the scan position of both the electron beams eBL and eBR cannot be detected at completely the same time. Therefore, the left and right divided frames cannot be simultaneously corrected. However, the left and right divided frames can be corrected by, for example, alternately detecting the scan position of the electron beams eBL and eBR by every line scan or every field scan and thus alternately correcting the image data for the left and right divided frames.

Figures 23A, 23B, 23C, 23D, 23E:
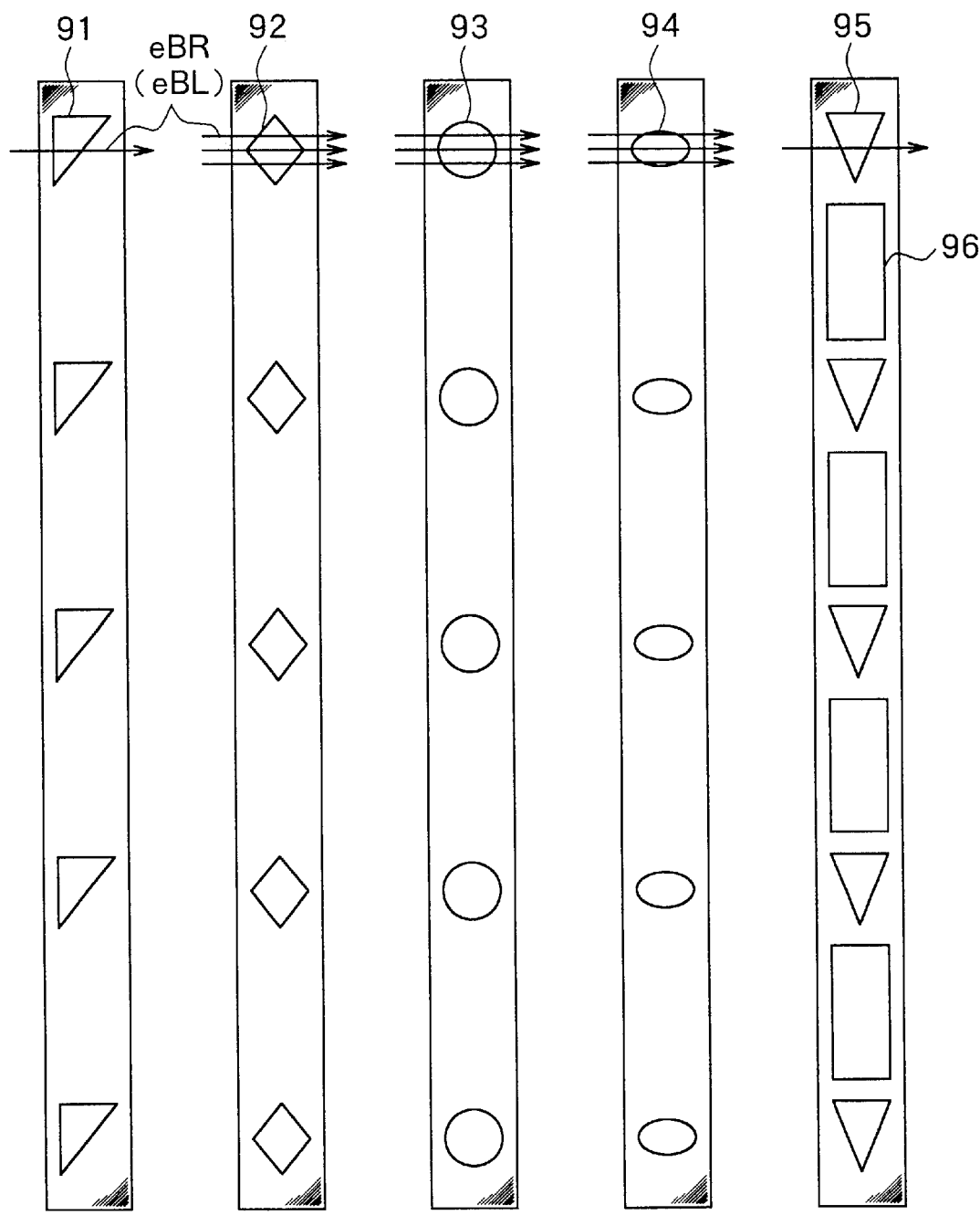
FIGS. 23A to 23E are diagrams illustrating other examples of the configurations of the index electrode according to the first example.

The shape of the notches 71 provided in the index electrode 70 is not limited to the above-described inverted delta, and notches having various shapes as shown in FIGS. 23A to 23E can be used. In the example shown in FIG. 23A, notches 91 are substantially shaped like a right triangle which becomes smaller downward in the horizontal direction. When the electrode of the example shown in FIG. 23A is used, the detection of the scan position of the electron beams eBL and eBR is basically the same as the detection using the index electrode 70 shown in FIG. 22A. FIGS. 23B, 23C and 23D show examples of the electrode having rhombic notches 92, the electrode having circular notches 93 and the electrode having elliptical notches 94, respectively. In the examples shown in FIGS. 23B, 23C and 23D, it is necessary to pass a plurality of electron beams (e.g., three electron beams) through the center of one notch in order to obtain information on the vertical position, because the shape of each notch is vertically symmetrical. FIG. 23E shows an example in which notches 95 for position detection are provided while notches 96 for decreasing the stray capacitance generated in the tube are provided. In the example shown in FIG. 23E, the notches 96 are cut in the electrode, specifically, the region which is not used for position detection. The example has an advantage of decreasing the stray capacitance between the electrode and the inside conductive film 22, the beam shield 27 or the like which is kept to the anode voltage HV and thus improving high frequency characteristic of the detection signal.

FIGS. 22A to 22E and FIGS. 23A to 23E show examples in which five notches are provided in one index electrode. However, the number of notches to be provided in the index electrode is not limited to five but may be more or less than five. When image distortion includes more complicated component of a high order, it is necessary to improve detection precision by increasing the number of notches. It is not necessary that a plurality of notches is provided at regular intervals.

In the above description, the respective scan positions of the electron beams eBL and eBR are detected by one index electrode 70. However, it is also possible to separately detect the respective scan positions of the electron beams eBL and eBR by providing a plurality of index electrodes 70.

Figure 24A:
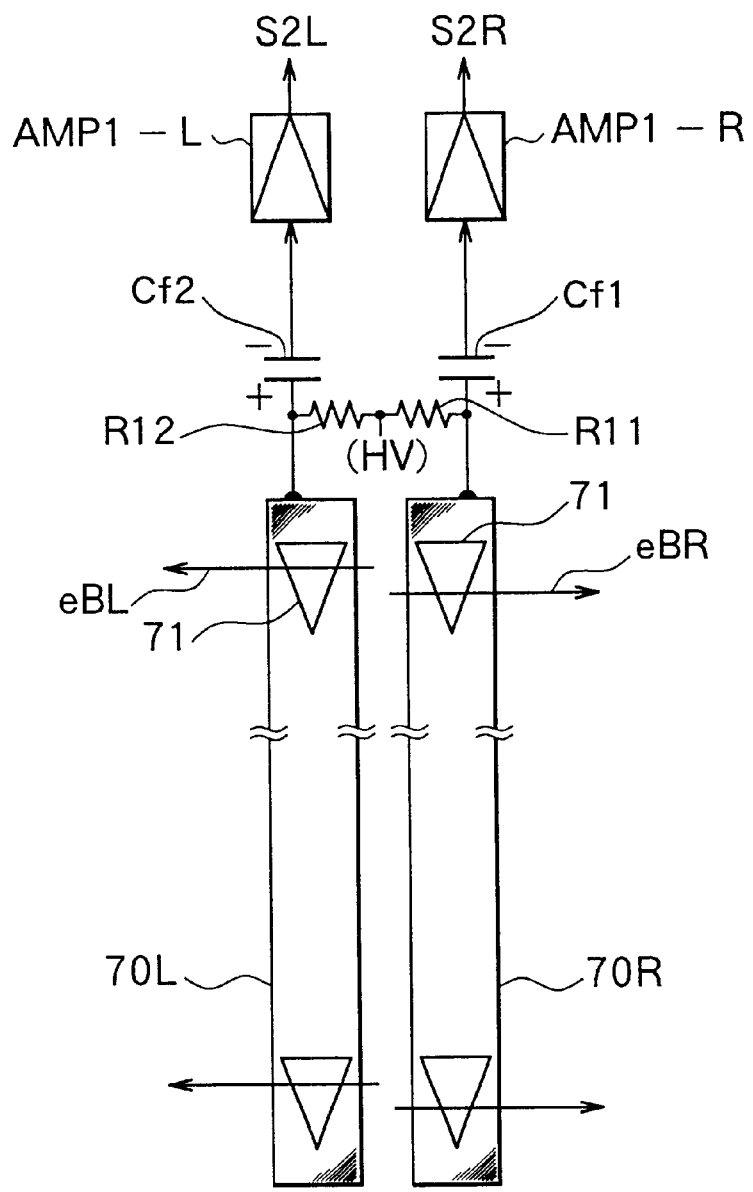
FIG. 24A is an external view showing still another example of the configuration of the index electrode according to the first example.
Figure 24B:
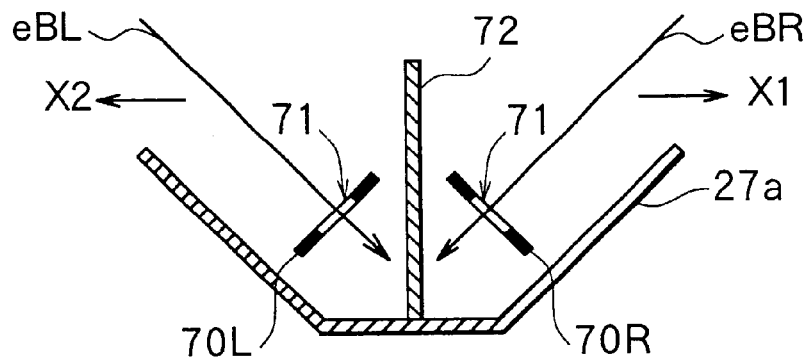
FIG. 24B is a view showing the components around the periphery of the index electrode shown in FIG. 24A.

FIGS. 24A and 24B are configuration diagrams showing the configuration of the index electrode capable of separately detecting the respective scan positions of the left and right electron beams eBL and eBR and the peripheral configuration of the index electrode. FIG. 24A shows only main structural components in a peripheral circuit of index electrodes 70L and 70R. In the example shown in FIGS. 24A and 24B, on the side of the joint area of the left and right divided frames, the index electrode 70L is provided in the over-scan region of the electron beam eBL and the index electrode 70R is provided in the over-scan region of the electron beam eBR. Basic configuration of the index electrodes 70L and 70R is the same as that of the index electrode 70 shown in FIG. 22A in which a plurality of notches 71 shaped like the inverted delta is provided at regular intervals in the longitudinal direction.

Also, the configuration of the peripheral circuit for leading the detection signal of the index electrodes 70L and 70R is basically the same as that of the index electrode 70. When the electrode beams eBR and eBL are incident on and strike the index electrodes 70R and 70L, respectively, voltage drop occurs separately in each electrode and the signals responsive to the voltage drop are led out of the tube as separate detection signals via capacitors Cf1 and Cf2, respectively. The detection signals from the electrodes which have been led out of the tube are outputted as separate index signals S2R and S2L through amplifiers AMP1-R and AMP1-L, respectively. By separately processing the separate index signals S2R and S2L in the processing circuit outside the tube, it is possible to separately and simultaneously detect the respective scan positions of the electron beams eBL and eBR and to simultaneously correct the left and right divided frames.

For example, as shown in FIG. 24B, a mountain-shaped beam shield 27a is located between the index electrodes 70L and 70R and the phosphor screen 11 (not shown in FIGS. 24A and 24B). A shield plate 72 for shielding each of the electrode beams eBL and eBR is provided in the center of the beam shield 27a. The index electrodes 70L and 70R are provided on the left and right sides, respectively, of the shield plate 72 provided in the center of the beam shield 27a. FIG. 24B shows an example in which the index electrodes 70L and 70R are inclined to the phosphor screen 11. However, the index electrodes 70L and 70R do not necessarily have to be inclined to the phosphor screen 11 but may be located so as to face the phosphor screen 11.

Next, correction of luminance will be described with reference to FIGS. 25 to 28.

In the embodiment, special luminance modulation is applied to the pixels corresponding to the overlap region OL in order to adjust luminance in the overlap region OL of the left and right divided frames. In the embodiment, the luminance modulation is performed by correcting a value about luminance of image data in the DSP circuits 50L and 50R for luminance correction.

Figure 25:
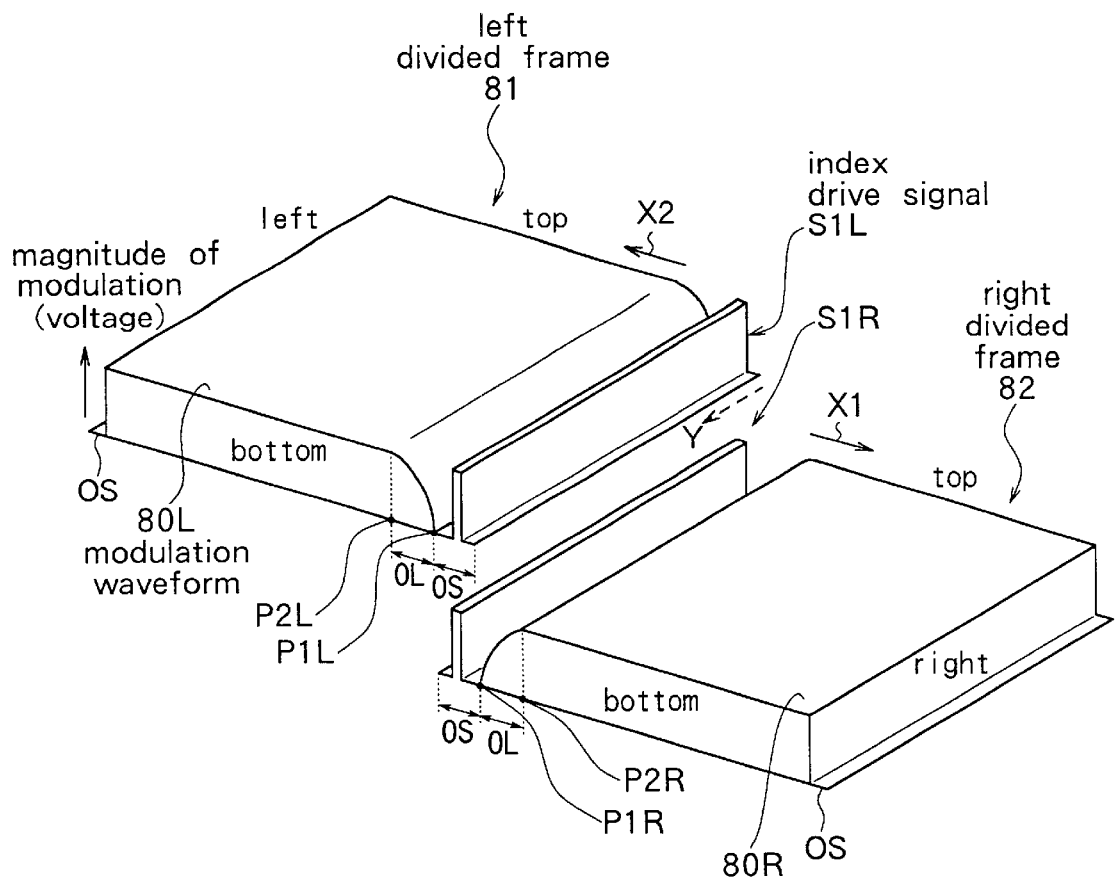
FIG. 25 is a diagram illustrating three-dimensionally the relation of the positions of the divided frames in the cathode ray tube according to the first example, and modulation waveforms in luminance.

FIG. 25 is an illustration of an outline of modulation for the image data and three-dimensionally represents the correlation between the position of each divided frame and the modulation waveform. In FIG. 25, the area indicated by reference numeral 81 corresponds to the left divided frame, and the area indicated by reference numeral 82 corresponds to the right divided frame. In the over-scan region OS on the side of the joint area of the divided frames 81 and 82, as described above, the detection signals are outputted by the electron beams eBL and eBR scanning the index electrode 70. FIG. 25 also shows the waveforms of index drive signals S1L and S1R which are drive signals for scan in the over-scan region OS of each of the electron beams eBL and eBR.

In the embodiment, as represented by the modulation waveforms 80L and 80R in FIG. 25, drawing is started at starting points P1L and P1R of the overlap region OL in each of the divided frames 81 and 82, and correction of luminance modulation of the image data is performed by gradually increasing amplitude of drawing so that a volume of drawing becomes maximum at endpoints P2L and P2R of the overlap region OL. Thereafter, in a region other than the overlap region OL, the magnitude of modulation is maintained to the end of the frame. Such modulation is simultaneously performed on the divided frames 81 and 82 and control is performed so that the sum of luminance of both of the frames is constant at any position in the overlap region OL, whereby the joint area of both of the frames can be inconspicuous.

Modulation control of luminance in the overlap region OL will be considered in further detail. In general, luminance of a cathode ray tube is proportional to cathode current Ik of the electron guns 31L and 31R (see FIG. 1A). The correlation between the cathode current Ik and cathode drive voltage Vk to be applied to the cathodes of the electron guns 31L and 31R is expressed by the following expression (11).

$$Ik \propto Vk^\gamma \qquad \text{Expression (11)}$$

In expression (11), γ is a constant characteristic of the cathode ray tube and the value is, for example, about 2.6. When luminance modulation is applied to the input image data, the magnitude of modulation must be set in consideration of gamma characteristic because of a nonlinear correlation between the cathode drive voltage Vk and the cathode current Ik as described above.

Figure 26:
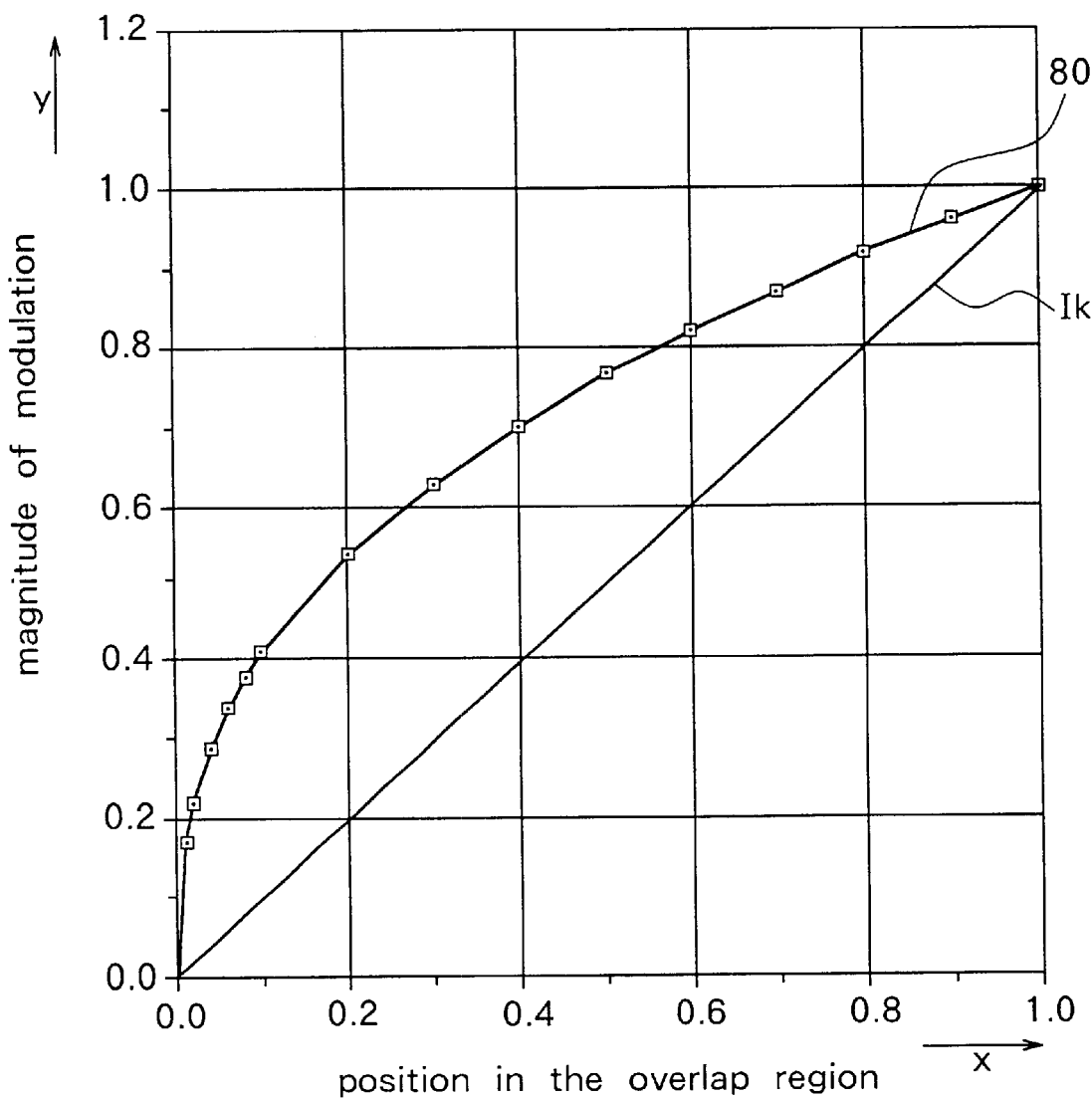
FIG. 26 is a graphical representation of an example of the relation between a cathode current corresponding to luminance and a modulation waveform in the cathode ray tube according to the first example.

FIG. 26 is a graph of an example of the correlation between the cathode current Ik corresponding to luminance and the waveform of the magnitude of luminance modulation. The axis of abscissas shown in the FIG. 26 represents the position in the overlap region OL, and the endpoints P2L and P2R of the overlap region OL are standardized to 1.0 with the starting points P1L and P1R thereof being the origin. The axis of ordinates shown in FIG. 26 represents the magnitude of modulation. As shown in FIG. 26, for example, the modulation waveform 80 describes a curve having an upwardconvex shape so that the slope of luminance (cathode current Ik) in each of the divided frames 81 and 82 is linear. In this case, the modulation waveform 80 corresponds to the modulation waveforms 80L and 80R in the overlap region OL shown in FIG. 25. The modulation waveform 80 is obtained by the following equation (12) based on the above expression (11).

$$y = 10^{1/\gamma \cdot \log Ik} \qquad \text{Equation (12)}$$

Equation (12) is a function in which the cathode current Ik is a variable. The following equation (13) is an equation in which Ik=x is applied to equation (12).

$$y = 10^{1/\gamma \cdot \log x} \qquad \text{Equation (13)}$$

The modulation waveform 80 in FIG. 26 is expressed by equation (13). Such modulation is simultaneously applied to the image data for the divided frames 81 and 82, whereby the sum of luminance in the overlap region OL can be consequently kept to a constant value.

Figure 27:
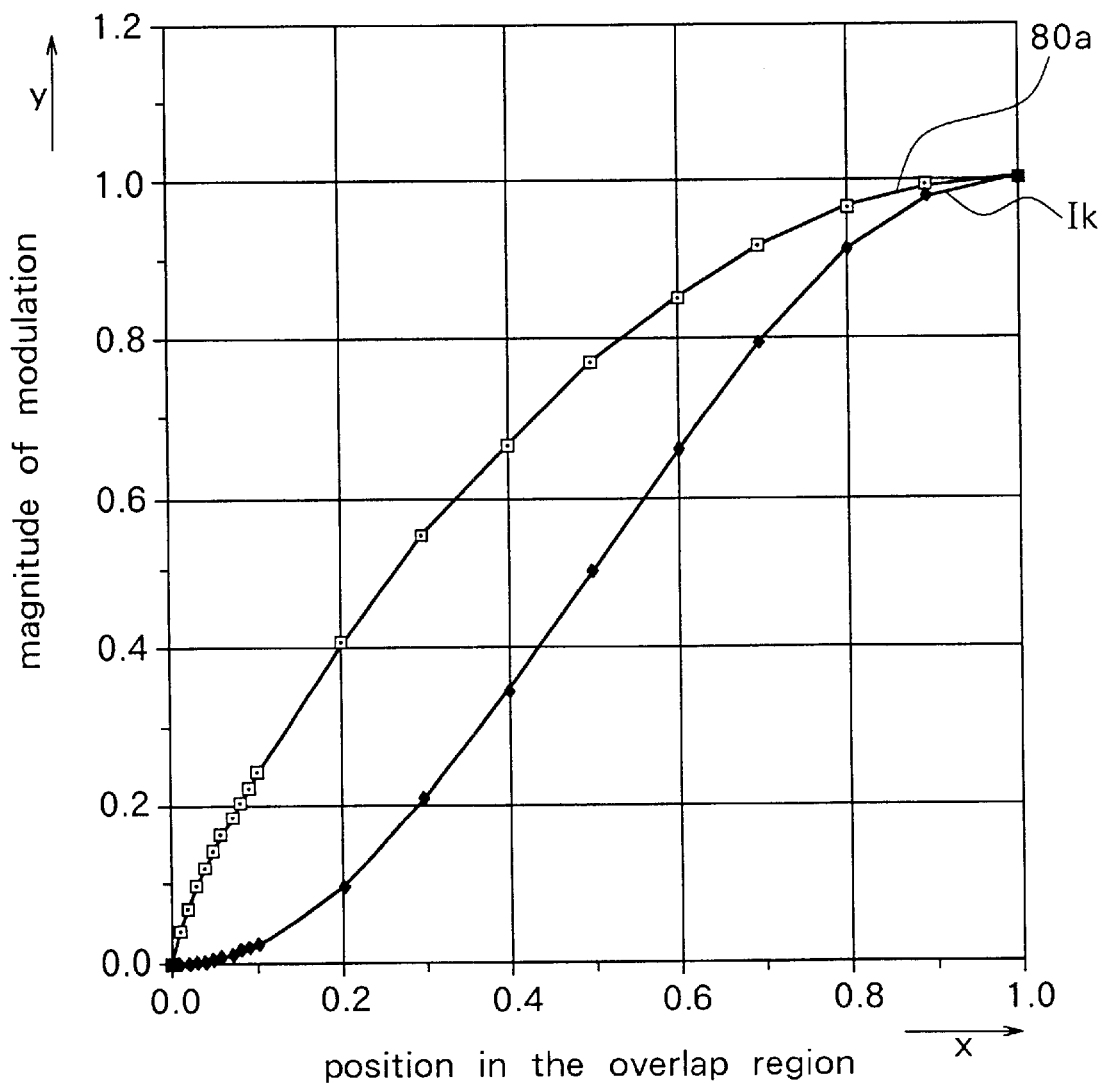
FIG. 27 is a graphical representation of another example of the relation between a cathode current corresponding to luminance and a modulation waveform in the cathode ray tube according to the first example.

FIG. 27 is a graph of another example of the correlation between the cathode current Ik corresponding to luminance and the waveform of the magnitude of luminance modulation. In FIG. 26, the slopes of luminance in the divided frames 81 and 82 are linear. However, modulation of a function (e.g., cosine function) is also possible in which a derivative (differential coefficient) of luminance (cathode current Ik) change in both ends of the overlap region OL is zero. In the example shown in FIG. 27, the cathode current Ik corresponding to luminance is a function expressed by $\{1/2(1-\cos\pi x)\}$. Accordingly, a modulation waveform 80$a$ in FIG. 27 is expressed by the following equation (14).

$$y = 10^{1/\gamma \cdot \log\{1/2(1-\cos\pi x)\}}$$
Equation (14)

When such luminance modulation is performed, apparent luminance change in the overlap region OL becomes more natural and it leaves more space for errors in the position of the joint area of the left and right divided frames.

There are innumerable functions in which the derivative (differential coefficient) of the luminance change reaches a null shown in FIG. 27. For example, the function may be a function in which a parabolic (quadratic) curve is compounded.

The above-described control of luminance is performed in the following manner. For example, the index signal processing circuit 61 (see FIG. 4) judges the starting points P1L and P1R of the overlap region OL in the left and right divided frames, based on the index signal S2 from the index electrode 70. Then, the index signal processing circuit 61 transmits the result of judgment to the control unit 62. Thus, luminance modulation is performed from the starting points P1L and P1R of the overlap region OL. The DSP circuits 50L and 50R for luminance correction perform modulation control of luminance of the left and right image data in accordance with instructions from the control unit 62. The left and right image data subjected to luminance modulation is reflected to the cathode drive voltage supplied to the cathode (not shown) located inside each of the electron guns 31L and 31R. Hence, the electron beams eBL and eBR based on the image data subjected to luminance modulation are projected from the electron guns 31L and 31R, respectively.

Figure 28:
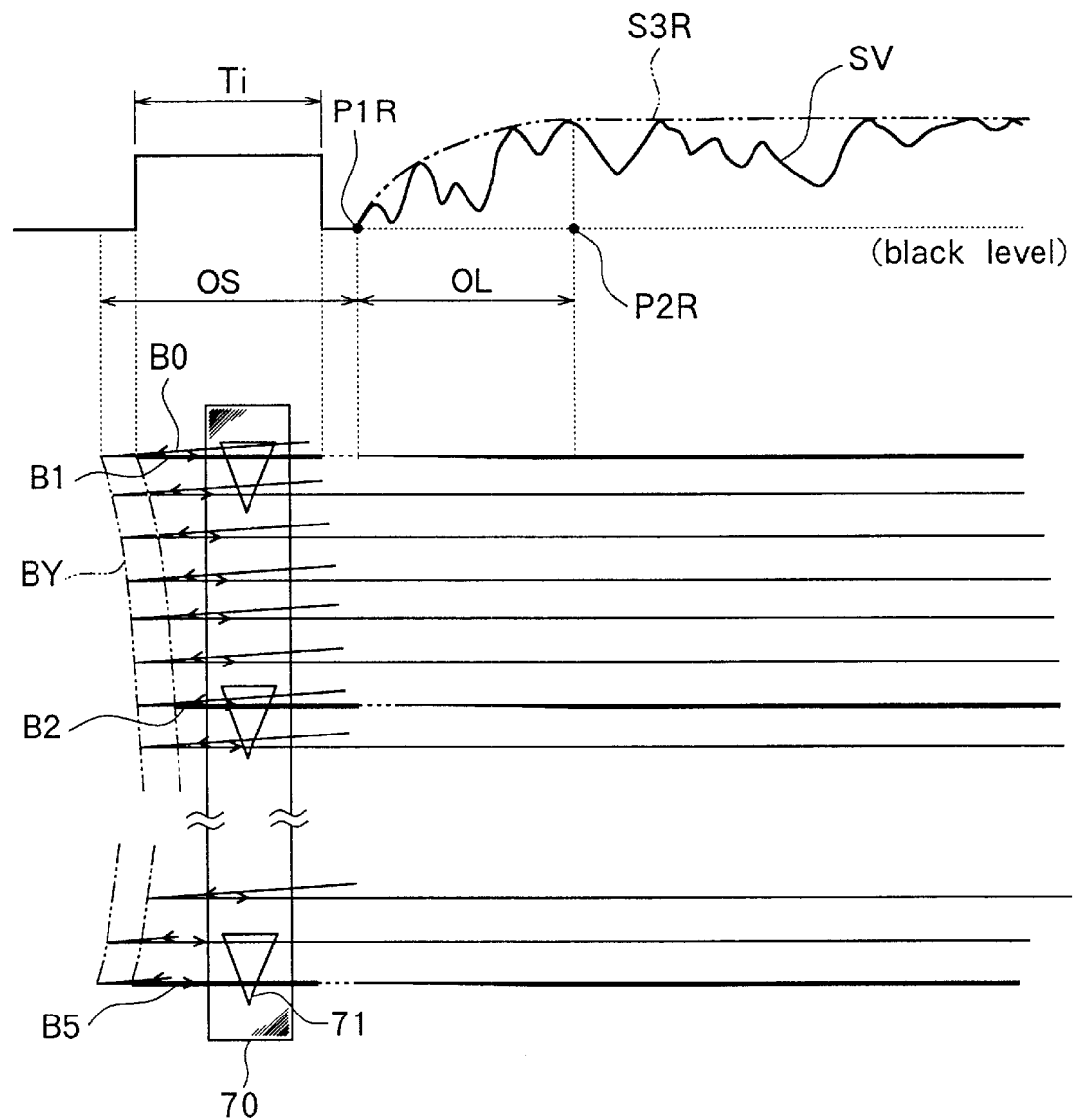
FIG. 28 is a diagram illustrating the relation between the position where an electron beam scans and the timing of modulation control in luminance in the cathode ray tube according to the first example.

FIG. 28 is a figure showing the correlation between the scan positions of the electron beams and the timing of modulation control of luminance. Although only the electron beam eBR on the right side is shown in FIG. 28, the electron beam eBL on the left side is the same. In the embodiment, as described referring to FIGS. 22A to 22E, a plurality of electron beams B1, B2, . . . for detecting position is adapted to scan on the index electrode 70 in the over-scan region OS. In FIG. 28, Ti indicates the time when a plurality of electron beams B1, B2, . . . for detecting position is being outputted based on the index drive signal S1R shown in FIG. 25. FIG. 28 also shows a flyback B0 of the electron beams B1, B2, . . . When the electron beams shift from the over-scan region OS to the overlap region OL, scan based on a video signal SV from the starting point P1R is performed. In FIG. 28, a modulation waveform S3R representing luminance correction is shown so as to correspond to the video signal SV.

The timing of performing correction of image data based on the above-mentioned index signal S2 can be optionally set. For example, correction of image data can be performed at the time of starting the cathode ray tube, can be intermittently performed at constant intervals or can be performed at all times. The control of image data may be alternatively performed on the left and right divided frames. Provided that the result of correction of image data is reflected to the next field scan of each of the electron beams eBL and eBR (so-called feed back loop), image distortion and the like caused by a change of the outside surroundings such as terrestrial magnetism can be automatically corrected even if the set position or direction of the cathode ray tube is changed during its operation. In addition, even when the scan screen changes due to the change of each processing circuit over time, it is possible to automatically reduce the influence of the change and thus display the appropriate image. When the operation of each processing circuit is stable and the set position thereof is steady, it is sufficient that the correction is performed only at the time of starting the cathode ray tube. As described above, in the embodiment, the influence on the position and luminance of the displayed image caused by the change of outside surroundings such as terrestrial magnetism or the change of each processing circuit over time is automatically corrected, and thus the left and right divided frames are appropriately joined to be displayed.

As described above, according to the embodiment, operation for correcting the image data in the horizontal direction is performed by the DSP circuits 55L1 and 55R1 so that the left and right divided frames may be appropriately joined and displayed in the horizontal direction. Then, the orders of the write address and the read address on/from the frame memories 56L and 56R are appropriately changed, whereby the image data outputted from the DSP circuits 55L1 and 55R1 is appropriately converted so that the image data may enter a state suitable for operation for correcting the image data in the vertical direction. Then, operation for correcting the image data read from the frame memories 56L and 56R in the vertical direction is performed by the DSP circuits 55L2 and 55R2 so that the left and right divided frames may be appropriately joined and displayed in the vertical direction. Thus, operation for correcting the image data is facilitated. Also, the left and right divided frames can be joined so that the joint area thereof may be inconspicuous, and therefore excellent image display can be performed.

Moreover, according to the embodiment, operation for correcting the image data is performed based on the correction data for correcting a display state of the image, which is obtained from the image displayed on the screen, so that the image may be appropriately displayed. Then, the corrected image data is outputted as the image data for display. Therefore, image distortion and misconvergence can be reduced as compared to the related-art method in which the image is adjusted using the deflection yoke or the like. For example, a deflection magnetic field must be distorted in order to eliminate image distortion and the like by the deflection yoke and the like, and thus a problem arises: the deflection magnetic field is not a uniform magnetic field. Consequently, the magnetic field deteriorates a focus (a spot size) of the electron beam. On the other hand, in the embodiment, it is not necessary to adjust image distortion and the like by the magnetic field of the deflection yoke. Thus, the deflection magnetic field can be the uniform magnetic field, and therefore focus characteristic can be improved. Moreover, once all the correction data is created and stored, image distortion and the like can be thereafter corrected automatically.

Furthermore, according to the embodiment, the time for developing and designing a special deflection yoke for use in correction of image distortion and the like is not required, and therefore the time and cost for developing the deflection yoke can be reduced. Additionally, in the embodiment, since a large amount of correction of image distortion and the like can be provided, assembly precision can be decreased and thus manufacturing costs can be reduced. When the influence of an external magnetic field such as terrestrial magnetism is previously known, information on the influence can be also used as the correction data and therefore more excellent image display can be performed.

As described above, according to the embodiment, high-quality image display can be performed at low cost by correcting a poor display state such as image distortion. Accordingly, correction of image distortion and the like of a wide-angle or flat cathode ray tube can be also optimally performed. Moreover, according to the embodiment, image processing associated with the joint of the left and right divided frames is performed on the memory. Thus, even under a condition where the display state of the image changes every moment over time, appropriate image display can be performed in response to the change so that the joint area of the left and right divided frames may be inconspicuous.

Second Embodiment

Next, a second embodiment of the invention will be described.

Figure 29:
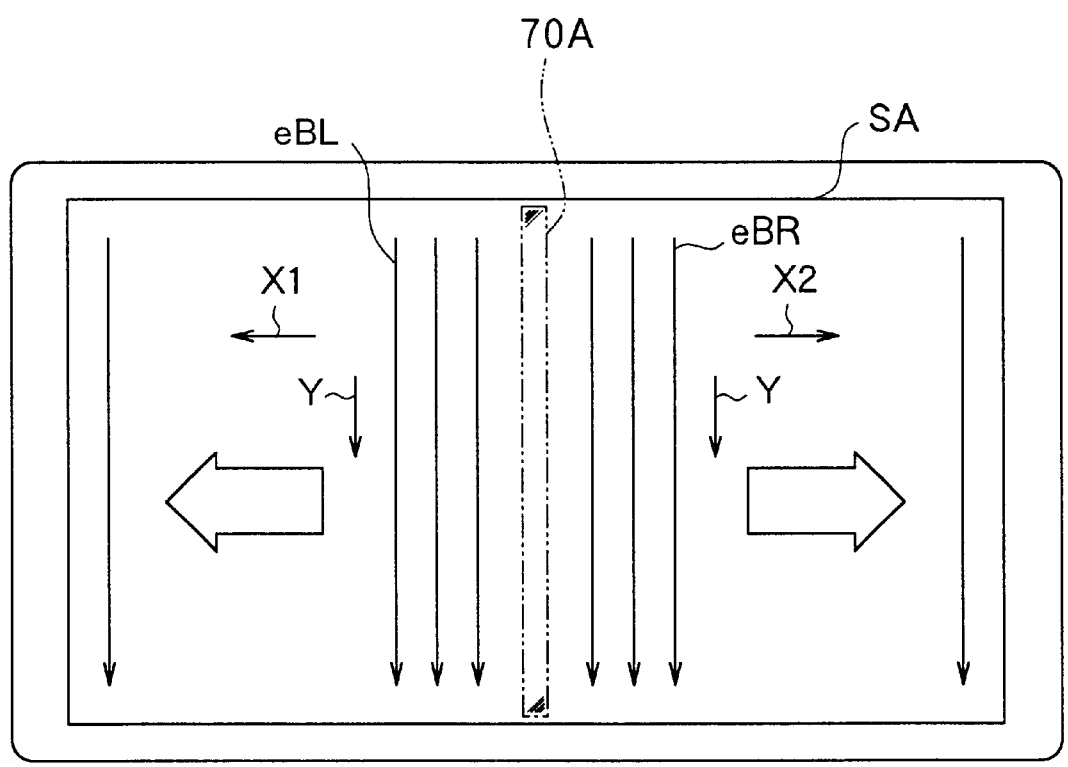
FIG. 29 is a view showing the scan direction of electron beams in the cathode ray tube according to a second example.

In the second embodiment, as shown in FIG. 29, the line scan of each of the electron beams eBL and eBR is performed from the top to the bottom (in the Y direction in FIG. 29), and the field scan is performed in the opposite directions (the X1 and X2 directions in FIG. 29) from the center of the screen to the right or left side thereof in the horizontal direction. As described above, in the embodiment, the line scan and field scan of each of the electron beams eBL and eBR are performed in a reverse manner to the first embodiment.

FIGS. 33A to 33G show the configuration of an index electrode for use in the cathode ray tube of the embodiment and an example of the waveform of the detection signal outputted from the index electrode. In FIGS. 33A to 33G, the left side of the sheet corresponds to the upper part of the screen, and the right side of the sheet corresponds to the lower part of the screen. An index electrode 70A of the embodiment has rectangular notches 131 whose longitudinal direction is perpendicular to the line scan direction (the Y direction) of the electron beams eBL and eBR, and slender notches 132 inclined to the field scan direction (the X1 and X2 directions in FIG. 29) of the electron beams eBL and eBR. A plurality of notches 131 and 132 is alternately located. As a result, in the example shown in FIGS. 33A to 33G, the notches 131 are positioned on both ends of the index electrode 70A. The neighboring notches 131 are spaced at regular intervals. The neighboring notches 132 are also spaced at regular intervals.

Figure 33:
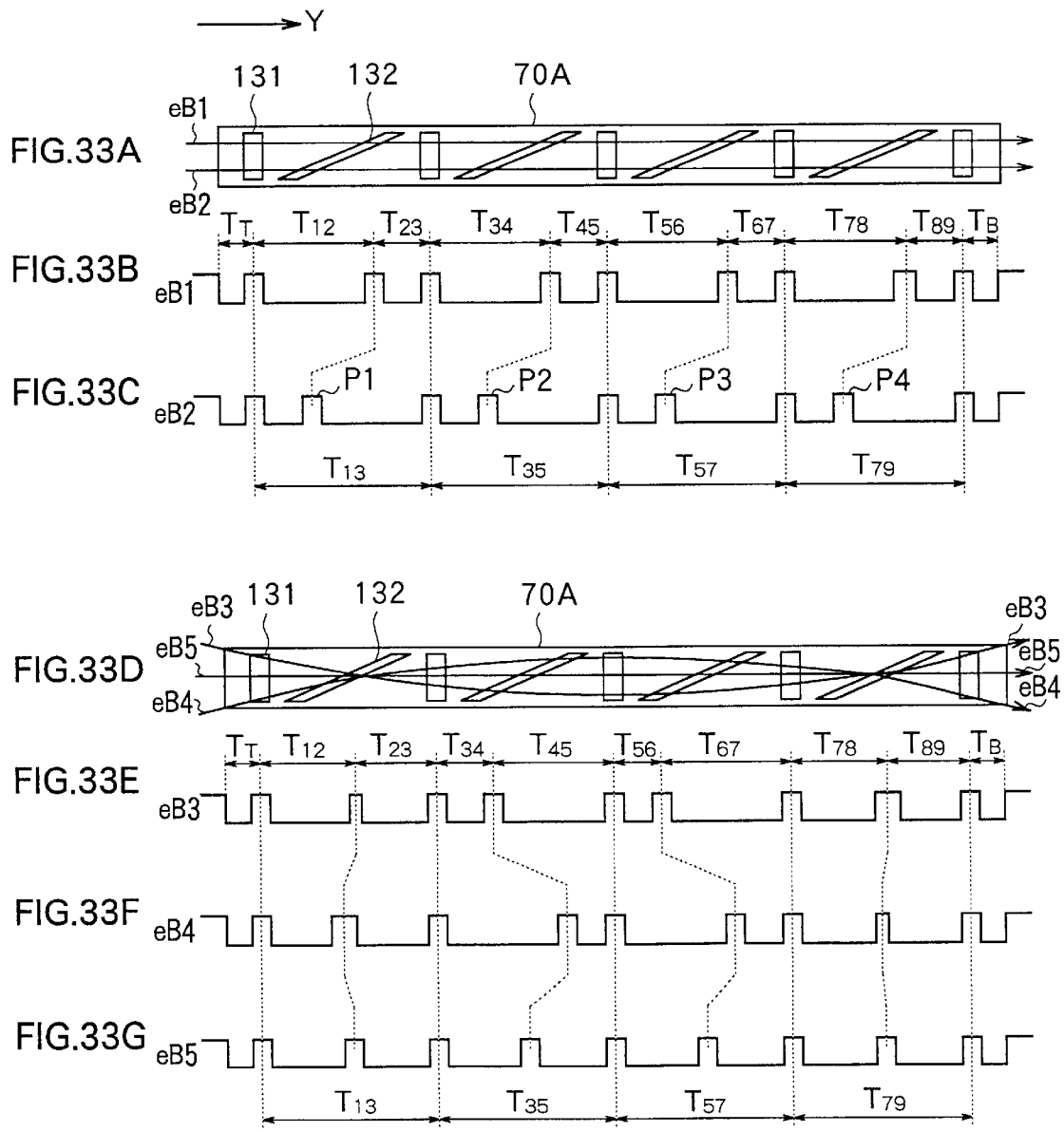
FIGS. 33A to 33G are diagrams illustrating the configuration of the index electrode in the cathode ray tube according to the second example, and an operation of position detection using the index electrode.

In the index electrode 70A, as shown in FIG. 33A, when two electron beams eB1 and eB2 for detecting position pass through the index electrode 70A in the line scan direction, the detection signals shown in FIGS. 33B and 33C are outputted. In FIGS. 33B and 33C, the amplitude and position of the line scan of the electron beams eB1 and eB2 can be detected from time $T_T$ and $T_B$ shown on the both ends. Inconsistency in time $T_{13}$, $T_{35}$, $T_{57}$ and $T_{79}$ in which the electron beams eB1 and eB2 are passing through the neighboring notches 131 indicates the quality of linearity characteristic of the line scan. The positions of the pulse signals (pulses P1 to P4 in FIG. 33C), which are generated when the electron beams eB1 and eB2 pass through the oblique notches 132, indicate the information on the amplitude of the field scan.

FIG. 33E shows the detection signal which is outputted from the index electrode 70A when an electron beam eB3 with pincushion distortion passes through the index electrode 70A as shown in FIG. 33D. FIG. 33F shows the detection signal which is outputted from the index electrode 70A when an electron beam eB4 with barrel distortion passes through the index electrode 70A as shown in FIG. 33D. FIG. 33G shows the detection signal which is outputted when an electron beam eB5 passes through almost the center of the index electrode 70A in the longitudinal direction as shown in FIG. 33D. As can be seen from these figures, the detection signals with different waveforms are outputted from the index electrode 70A according to the difference in the scan position and scan timing of the passing electron beams eBL and eBR. Therefore, for example, the path of each of the electron beams eBL and eBR on the index electrode 70A can be estimated by observing and analyzing the phase of a pulse signal line when the electron beams eBL and eBR pass through each of the notches 131 and 132.

Practically, the analysis of the phase of the pulse signal line is performed by the index signal processing circuit 61 (see FIG. 4) analyzing the index signal S2 corresponding to the detection signal from the index electrode 70A obtained via the amplifier AMP1. The index signal processing circuit 61 outputs the data S3 required for the control unit 62 to create the magnitude of small displacement of the correction data, based on the analysis of the index signal S2. Based on the data S3 from the index signal processing circuit 61, the control unit 62 creates the magnitude of small displacement of the initial correction data previously stored in the correction data memory 60 and then creates the correction data to be supplied to the DSP circuits 55R1 and 55R2. The DSP circuits 55R1 and 55R2 correct image data based on the correction data supplied from the control unit 62. As a result, the control of the image data is performed, and thus image correction is performed so as to correct image distortion or the like. Incidentally, the left DSP circuits 55L1 and 55L2 operate in the same manner.

In the embodiment, the left and right divided frames are appropriately joined and displayed by performing such image correction on both the left and right divided frames. Since only one index electrode 70A is provided, the scan position of both the electron beams eBL and eBR cannot be detected at completely the same time. Therefore, the left and right divided frames cannot be simultaneously corrected. However, the left and right divided frames can be corrected by, for example, alternately detecting the scan position of the electron beams eBL and eBR by every line scan or every field scan and thus alternately correcting the image data for the left and right divided frames.

In the above description, the respective scan positions of the electron beams eBL and eBR are detected by one index electrode 70A. However, the provision of a plurality of index electrodes 70A makes it possible to separately detect the scan positions of the electron beams eBL and eBR. When a plurality of index electrodes 70A is provided, the configuration of the electrode and its peripheral structure is the same as the configuration described by referring to FIGS. 24A and 24B in the first embodiment. By providing a plurality of index electrodes 70A, the scan positions of the electron beams eBL and eBR can be separately and simultaneously detected, and the left and right divided frames can be simultaneously corrected.

Figure 30:
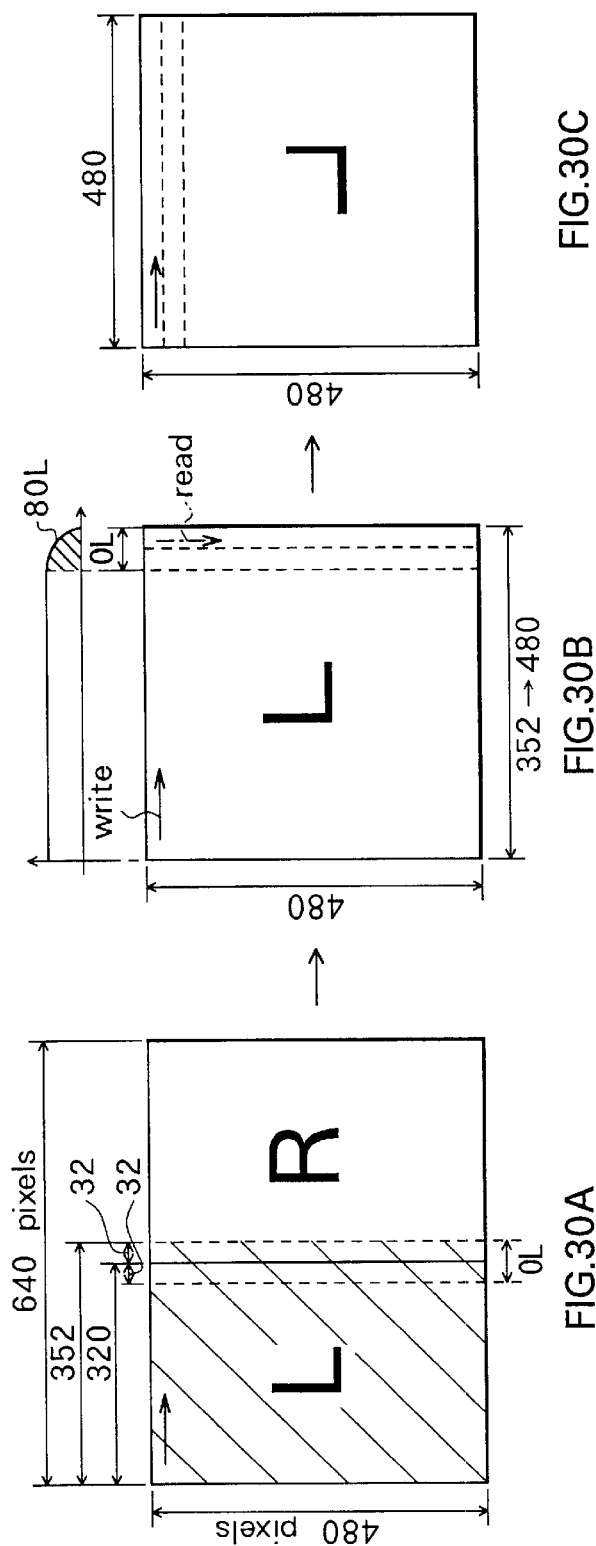
FIGS. 30A to 30E are diagrams for illustrating an example of an operation performed in the cathode ray tube according to the second example with respect to image data for generating a left divided frame.

By referring to FIGS. 30A to 30E, a specific example of operation for the image data for the left divided frame in the cathode ray tube of the embodiment will now be described. In the embodiment, the configuration of the signal processing circuit for performing operation for the image data for the left divided frame is the same as that of the processing circuit shown in FIG. 4. FIG. 30A shows the image data which is read from the frame memory 53 and inputted to the DSP circuit 50L in the embodiment. The image data inputted to the DSP circuit 50L is the same as the image data described by referring to FIG. 5A in the first embodiment. For example, the image data of 640 horizontal pixels×480 vertical pixels is inputted.

FIG. 30B shows the image data which is written on the frame memory 56L after image correction by the DSP circuit 50L and the DSP circuit 55L1 in the embodiment. Similarly to the DSP circuit 50L described by referring to FIG. 5B in the first embodiment, before correction by the DSP circuit 55L1, the DSP circuit 50L applies operation for luminance correction in the overlap region OL to the data of 352 horizontal pixels×480 vertical pixels diagonally shaded in FIG. 30A, independently of position correction. In FIG. 30B, the modulation waveform 80L representing luminance correction in the left divided frame is shown so as to correspond to the image data. The details of luminance correction are the same as those described in the first embodiment.

On the other hand, after luminance correction by the DSP circuit 50L, the DSP circuit 55L1 applies operation with correction in the horizontal direction to the data of 352 horizontal pixels×480 vertical pixels diagonally shaded in FIG. 30A. The operation enlarges the image from 352 pixels to 480 pixels in the horizontal direction, thereby creating the image data of 480 horizontal pixels×480 vertical pixels, as shown in FIG. 30B. The operation is performed in the same manner as the first embodiment. Simultaneously with the enlargement of the image, the DSP circuit 55L1 performs operation for correcting horizontal image distortion or the like based on the correction data stored in the correction data memory 60 and the data for correction obtained by analyzing the detection signal from the index electrode 70A.

In the frame memory 56L, the image data operated by the DSP circuit 50L and the DSP circuit 55L1 is stored for each color in accordance with the control signal Sa3L indicating the write address generated by the memory controller 63. In the example of FIG. 30B, the image data is sequentially written rightward starting at the upper left. The image data stored in the frame memory 56L is read for each color in accordance with the control signal Sa4L indicating the read address generated by the memory controller 63 and is inputted to the DSP circuit 55L2. In the embodiment, the respective orders of the write address and the read address on/from the frame memory 56L, which are generated by the memory controller 63, differ from each other. In the example of FIG. 30B, the read address is generated in such a manner that the image data is sequentially read downward starting at the upper right.

FIG. 30C shows the image data which is read from the frame memory 56L and is inputted to the DSP circuit 55L2. As mentioned above, in the embodiment, the order of the read address from the frame memory 56L is the order in which the image data is read downward starting at the upper right. Therefore, the image inputted to the DSP circuit 55L2 takes the form of the image which is converted so that the image shown in FIG. 30B is rotated 90° counterclockwise.

The DSP circuit 55L2 applies operation with correction in the vertical direction to the data of 480 horizontal pixels× 480 vertical pixels (see FIG. 30C) which has been read from the frame memory 56L. The operation enlarges the image from 480 pixels to 640 pixels in the horizontal direction, thereby creating the image data of 640 horizontal pixels×480 vertical pixels, as shown in FIG. 30D. Simultaneously with the enlargement of the image, the DSP circuit 55L2 performs operation for correcting vertical image distortion or the like based on the correction data stored in the correction data memory 60 and the data for correction obtained by analyzing the detection signal from the index electrode 70A.

The scan of the electron beam eBL is performed from the top to the bottom based on the image data (see FIG. 30D) obtained through the above-mentioned operation, whereby the frame diagonally shaded in FIG. 30E is displayed on the left side on the phosphor screen 11. In the embodiment, as described above, the input image data is corrected in consideration of image distortion or the like. Therefore, the left image displayed on the phosphor screen 11 is appropriately displayed without image distortion or the like.

Figure 31:
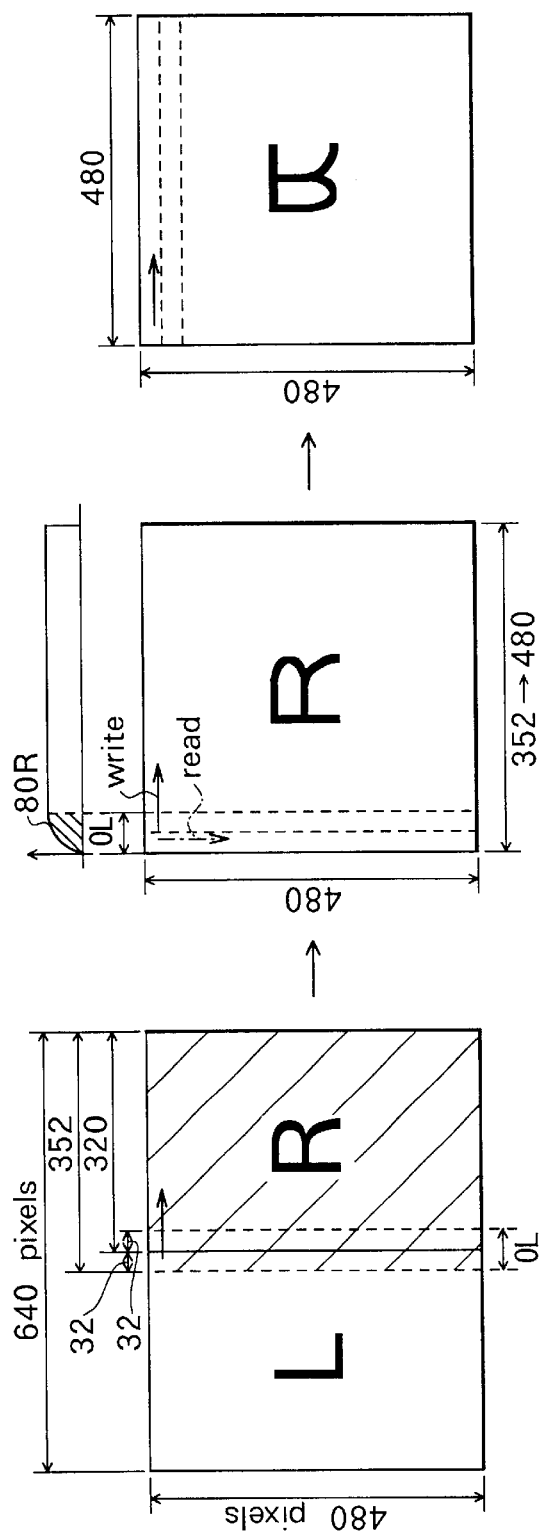
FIGS. 31A to 31E are diagrams for illustrating an example of an operation performed in the cathode ray tube according to the second example with respect to image data for generating a right divided frame.

By referring to FIGS. 31A to 31E, a specific example of operation for the image data for the right divided frame in the cathode ray tube of the embodiment will now be described. In the embodiment, the configuration of the processing circuit for performing operation for the image data for the right divided frame is the same as that of the processing circuit shown in FIG. 4. FIG. 31A shows the image data which is read from the frame memory 53 and inputted to the DSP circuit 50R in the embodiment. The image data inputted to the DSP circuit 50R is the same as the image data described by referring to FIG. 6A in the first embodiment. For example, the image data of 640 horizontal pixels×480 vertical pixels is inputted.

FIG. 31B shows the image data which is written on the frame memory 56R after image correction by the DSP circuit 50R and the DSP circuit 55R1 in the embodiment. Before correction by the DSP circuit 55R1, the DSP circuit 50R applies operation for luminance correction in the overlap region OL to the data of 352 horizontal pixels×480 vertical pixels diagonally shaded in FIG. 31A, independently of position correction. In FIG. 31B, the modulation waveform 80R representing luminance correction in the right divided frame is shown so as to correspond to the image data.

On the other hand, after luminance correction by the DSP circuit 50R, the DSP circuit 55R1 applies operation with horizontal correction to the data of 352 horizontal pixels× 480 vertical pixels diagonally shaded in FIG. 31A. The operation enlarges the image from 352 pixels to 480 pixels in the horizontal direction, thereby creating the image data of 480 horizontal pixels×480 vertical pixels, as shown in FIG. 31B.

In the frame memory 56R, the image data operated by the DSP circuit 50R and the DSP circuit 55R1 is stored for each color in accordance with the control signal Sa3R indicating the write address generated by the memory controller 63. In the example of FIG. 31B, the image data is sequentially written rightward starting at the upper left. The image data stored in the frame memory 56R is read for each color in accordance with the control signal Sa4R indicating the read address generated by the memory controller 63 and is inputted to the DSP circuit 55R2. In the embodiment, the respective orders of the write address and the read address on/from the frame memory 56R, which are generated by the memory controller 63, differ from each other. In the example of FIG. 31B, the read address is generated in such a manner that the image data is sequentially read downward starting at the upper left.

FIG. 31C shows the image data which is read from the frame memory 56R and is inputted to the DSP circuit 55R2. As described above, in the embodiment, the order of the read address from the frame memory 56R is the order in which the image data is read downward starting at the upper left. Therefore, the image inputted to the DSP circuit 55R2 takes the form of the image which is converted so that the image shown in FIG. 34B is mirror-inverted and the inverted image is rotated 90° counterclockwise.

The DSP circuit 55R2 applies operation with vertical correction to the data of 480 horizontal pixels×480 vertical pixels (see FIG. 31C) which has been read from the frame memory 56R. The operation enlarges the image from 480 pixels to 640 pixels in the horizontal direction, thereby creating the image data of 640 horizontal pixels×480 vertical pixels, as shown in FIG. 31D. Simultaneously with the enlargement of the image, the DSP circuit 55R2 performs operation for correcting vertical image distortion or the like based on the correction data stored in the correction data memory 60 and the data for correction obtained by analyzing the detection signal from the index electrode 70A.

The scan of the electron beam eBR is performed from the top to the bottom based on the image data (see FIG. 31D) obtained through the above-mentioned operation, whereby the frame diagonally shaded in FIG. 31E is displayed on the right side on the phosphor screen 11. In the embodiment, as described above, the input image data is corrected in consideration of image distortion or the like. Therefore, the right image displayed on the phosphor screen 11 is appropriately displayed without image distortion or the like. Since image distortion or the like is corrected on each of the left and right divided frames shown in FIGS. 30E and 31E, the appropriate image display can be performed so that the joint area of the left and right frames may be inconspicuous when the left and right frames are joined.

Figure 32:
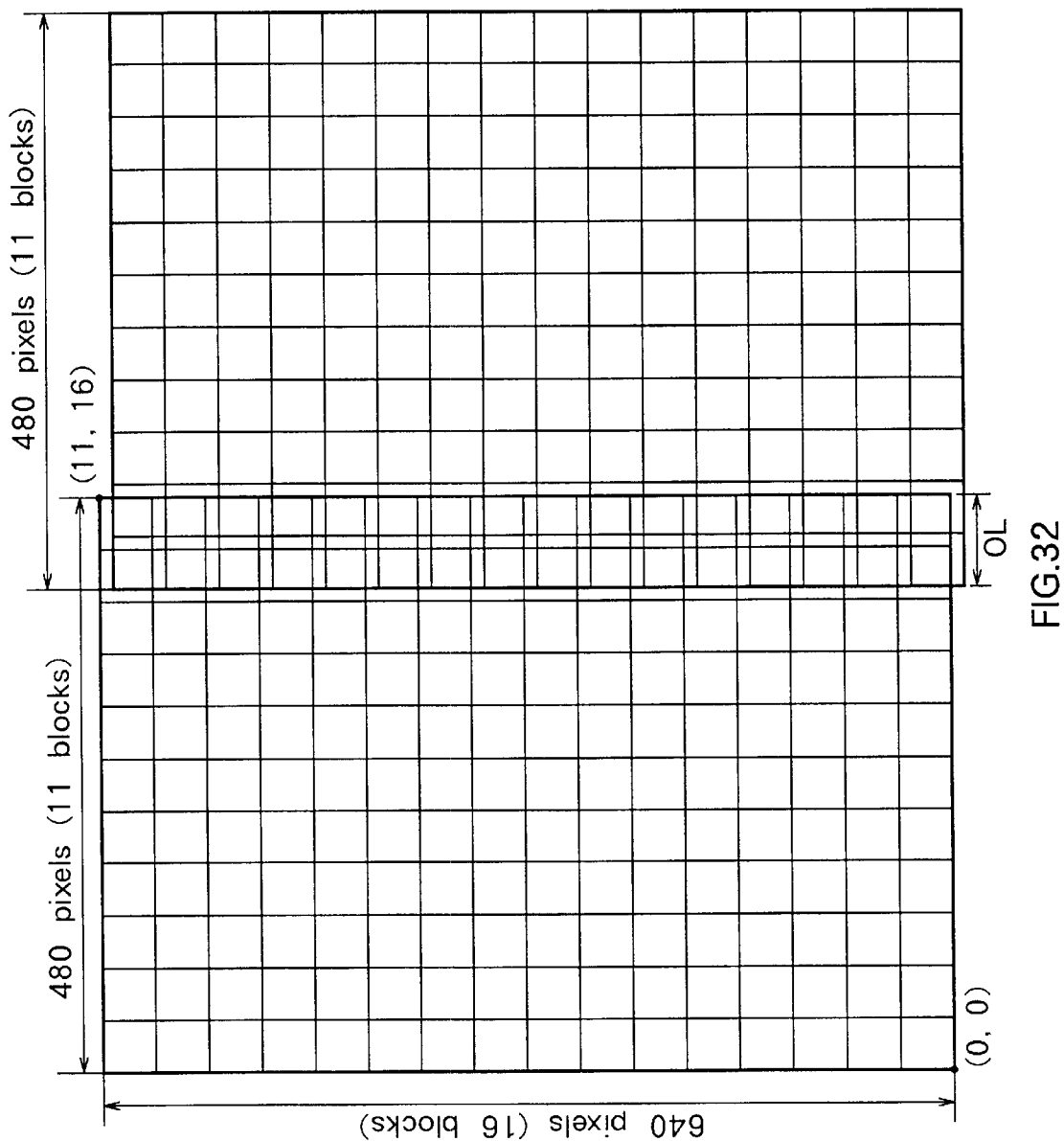
FIG. 32 is a diagram of an example of image display based on the reference image shown in FIG. 7 in the cathode ray tube according to the second example.

FIG. 32 shows an example of display of the image which is displayed on the phosphor screen 11 after the lattice-shaped reference image shown in FIG. 7 is corrected by the processing circuit shown in FIG. 4, in the embodiment. In FIG. 32, the left divided frame corresponds to the frame shown in FIG. 30E, and the number of pixels thereof is 480 horizontal pixels×640 vertical pixels, which are divided into 11 horizontal blocks×16 vertical blocks, respectively. In FIG. 32, the right divided frame corresponds to the screen shown in FIG. 31E, and the number of blocks thereof is the same as the number of blocks of the left divided frame.

In the second embodiment, similarly to the method described by referring to FIGS. 8 and 14 and so on in the first embodiment, when each lattice point shown in FIG. 32 is set as the control point, the correction data is supplied to each lattice point. Thus, the magnitude of initial displacement Fr(i, j), Gr(i, j), Fg(i, j), Gg(i, j), Fb(i, j) and Gb(i, j) are supplied to the lattice points (i, j) (i=1 to 11, j=1 to 16), for example, when only the left divided image is discussed. The magnitude of displacement is stored as the initial correction data (first correction data) in the correction data memory 60. The control unit 62 calculates the magnitude of small displacement ΔFr(i, j), ΔGr(i, j), ΔFg(i, j), ΔGg(i, j), ΔFb(i, j) and ΔGb(i, j) of the initial correction data based on the data S3 indicating the result of analysis of the index signal S2 outputted from the index signal processing circuit 61. Then, the control unit 62 adds the magnitude of small displacement to the initial correction data, thereby creating the correction data to be supplied to the DSP circuits 55L1, 55L2, 55R1 and 55R2. In the embodiment, the final correction data created by the control unit 62 is expressed by the above equations (A) to (F).

As described above, according to the embodiment, for example, when the line scan of each of the electron beams eBL and eBR is performed from the top to the bottom and the field scan is performed in the opposite directions from the center of the screen to the right or left side thereof in the horizontal direction, the left and right divided frames can be joined so that the joint area thereof may be inconspicuous, and therefore the image display can be excellently performed.

Third Embodiment

Next, a third embodiment of the invention will be described.

In the embodiment, a member for emitting light in response to the incidence of the electron beams is provided.

Figure 34:
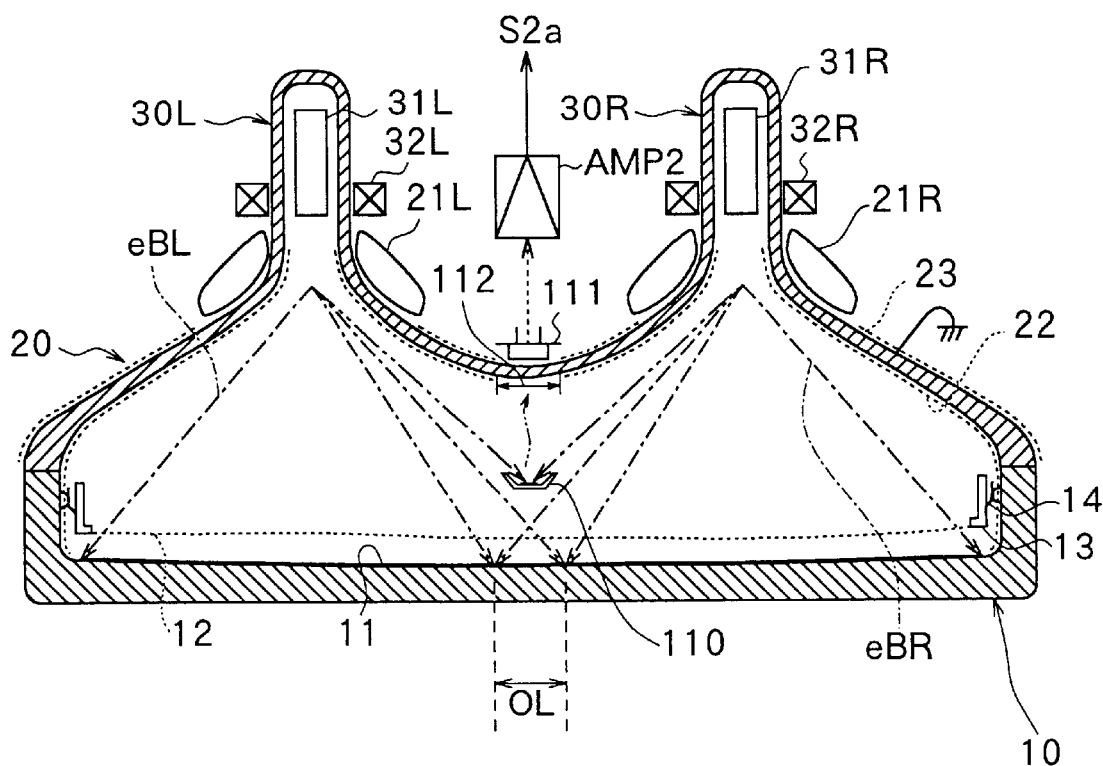
FIG. 34 is a schematic sectional view of a cathode ray tube according to a third example.

In the cathode ray tube according to the embodiment shown in FIG. 34, an index plate 110 which emits light in response to the incidence of each of the electron beams eBL and eBR is placed at the position corresponding to the index electrode 70 shown in FIGS. 1A and 1B. In the cathode ray tube according to the embodiment, an optically transparent detection window for detecting light emitted from the index plate 110 is provided in a region 112 in the funnel 20 facing the index plate 110. A photo-detector 111 is provided at the position facing the detection window on the outer side of the funnel 20 (outside the tube). The photo-detector 111 is connected to an amplifier AMP2.

The photo-detector 111 detects light emitted from the index plate 110, and the photo-detector 111 converts the detected light to an electric signal and outputs the electric signal. The amplifier AMP2 amplifies the signal outputted from the photo-detector 111 and outputs the amplified signal as an index signal S2a. Like the first and second embodiments, the index signal S2a outputted from the amplifier AMP2 is inputted to the index signal processing circuit 61 (see FIG. 4), where the index signal S2a is analyzed. The index signal processing circuit 61 outputs the data S3 required for the control unit 62 to create the magnitude of small displacement of the correction data, based on the analysis of the index signal S2a. The analysis of the detection signal by the index signal processing circuit 61 and the method of correcting image data by using the data S3 outputted after the analysis are the same as those of the first and second embodiments.

Figures 35A, 35B:
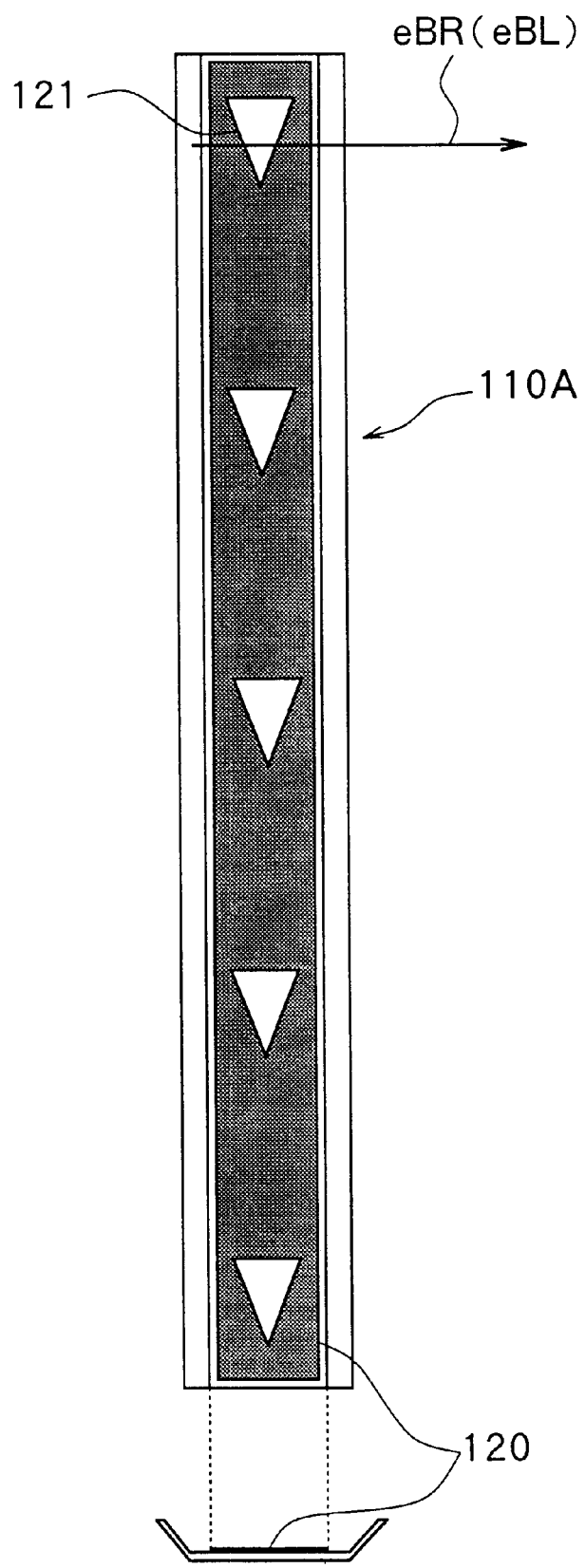
FIGS. 35A and 35B are views showing an example of the configuration of the index plate in the cathode ray tube according to the third example.

Similarly to the index electrode 70 shown in FIG. 22A, an index plate 110A shown in FIGS. 35A and 35B can be used, for example, in a case where the line scan of each of the electron beams eBL and eBR is performed in the horizontal direction and the field scan is performed from the top to the bottom.

The index plate 110A is formed of a rectangular plate member, as shown in FIG. 35A. A phosphor 120, which emits light in response to the incidence of the electron beams eBL and eBR, is provided on the index plate 110A. Desirably, for example, a phosphor having short-afterglow characteristic is used as the phosphor 120. For example, P37 (ZnS: Ag, Ni), P46 ($Y_3Al_5O_{12}$: Ce), P47 ($Y_2SiO_5$: Ce) or the like can be used as the phosphor 120. The phosphor 120 is provided in the entire center area of the index plate 110A in the longitudinal direction so that inverted delta patterns like the notches 71 provided in the index electrode 70 shown in FIG. 22A are formed therein. In FIG. 35A, a plurality of inverted delta regions indicated by reference numeral 121 is regions where the phosphor 120 is not provided. The pattern formed by the phosphor 120 is not limited to the pattern shown in FIG. 35A. For example, a variety of patterns like the patterns of notches in each of the index electrodes shown in FIGS. 23A to 23E can be applied to the pattern of the phosphor 120. As described above, the phosphor 120 is formed so as to have a predetermined pattern. Therefore, when each of the electrode beams eBL and eBR passes through the index plate 110A, the portion having the phosphor 120 emits light intermittently. The pattern of emission is allowed to correspond to the pattern of the electric detection signal detected in the index electrode 70.

The sides of the index plate 110A are bent in mountainous shape as shown in FIG. 35B, whereby unnecessary emission of the phosphor screen 11 outside the index plate 110A can be prevented when the electron beams eBL and eBR are scanning the index plate 110A. In other words, the same effects as the effects of the beam shield 27 shown in FIGS. 1A and 1B can be obtained.

Figures 36A, 36B:
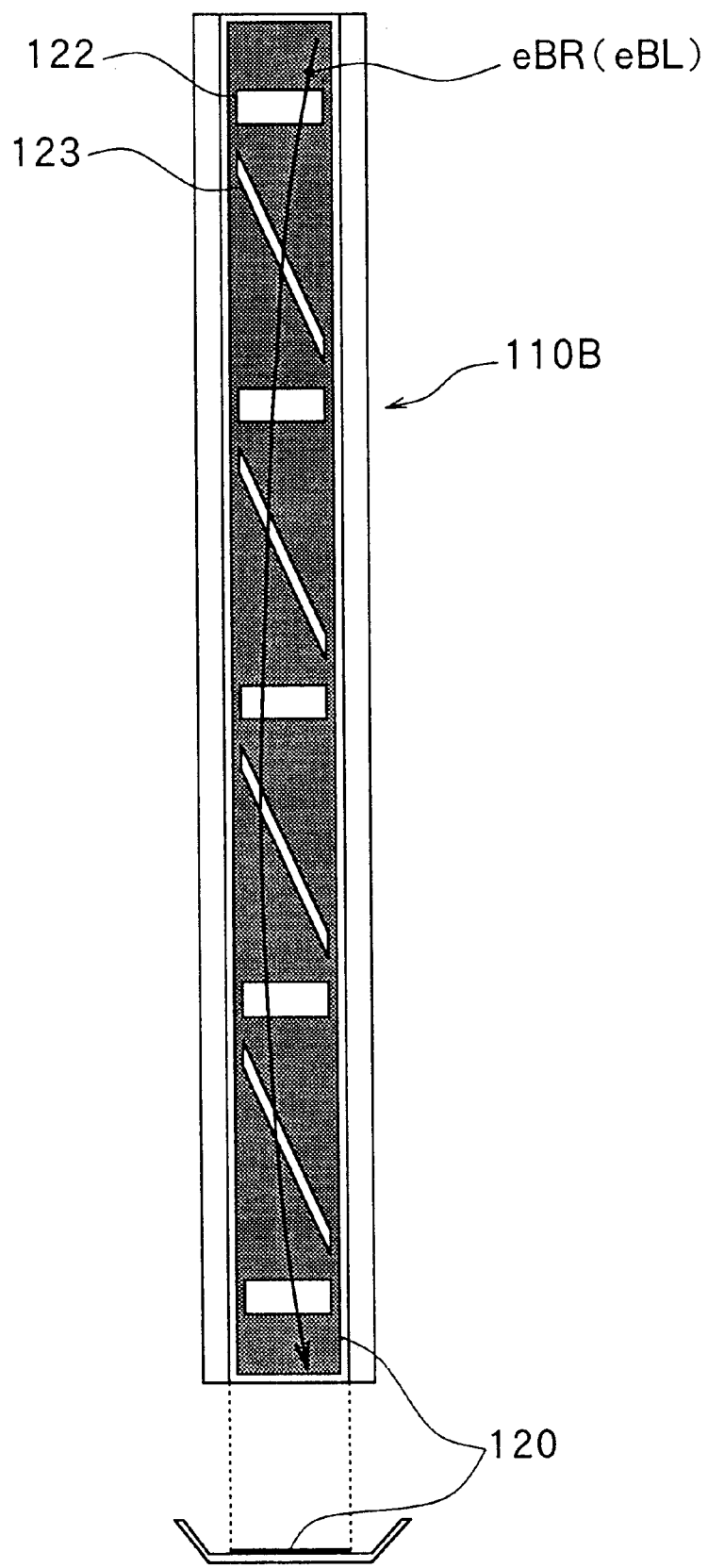
FIGS. 36A and 36B are views showing another example of the configuration of the index plate in the cathode ray tube according to the third example.

An index plate 110B shown in FIGS. 36A and 36B can be used, for example, in a case where the line scan of each of the electrode beams eBL and eBR is performed from the top to the bottom and the field scan is performed in the horizontal direction, similarly to the index electrode 70A shown in FIG. 33A. The configuration of the index plate 110B is the same as that of the index plate 110A shown in FIGS. 35A and 35B except that the shape of the pattern formed of the phosphor 120 is different. When each of the electron beams eBL and eBR passes through the index plate 110B, the portion having the phosphor 120 emits light intermittently. The pattern of emission is allowed to correspond to the pattern of the electric detection signal detected in the index electrode 70A.

In the index plates 110A and 110B shown in FIGS. 35A and 35B, and FIGS. 36A and 36B, the regions where the phosphor 120 is provided may be placed in the other way around from the state shown in the figures. For example, in the index plate 110A shown in FIGS. 35A and 35B, the phosphor 120 may be provided only in a plurality of inverted delta regions indicated by reference numeral 121.

As described above, according to the embodiment, in the tube, the index plate 110 which emits light in response to the incidence of the electron beams eBL and eBR is provided in the over-scan region OS of the electron beams eBL and eBR on the side of the joint of the adjacent left and right divided frames, and the light emitted from the index plate 110 is detected by the photo-detector 111 and outputted as the index signal S2a via the amplifier AMP2. Therefore, like the first and second embodiments, the control of image data based on the index signal S2a can be realized, and thus the left and right divided frames can be joined so that the joint area thereof may be inconspicuous both in position and in luminance. Accordingly, image display can be excellently performed. Moreover, according to the embodiment, the signals responsive to the incidence of the electron beams eBL and eBR are optically detected. Therefore, the third embodiment has an advantage of having more excellent high frequency characteristic of the index signal S2a, compared to the method of the first and second embodiments in which the electric detection signals are induced using the conductive electrode.

Fourth Embodiment

Next, a fourth embodiment of the invention will be described.

In the first, second and third embodiments, as shown in FIG. 4, the DSP circuits 50L and 50R for luminance correction are followed by the DSP circuit 55 (DSP circuits 55L1, 55L2, 55R1 and 55R2) for position correction so that luminance correction takes place before position correction. In the fourth embodiment, luminance correction takes place after position correction.

Figure 37:
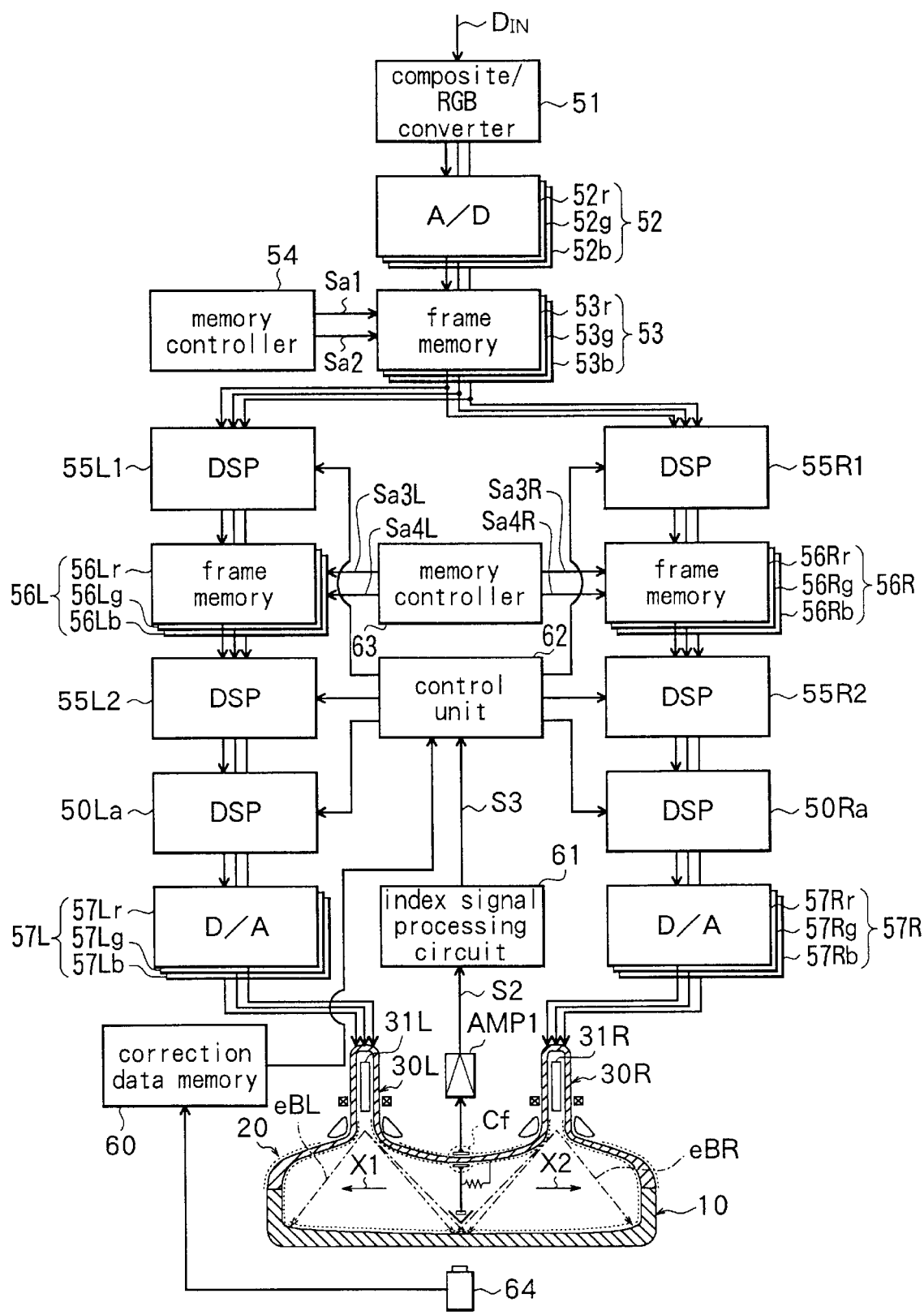
FIG. 37 is a block diagram of a signal processing circuit according to the fourth example.

The cathode ray tube of the embodiment shown in FIG. 37 comprises DSP circuits 50La and 50Ra for luminance correction following the DSP circuit 55, instead of the DSP circuits 50L and 50R for luminance correction shown in FIG. 4. In more detail, the DSP circuit 50La is located between the DSP circuit 55L2 and the D/A converter 57L, and the DSP circuit 50Ra is located between the DSP circuit 55R2 and the D/A converter 57R. Similarly to the DSP circuits 50L and 50R, the DSP circuits 50La and 50Ra are connected to the control unit 62 so that the control unit 62 gives instructions about luminance correction to the DSP circuits 50La and 50Ra. The configurations of components other than the DSP circuits 50La and 50Ra for luminance correction are the same as those of the processing circuit shown in FIG. 4.

In the cathode ray tube according to the embodiment, the image data stored in the frame memory 53 in a unit of frame is read in accordance with the control signal Sa2 indicating the read address generated by the memory controller 54, and then the image data is outputted to the DSP circuits 50L1 and 50R1.

The image data for the left divided frame among the image data for each color stored in the frame memory 53 is subjected to correction for correcting the position of the image by the DSP circuit 55L1, the frame memory 56L and the DSP circuit 55L2, based on the correction data stored in the correction data memory 60 and the data for correction obtained by analyzing the detection signal from the index electrode 70. Then, the image data for the left divided frame is subjected to correction for correcting the luminance of the image by the DSP circuit 50La for luminance correction. The image data for the left divided frame corrected by the DSP circuit 50La is converted to the analog signal through the D/A converter 57L, and then the analog signal is supplied as the cathode drive voltage to the cathode (not shown) provided in the left electron gun 31L.

On the other hand, the image data for the right divided frame among the image data for each color stored in the frame memory 53 is subjected to correction for correcting the position of the image by the DSP circuit 55R1, the frame memory 56R and the DSP circuit 55R2, based on the correction data stored in the correction data memory 60 and the data for correction obtained by analyzing the detection signal from the index electrode 70. Then, the image data for the right divided frame is subjected to correction for correcting the luminance of the image by the DSP circuit 50Ra for luminance correction. The image data for the right divided frame corrected by the DSP circuit 50Ra is converted to the analog signal through the D/A converter 57R, and then the analog signal is supplied as the cathode drive voltage to the cathode (not shown) provided in the right electron gun 31R.

FIGS. 38 to 41 show a signal waveform of the image data corresponding to the overlap region OL. In these graphs, the axis of ordinates represents a coefficient for luminance correction corresponding to the level of the image signal, and the axis of abscissas represents the position of the pixel in the overlap region OL. The coefficient for luminance correction takes on a value 256 times a coefficient value for practical use. In these graphs, one each of vertical white lines corresponds to one pixel.

FIGS. 38 to 41 show only the signal waveform corresponding to the overlap region OL in the left divided frame, but the same is true of the right divided frame. Although only the processing for the left divided frame by the DSP circuit will be described below, the processing for the right divided frame is the same as the processing for the left divided frame.

Figure 38:
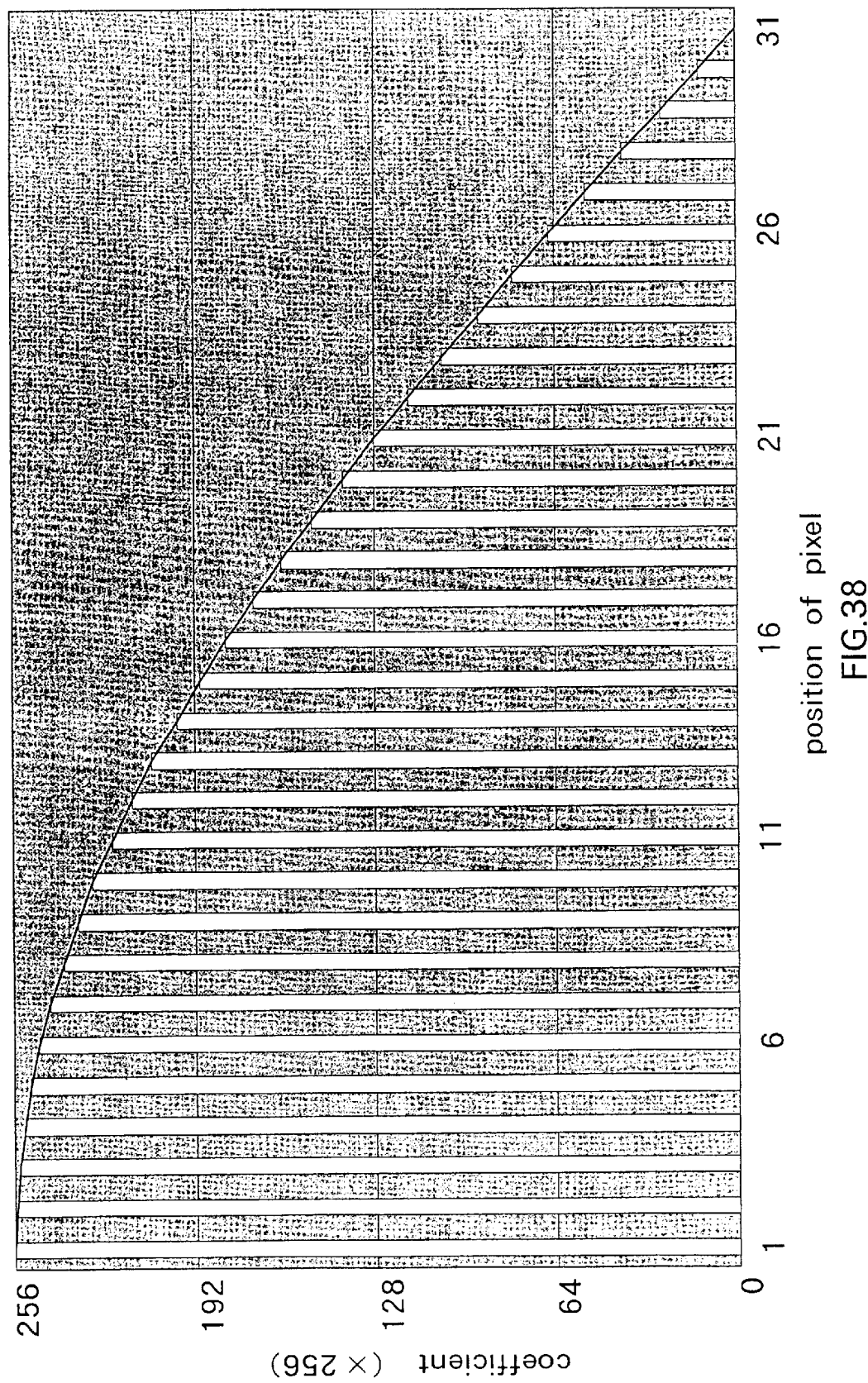
FIG. 38 is a graphical representation of a waveform outputted from a DSP circuit for luminance correction in the signal processing circuit according to the first example shown in FIG. 4.

FIG. 38 shows the signal waveform which is outputted to the following DSP circuit 55L1 for position correction after luminance correction by the DSP circuit 50L for luminance correction in the processing circuit shown in FIG. 4. As shown in FIG. 38, in the processing circuit shown in FIG. 4, the signal waveform outputted after luminance correction has a predetermined gradient of luminance so that unevenness does not develop in luminance when the left and right divided frames overlap each other, as described above.

Figure 39:
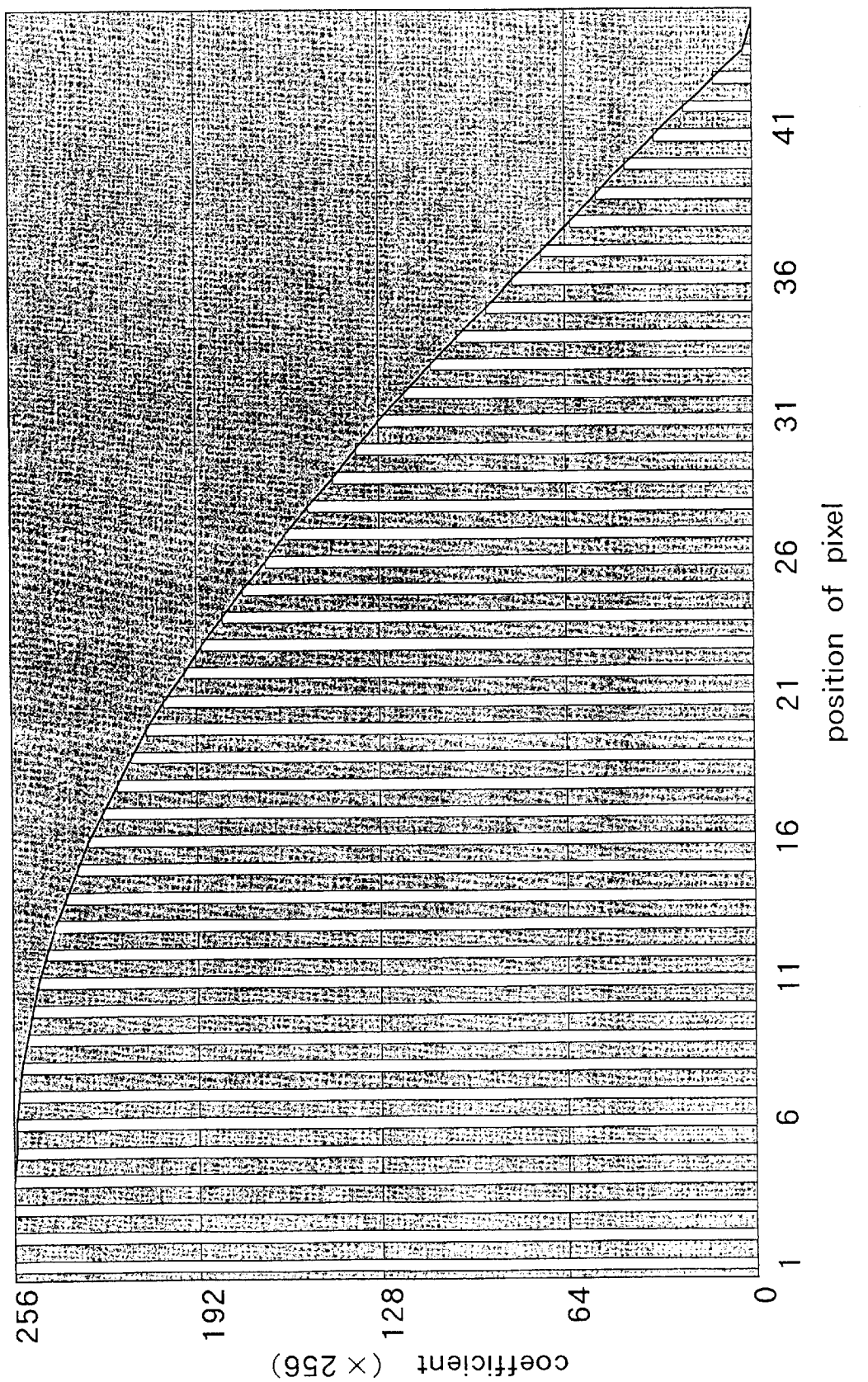
FIG. 39 is a graphical representation of a waveform outputted from a DSP circuit for position correction in the signal processing circuit according to the first example shown in FIG. 4, in a case where processing for position correction is made along with the conversion of the number of pixels by linear interpolation.
Figure 40:
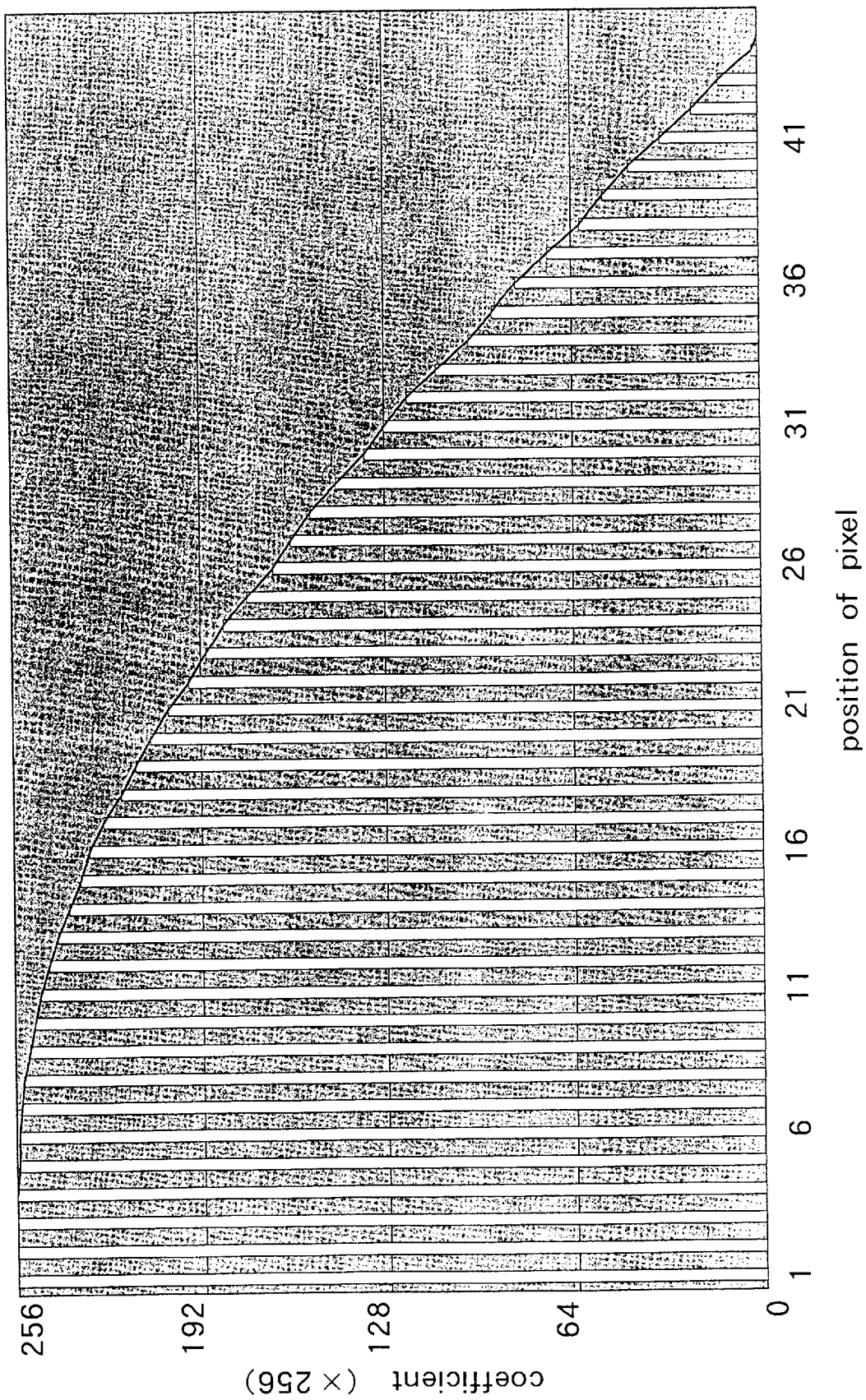
FIG. 40 is a graphical representation of a waveform outputted from a DSP circuit for position correction in the signal processing circuit according to the first example shown in FIG. 4, in a case where processing for position correction is made along with the conversion of the number of pixels by cubic approximation method

FIGS. 39 and 40 show the signal waveform which is outputted after luminance correction by the DSP circuit 50L for luminance correction and position correction by the following DSP circuits 55L1 and 55L2 for position correction in the processing circuit shown in FIG. 4. FIG. 39 shows the signal waveform which is obtained when the number of pixels is interpolated by the bilinear approximation method (linear interpolation) described by referring to the above expression (9) and FIG. 21C in the DSP circuits 55L1 and 55L2. FIG. 40 shows the signal waveform which is obtained when the number of pixels is interpolated by the cubic approximation method described by referring to the above expression (10) and FIG. 21D in the DSP circuits 55L1 and 55L2. A maximum value on the axis of abscissas shown in FIGS. 39 and 40 is larger than the maximum value shown in FIG. 38, because the signal shown in FIG. 38 has undergone interpolation for increasing the number of pixels by the DSP circuits 55L1 and 55L2.

As shown in FIGS. 39 and 40, when luminance correction takes place before position correction, the signal waveform of the image data after luminance correction undergoes the conversion of the number of pixels in the DSP circuits 55L1 and 55L2 for position correction and thus the signal waveform is subjected to uneven deformation. On the actual display screen, uneven deformation is clearly recognized as so-called "linear unevenness": unevenness develops in image display between neighboring vertical image lines.

Figure 41:
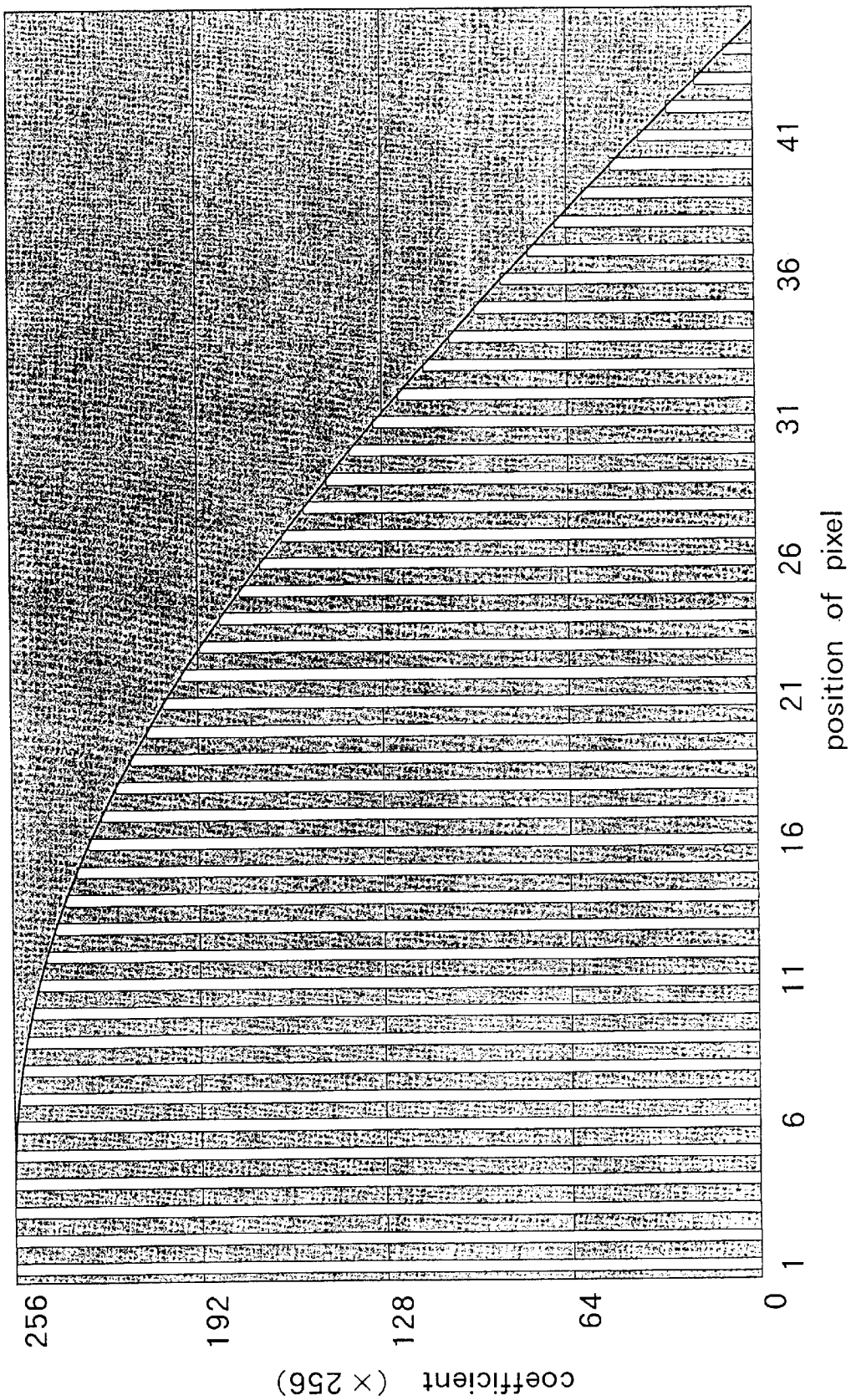
FIG. 41 is a graphical representation of a waveform obtained in a case where processing for correction is made in the signal processing circuit according to the fourth example shown in FIG. 37.

FIG. 41 shows the signal waveform which is obtained when correction is performed by the processing circuit of the embodiment shown in FIG. 37. As shown in FIG. 41, the signal outputted after luminance and position corrections by the processing circuit of the embodiment has lesser uneven deformation and the more ideal waveform, compared to the signal of the example shown in FIGS. 39 and 40. That is, in the embodiment, luminance correction takes place without being adversely affected by position correction.

As described above, according to the embodiment, luminance correction takes place after position correction. Therefore, luminance correction can be performed without being adversely affected by position correction. Accordingly, the left and right divided frames can be joined so that the joint area thereof may be inconspicuous with higher precision.

The invention is not limited to the above-mentioned embodiments, and various modifications may be possible. For example, the invention is also applicable to a configuration comprising three or more electron guns in which a single frame is formed by joining three or more scan frames. Moreover, in the above-mentioned embodiments, the single frame is formed by partially overlapping the divided frames. However, the single frame may be formed only by linearly joining the ends of the divided frames without providing an overlap region.

Moreover, in the first embodiment, as shown in FIG. 1B, the description has been given with regard to an example in which the line scan of each of the electron beams eBL and eBR is performed in the opposite directions from the center of the screen to the right or left side thereof and the field scan is performed from the top to the bottom similarly to a general cathode ray tube. However, the scan direction of each of the electron beams eBL and eBR is not limited to the direction of the above-described example. For example, the line scan can be also performed from the right or left side of the screen to the center of the screen. Moreover, in the second embodiment, as shown in FIG. 29, the field scan of each of the electron beams eBL and eBR is performed in the opposite directions from the center of the screen to the right or left side thereof However, the field scan can be also performed from the right or left side of the screen to the center of the screen, for example. Furthermore, the scan direction of the electron beam eBL can be identical to that of the electron beam eBR.

Moreover, in the above-mentioned embodiments, the description has been given with regard to an example in which the analog composite signal in conformity with NTSC is used as the image signal $D_{IN}$. However, the image signal $D_{IN}$ is not limited to the analog composite signal. For example, an RGB analog signal may be used as the image signal $D_{IN}$. In this case, the RGB signal can be obtained without the composite/RGB converter 51 (see FIG. 4). Alternatively, a digital signal for use in a digital television may be inputted as the image signal $D_{IN}$. In this case, the digital signal can be directly obtained without the A/D converter 52 (see FIG. 4). Even when any image signal is used, the circuits following the frame memory 53 can have substantially the same configuration as the circuit configuration of the example of the circuit shown in FIG. 4.

Moreover, the frame memories 56L and 56R may be eliminated from the circuit shown in FIG. 4 so that the image data outputted from the DSP circuits 55L1 and 55R1 is supplied to the electron guns 31L and 31R directly through the DSP circuits 55L2 and 55R2. Furthermore, in the above-mentioned embodiments, the input image data undergoes vertical correction after horizontal correction, but on the contrary the image data may undergo horizontal correction after vertical correction. Additionally, in the above-mentioned embodiments, the enlargement of the image is performed together with the correction of the input image data. However, the image data may be corrected without the enlargement of the image.

Furthermore, the invention is not limited to a cathode ray tube. For example, the invention can be applied to various types of image display apparatuses such as a projection-type image display apparatus which magnifies an image displayed on a cathode ray tube or the like through a projection optical system and projects the magnified image onto a screen.

Obviously many modifications and variations of the present invention are possible in the light of the above teachings. It is therefore to be understood that within the scope of the appended claims the invention may be practiced otherwise than as specifically described.

What is claimed is:

1. An image control device for correcting an image produced on an image display device which produces an image based on a picture signal inputted unidimensionally, and joins a plurality of divided frames to generate a single frame, the image control device comprising:

first converting means for converting a picture signal inputted unidimensionally to the image display device to discrete two-dimensional image data;

first operating means for performing an operation for correcting horizontally an array of pixels in the two-dimensional image data, so that the divided frames are joined properly in position in the horizontal direction and displayed when the image display device produces an image;

means for storing image data for storing, in the order of write address, the image data outputted from the first operating means, the means for storing image data capable of reading the stored image data in the same order as the order of write address or in the order different from the order of write address;

means for generating an address for generating a write address for image data with respect to the means for storing image data, the means for generating an address capable of generating a read address for the image data stored in the means for storing image data in the same order as the order of write address or in the order different from the order of write address;

second operating means for performing an operation for correcting, vertically with respect to the original state of the image data, an array of pixels in the image data outputted from the means for storing image data, so that the divided frames are joined properly in position in the vertical direction and displayed when the image display device produces an image; and second converting means for converting the image data corrected in the second operating means to a picture signal for display on the image display device and outputting the picture signal.

2. An image control device as claimed in claim 1, further comprising means for luminance control for performing control for luminance correction of the image data corrected in the second operating means, independently of position correction, so that the divided frames are joined properly in luminance and displayed, wherein the second converting means converts the image data corrected in luminance in the means for luminance control to a picture signal for display on the image display device and outputs the picture signal.

3. An image control device as claimed in claim 1, wherein the means for storing image data stores horizontally, in the order of write address, the image data outputted from the first operating means, and reads vertically the stored image data and outputs the image data in a state in which the image data is subjected to 90° conversion.

4. An image control device as claimed in claim 1, wherein the first operating means performs an operation for enlarging horizontally the image data along with the horizontal correction of the image data, and the second operating means performs an operation for enlarging vertically the image data along with the vertical correction of the image data.

5. An image control device as claimed in claim 1, wherein a plurality of first operating means and a plurality of second operating means are provided, and the first operating means and the second operating means are associated with their respective divided frames.

6. An image control device as claimed in claim 1, wherein the first operating means and the second operating means perform an operation for correcting the image data based on correction data obtained from an image displayed on a screen for correcting the status of display of the image.

7. An image control device as claimed in claim 6, wherein the correction data is data on magnitude of displacement of a pixel from its proper display position in the discrete two-dimensional image data regarding the image displayed on a screen, and a pixel value in the image data corrected in the first operating means and the second operating means is operated using a pixel value at a position displaced by the magnitude of displacement in uncorrected image data.

8. An image control device as claimed in claim 6, wherein the correction data is data on magnitude of displacement of each of a plurality of sample pixels from its proper display position in the discrete two-dimensional image data regarding the image displayed on a screen, a pixel value of each of the sample pixels in the image data corrected in the first operating means and the second operating means is operated using a pixel value at a position displaced by the magnitude of displacement of the sample pixel in uncorrected image data, and a pixel value of a pixel other than the sample pixels in the corrected image data is operated using a pixel value at a position displaced by magnitude of displacement of the pixel other than the sample pixels from its proper display position in uncorrected image data, the magnitude of displacement of the pixel other than the sample pixels being estimated by means of the magnitude of displacement of the sample pixel.

9. An image control device as claimed in claim 1, wherein the image display device is a cathode ray tube comprising a plurality of electron guns which emit a plurality of electron beams, and the electron beams emitted from the electron guns scan to generate the divided frames to produce an image.

10. An image control device for correcting an image produced on an image display device which produces an image based on a picture signal inputted unidimensionally, and joins a plurality of divided frames to generate a single frame, the image control device comprising:

means for position control for performing control in such a manner that a unidimensional picture signal inputted to the image display device is converted to discrete two-dimensional image data, and performing control in such a manner that an array of pixels in the image data is corrected so that the divided frames are joined properly in position and displayed when the image display device produces an image;

means for luminance control for performing control in such a manner that, after the position correction is made in the means for position control, the image data is corrected in luminance, independently of the position correction, so that the divided frames are joined properly in luminance and displayed; and converting means for converting the image data corrected in luminance in the means for luminance control to a picture signal for display on the image display device and outputting the picture signal.

11. An image control device as claimed in claim 10, wherein the means for position control performs control for correcting the image data based on first correction data obtained from an image displayed on a screen for correcting the status of display of the image.

12. An image control device as claimed in claim 11, wherein the image display device is a cathode ray tube comprising: a plurality of electron guns which emit a plurality of electron beams for scanning an available picture area and an over-scan area outside the available picture area; and electron beam detecting means which is provided in the over-scan area on the side of the joint area of the adjacent divided frames and outputs light or an electrical signal in response to the incident electron beam, and the means for position control performs control for correcting the image data using second correction data obtained based on the light or the electrical signal outputted from the electron beam detecting means in addition to the first correction data.

13. An image control method for correcting an image produced on an image display device which produces an image based on a picture signal inputted unidimensionally, and joins a plurality of divided frames to generate a single frame, the method involving:

converting a unidimensional picture signal inputted to the image display device into discrete two-dimensional image data;

performing an operation for correcting horizontally an array of pixels in the two-dimensional image data, so that the divided frames are joined properly in position in the horizontal direction and displayed when the image display device produces an image;

storing, in the order of write address, the horizontally corrected image data on means for storing image data, and reading the stored image data in the same order as the order of write address or in the order different from the order of write address;

performing an operation for correcting, vertically with respect to the original state of the image data, an array of pixels in the image data outputted from the means for storing image data, so that the divided frames are joined properly in position in the vertical direction and displayed when the image display device produces an image; and converting the vertically corrected image data to a picture signal for display on the image display device and outputting the picture signal.

14. An image control method for correcting an image produced on an image display device which produces an image based on a picture signal inputted unidimensionally, and joins a plurality of divided frames to generate a single frame, the method involving:

performing control in such a manner that a unidimensional picture signal inputted to the image display device is converted to discrete two-dimensional image data, and performing control in such a manner that an array of pixels in the image data is corrected in position so that the divided frames are joined properly in position and displayed when the image display device produces an image;

performing control in such a manner that, after the position correction is made, the image data is corrected in luminance, independently of the position correction, so that the divided frames are joined properly in luminance and displayed; and converting the image data corrected in luminance to a picture signal for display on the image display device and outputting the picture signal.

15. An image display device which produces an image based on a picture signal inputted unidimensionally, and joins a plurality of divided frames to generate a single frame, the image display device comprising:

first converting means for converting a unidimensional picture signal inputted to the image display device to discrete two-dimensional image data;

first operating means for performing an operation for correcting horizontally an array of pixels in the two-dimensional image data, so that the divided frames are joined properly in position in the horizontal direction and displayed when the image display device produces an image;

means for storing image data for storing, in the order of write address, the image data outputted from the first operating means, the means for storing image data capable of reading the stored image data in the same order as the order of write address or in the order different from the order of write address;

means for generating an address for generating a write address for image data with respect to the means for storing image data, the means for generating an address capable of generating a read address for the image data stored in the means for storing image data in the same order as the order of write address or in the order different from the order of write address;

second operating means for performing an operation for correcting, vertically with respect to the original state of the image data, an array of pixels in the image data outputted from the means for storing image data, so that the divided frames are joined properly in position in the vertical direction and displayed when the image display device produces an image;

second converting means for converting the image data corrected in the second operating means to a picture signal for display on the image display device and outputting the picture signal; and image display means for displaying an image based on the picture signal for display outputted from the second converting means.

16. An image display device as claimed in claim 15, further comprising means for luminance control for performing control for luminance correction of the image data corrected in the second operating means, independently of position correction, so that the divided frames are joined properly in luminance and displayed, wherein the second converting means converts the image data corrected in luminance in the means for luminance control to a picture signal for display and outputs the picture signal.

17. An image display device as claimed in claim 15, wherein the means for storing image data stores horizontally, in the order of write address, the image data outputted from the first operating means, and reads vertically the stored image data and outputs the image data in a state in which the image data is subjected to 90° conversion.

18. An image display device as claimed in claim 15, wherein the first operating means performs an operation for enlarging horizontally the image data along with the horizontal correction of the image data, and the second operating means performs an operation for enlarging vertically the image data along with the vertical correction of the image data.

19. An image display device as claimed in claim 15, wherein a plurality of first operating means and a plurality of second operating means are provided, and the first operating means and the second operating means are associated with their respective divided frames.

20. An image display device as claimed in claim 15, wherein the first operating means and the second operating means perform an operation for correcting the image data based on correction data obtained from an image displayed on a screen for correcting the status of display of the image.

21. An image display device as claimed in claim 20, wherein the correction data is data on magnitude of displacement of a pixel from its proper display position in the discrete two-dimensional image data regarding the image displayed on a screen, and a pixel value in the image data corrected in the first operating means and the second operating means is operated using a pixel value at a position displaced by the magnitude of displacement in uncorrected image data.

22. An image display device as claimed in claim 20, wherein the correction data is data on magnitude of displacement of each of a plurality of sample pixels from its proper display position in the discrete two-dimensional image data regarding the image displayed on a screen, a pixel value of each of the sample pixels in the image data corrected in the first operating means and the second operating means is operated using a pixel value at a position displaced by the magnitude of displacement of the sample pixel in uncorrected image data, and a pixel value of a pixel other than the sample pixels in the corrected image data is operated using a pixel value at a position displaced by magnitude of displacement of the pixel other than the sample pixels from its proper display position in uncorrected image data, the magnitude of displacement of the pixel other than the sample pixels being estimated by means of the magnitude of displacement of the sample pixel.

23. An image display device as claimed in claim 15, further comprising a plurality of electron guns which emit a plurality of electron beams, wherein the electron beams emitted from the electron guns scan to generate the divided frames to produce an image.

24. An image display device as claimed in claim 23, wherein the electron beams scan in the vertical direction.

25. An image display device which produces an image based on a picture signal inputted unidimensionally, and joins a plurality of divided frames to generate a single frame, the image display device comprising:

means for position control for performing control in such a manner that a unidimensional picture signal inputted to the image display device is converted to discrete two-dimensional image data, and performing control in such a manner that an array of pixels in the image data is corrected so that the divided frames are joined properly in position and displayed when the image display device produces an image;

means for luminance control for performing control in such a manner that, after the position correction is made in the means for position control, the image data is corrected in luminance, independently of the position correction, so that the divided frames are joined properly in luminance and displayed;

converting means for converting the image data corrected in luminance in the means for luminance control to a picture signal for display on the image display device and outputting the picture signal; and image display means for displaying an image based on the picture signal for display outputted from the converting means.

26. An image display device as claimed in claim 25, wherein the means for position control performs control for correcting the image data based on first correction data obtained from an image displayed on a screen for correcting the status of display of the image.

27. An image display device as claimed in claim 26, further comprising:

a plurality of electron guns which emit a plurality of electron beams for scanning an available picture area and an over-scan area outside the available picture area; and electron beam detecting means which is provided in the over-scan area on the side of the joint area of the adjacent divided frames and outputs light or an electrical signal in response to the incident electron beam, wherein the means for position control performs control for correcting the image data using second correction data obtained based on the light or the electrical signal outputted from the electron beam detecting means in addition to the first correction data.

* * * * *